United States Patent [19]
Schulz et al.

[11] Patent Number: 5,758,302
[45] Date of Patent: May 26, 1998

[54] SHIFT CONTROL SYSTEM FOR A MULTIPLE RATIO AUTOMATIC TRANSMISSION

[75] Inventors: Winfried Franz-Xaver Schulz, Pulheim; Johann Kirchhoffer, Cologne, both of Germany

[73] Assignee: Ford Global Technologies, Inc., Dearborn, Mich.

[21] Appl. No.: 798,587

[22] Filed: Feb. 11, 1997

Related U.S. Application Data

[62] Division of Ser. No. 509,571, Jul. 31, 1995, Pat. No. 5,646,842, which is a division of Ser. No. 323,464, Oct. 14, 1994, abandoned.

[51] Int. Cl.$^6$ .............................. F16H 61/08; F16H 61/30
[52] U.S. Cl. .............. 701/51; 475/143; 475/149; 475/153; 477/269; 477/296
[58] Field of Search .................. 364/424.08, 424.093, 364/424.094, 424.095; 477/34, 52, 62, 63, 127, 130, 131, 143, 149, 153, 155; 475/269, 296, 116, 127, 128, 129, 138; 701/51, 58, 60, 64, 65, 66

[56] References Cited

U.S. PATENT DOCUMENTS

| | | |
|---|---|---|
| 3,747,730 | 7/1973 | Hause .......................... 74/869 |
| 3,831,465 | 8/1974 | Murakami ..................... 74/869 |
| 4,468,989 | 9/1984 | Rosen ........................... 74/869 |
| 5,029,087 | 7/1991 | Cowan et al. ............ 364/424.1 |
| 5,081,886 | 1/1992 | Person et al. ................ 74/866 |
| 5,083,481 | 1/1992 | Smith et al. ................. 74/869 |
| 5,085,103 | 2/1992 | Ando et al. .................. 74/868 |
| 5,150,297 | 9/1992 | Daubenmier et al. .... 364/424.1 |
| 5,157,608 | 10/1992 | Sankpal et al. ........... 364/424.1 |
| 5,272,630 | 12/1993 | Brown et al. ............ 364/424.1 |
| 5,303,616 | 4/1994 | Palansky et al. ........... 74/890 |
| 5,305,663 | 4/1994 | Leonard et al. ............ 74/866 |
| 5,315,901 | 5/1994 | Barnes ......................... 192/3.3 |
| 5,383,825 | 1/1995 | El-Khoury et al. ......... 477/149 |
| 5,389,046 | 2/1995 | Timte et al. ................. 475/127 |
| 5,474,506 | 12/1995 | Palansky et al. ............ 477/63 |
| 5,646,842 | 7/1997 | Schulz et al. .......... 364/424.08 |

Primary Examiner—Michael Zanelli
Assistant Examiner—Edward Pipala
Attorney, Agent, or Firm—Frank G. McKenzie; Roger L. May

[57] ABSTRACT

A control system for a multiple ratio transmission including two overrunning couplings acting in cooperation with friction clutches and brakes to effect controlled shifts between ratios to reduce inertia torque upon engagement of friction brakes associated with speed ratio downshifts that occur in time-controlled stages following a command for a downshift and for establishing an electronic pressure accumulator effect upon speed ratio upshifts following a command for an upshift.

17 Claims, 68 Drawing Sheets

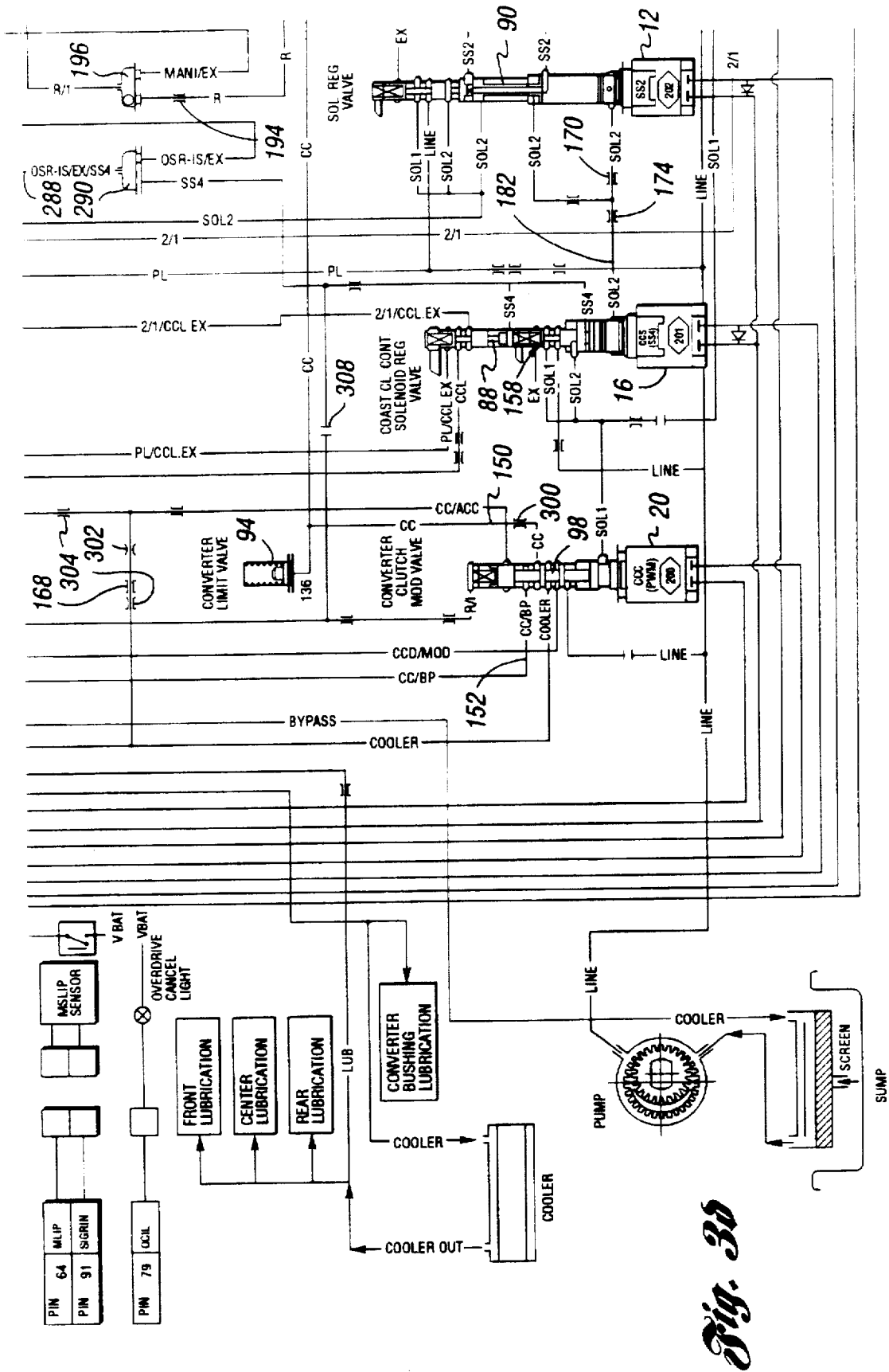

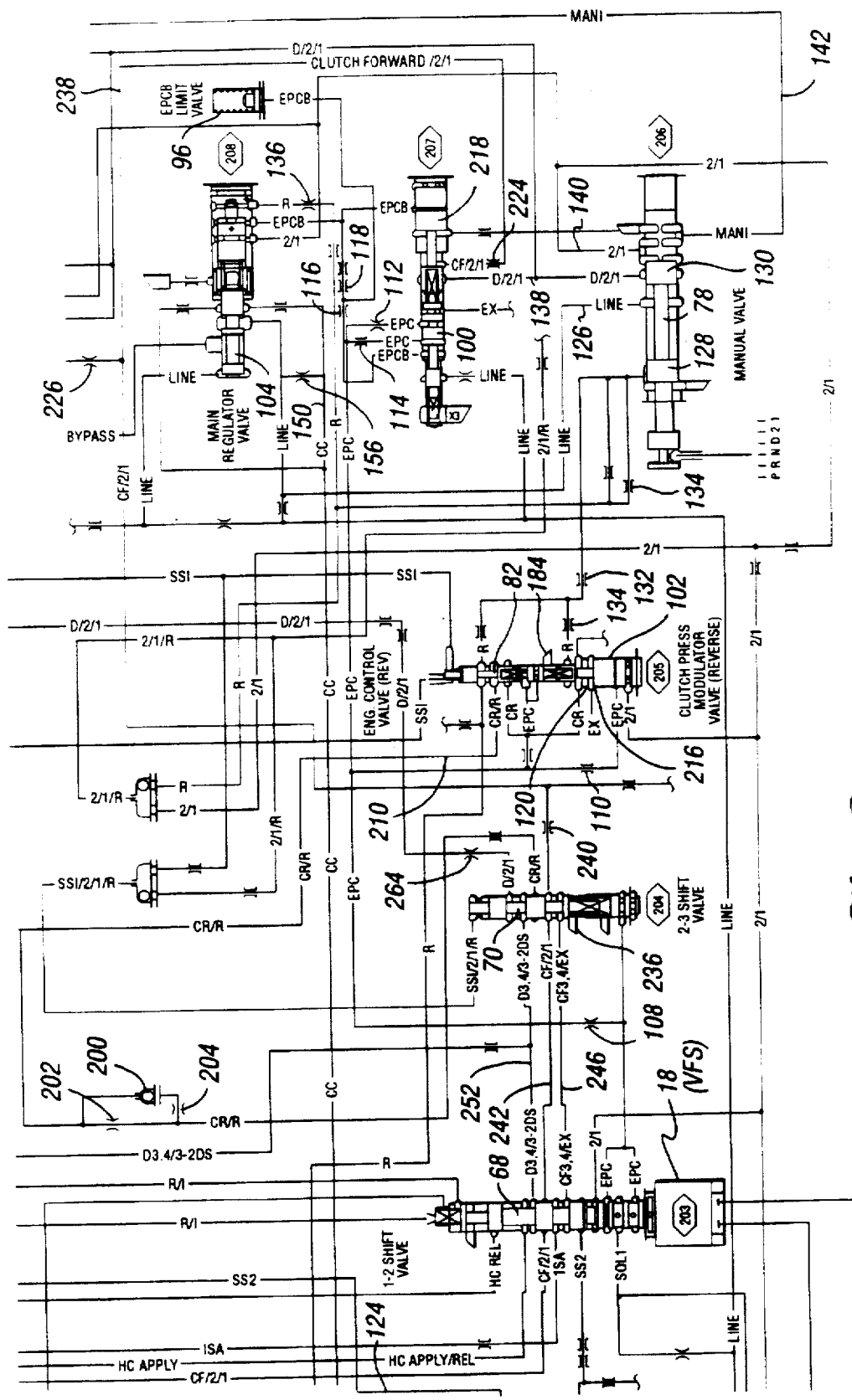

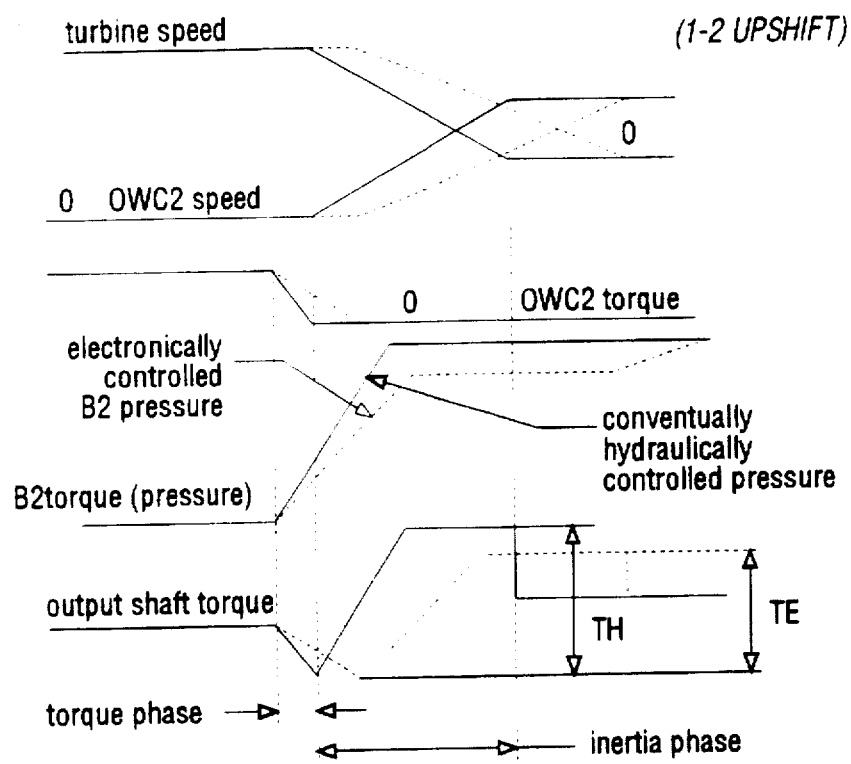
Fig. 4 (1-2 UPSHIFT)
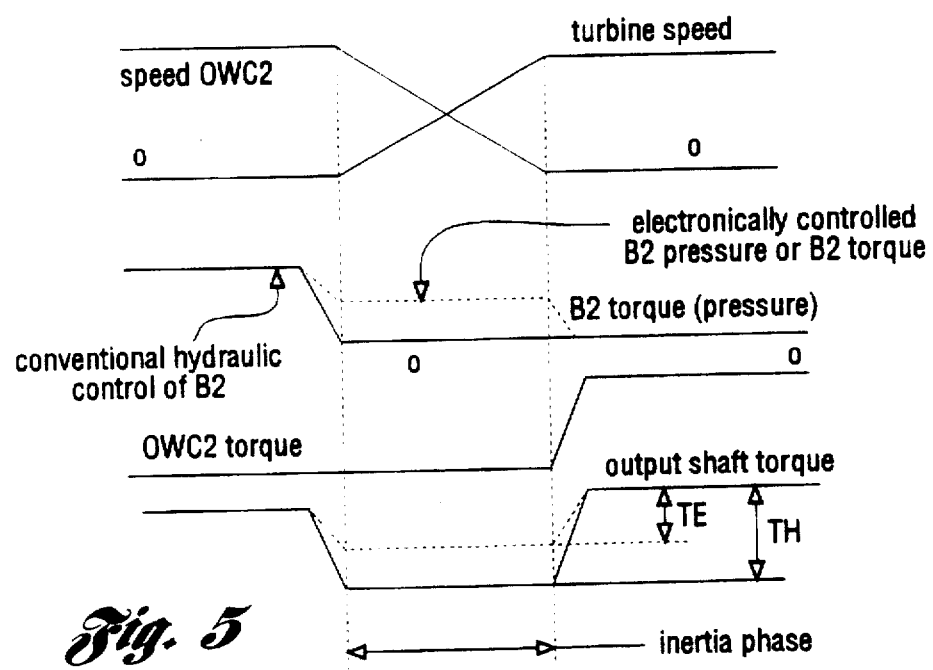
Fig. 5 (2-1 DOWNSHIFT)

(2-3 UPSHIFT)

(3-2, 4-2 DOWNSHIFT)

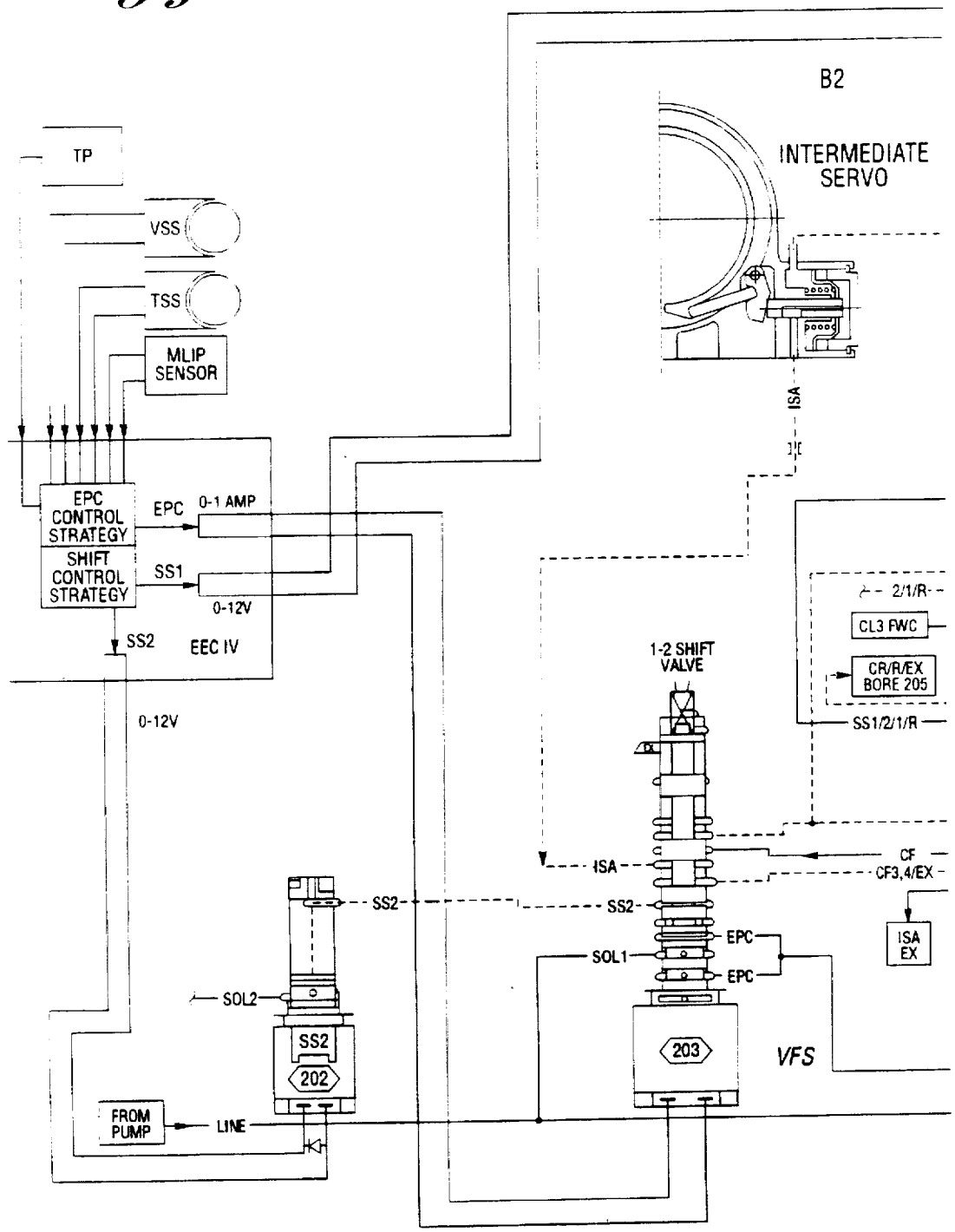
Fig. 18a-a

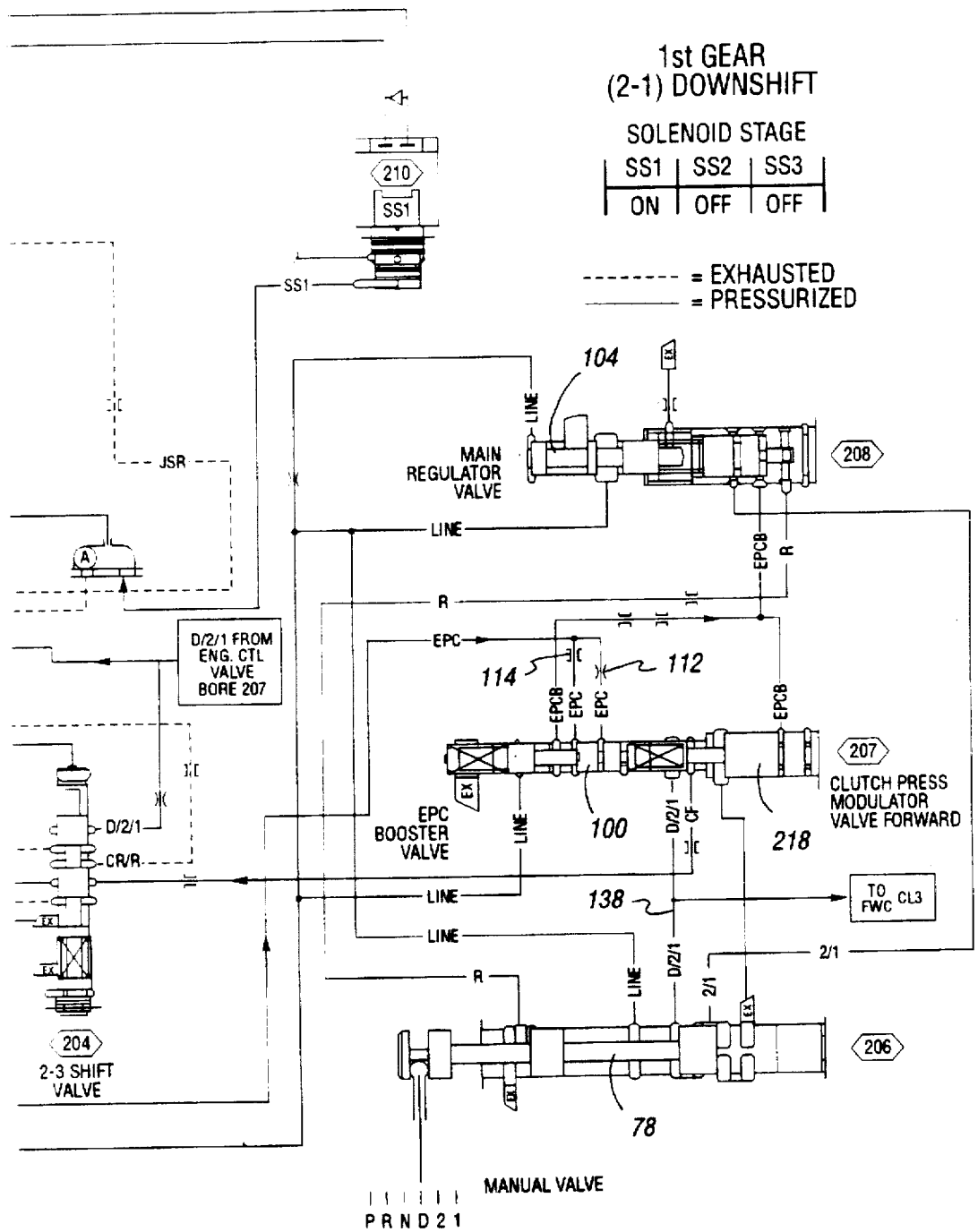
Fig. 18a-b

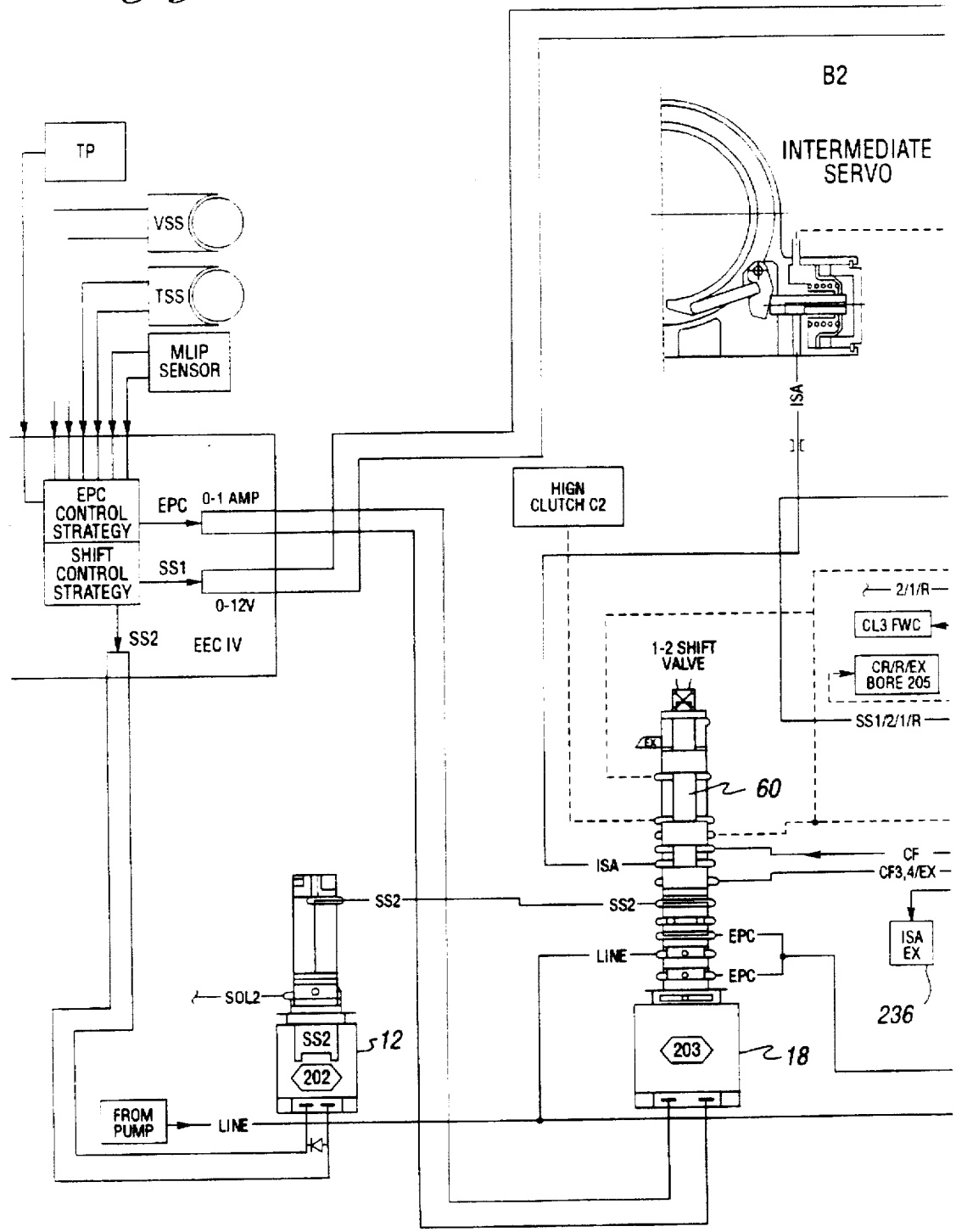
Fig. 18b-a

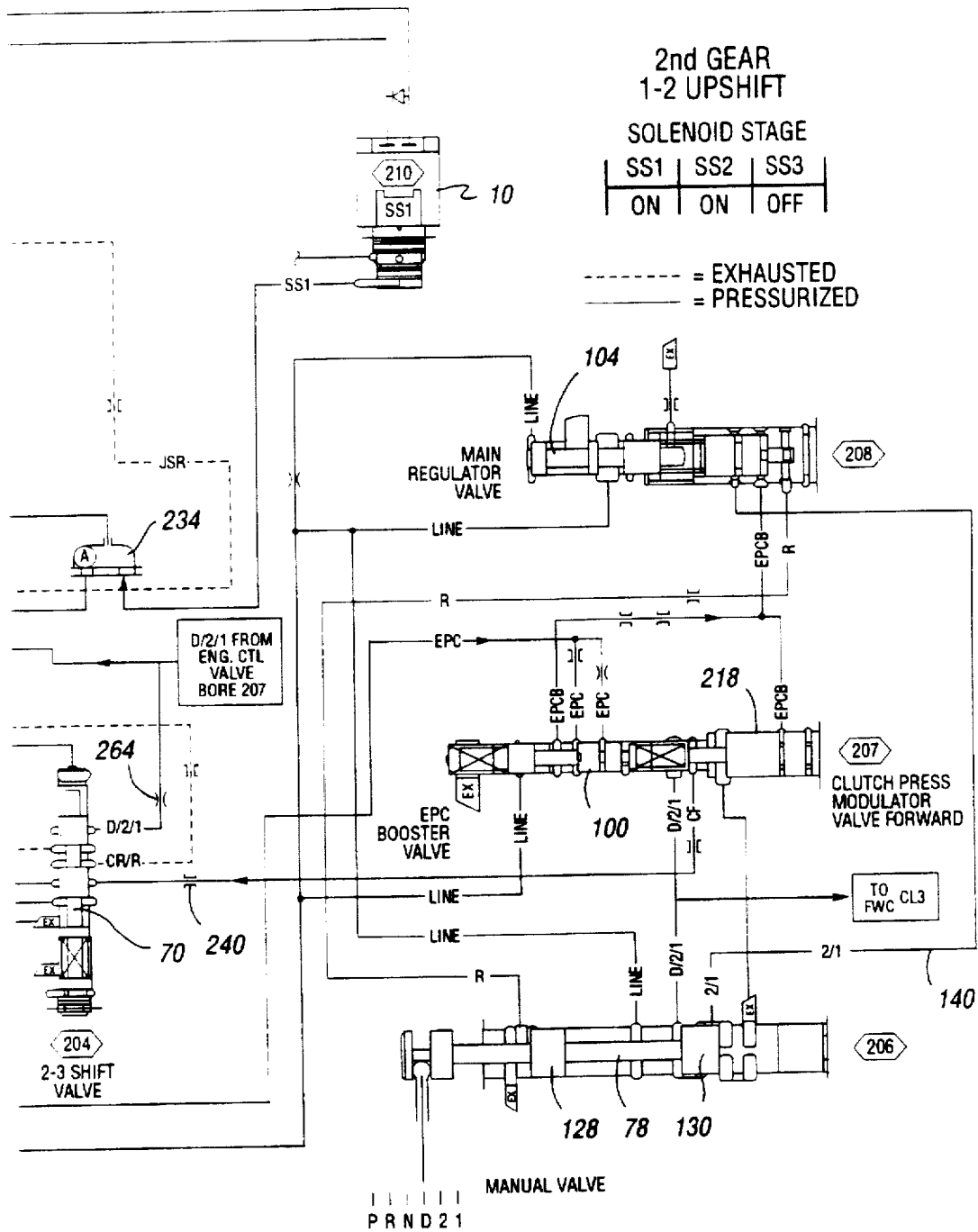
Fig. 18b-b

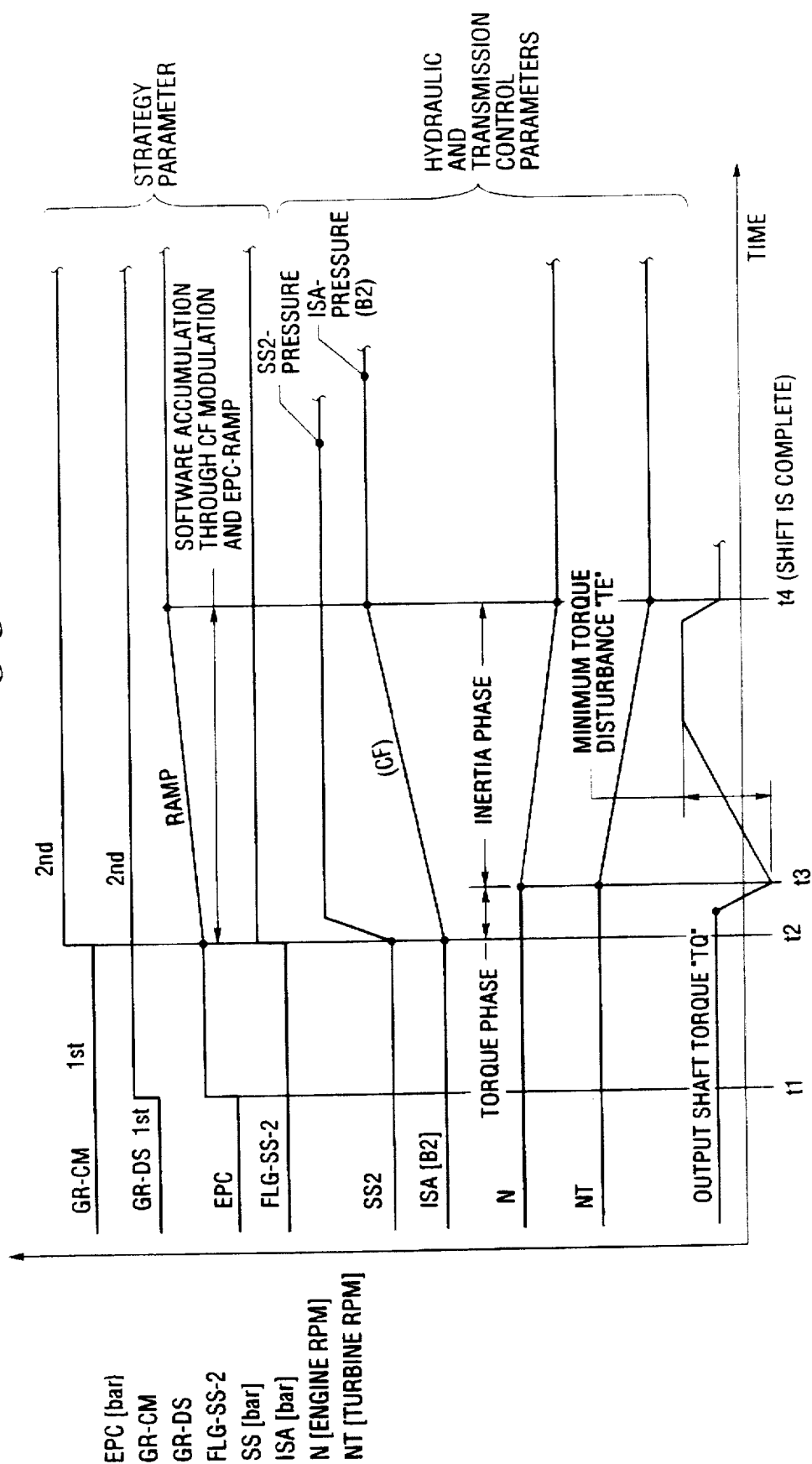

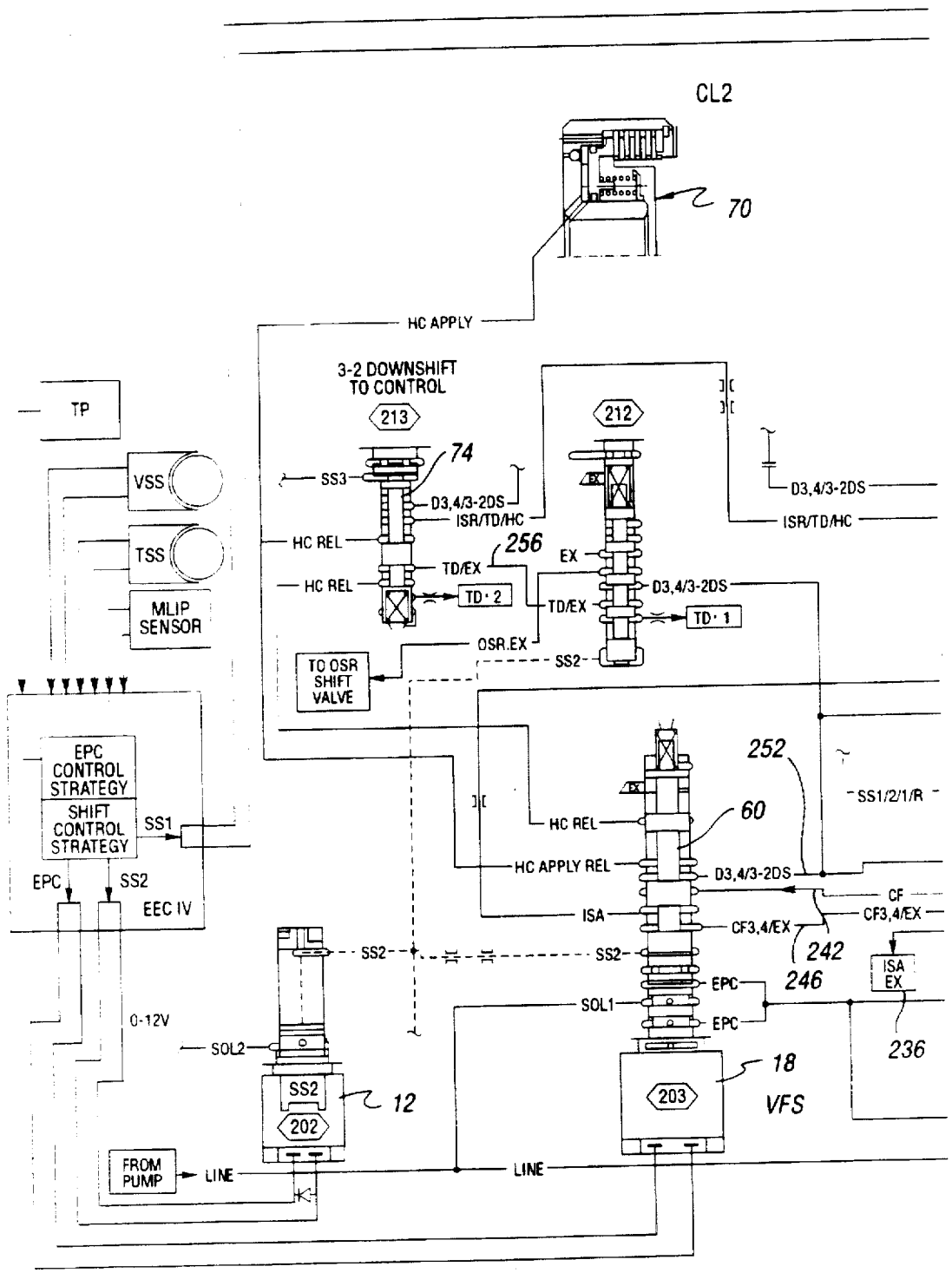
Fig. 22a-a

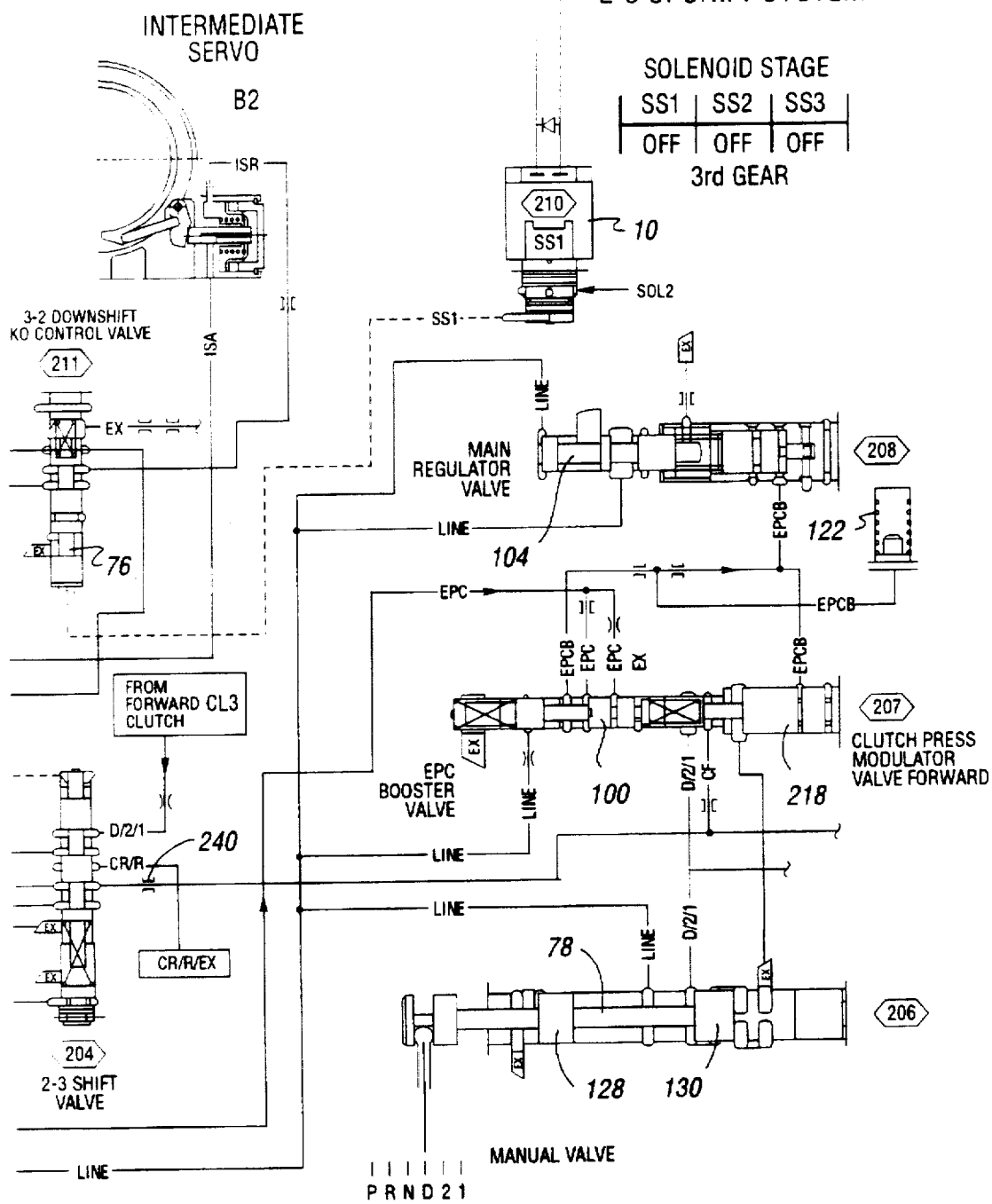
Fig. 22a-b

Fig. 22b-a
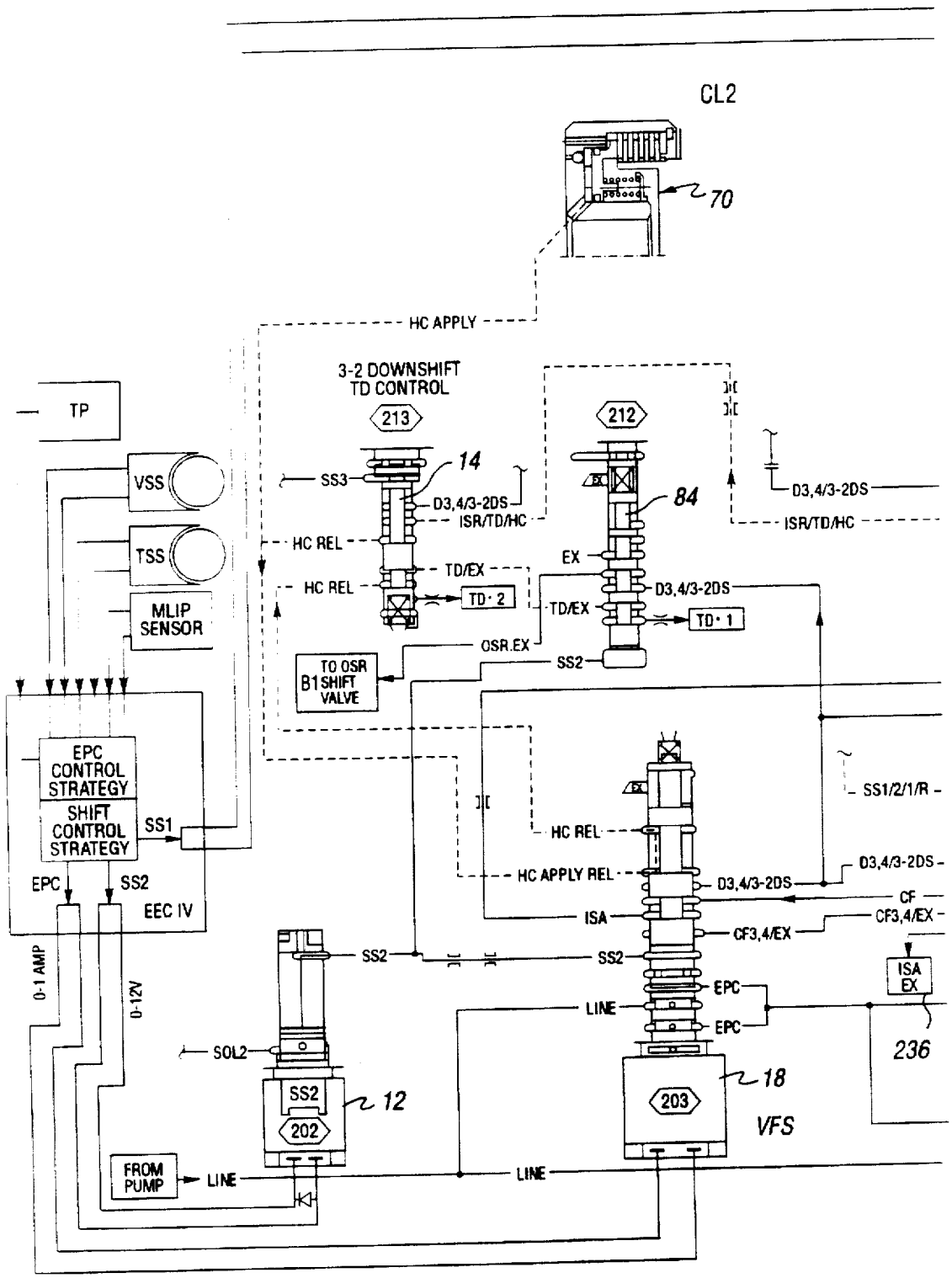

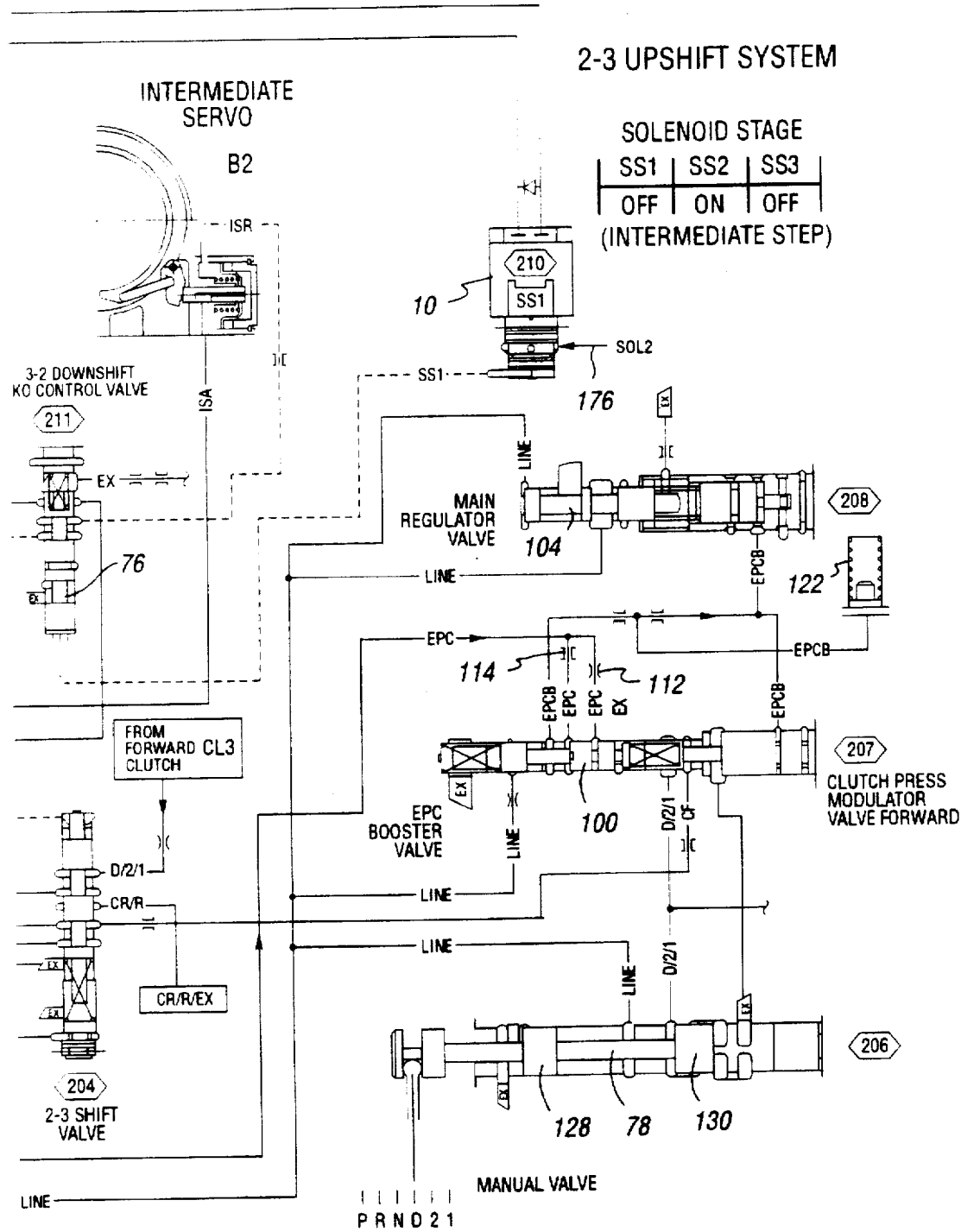
Fig. 22b-b

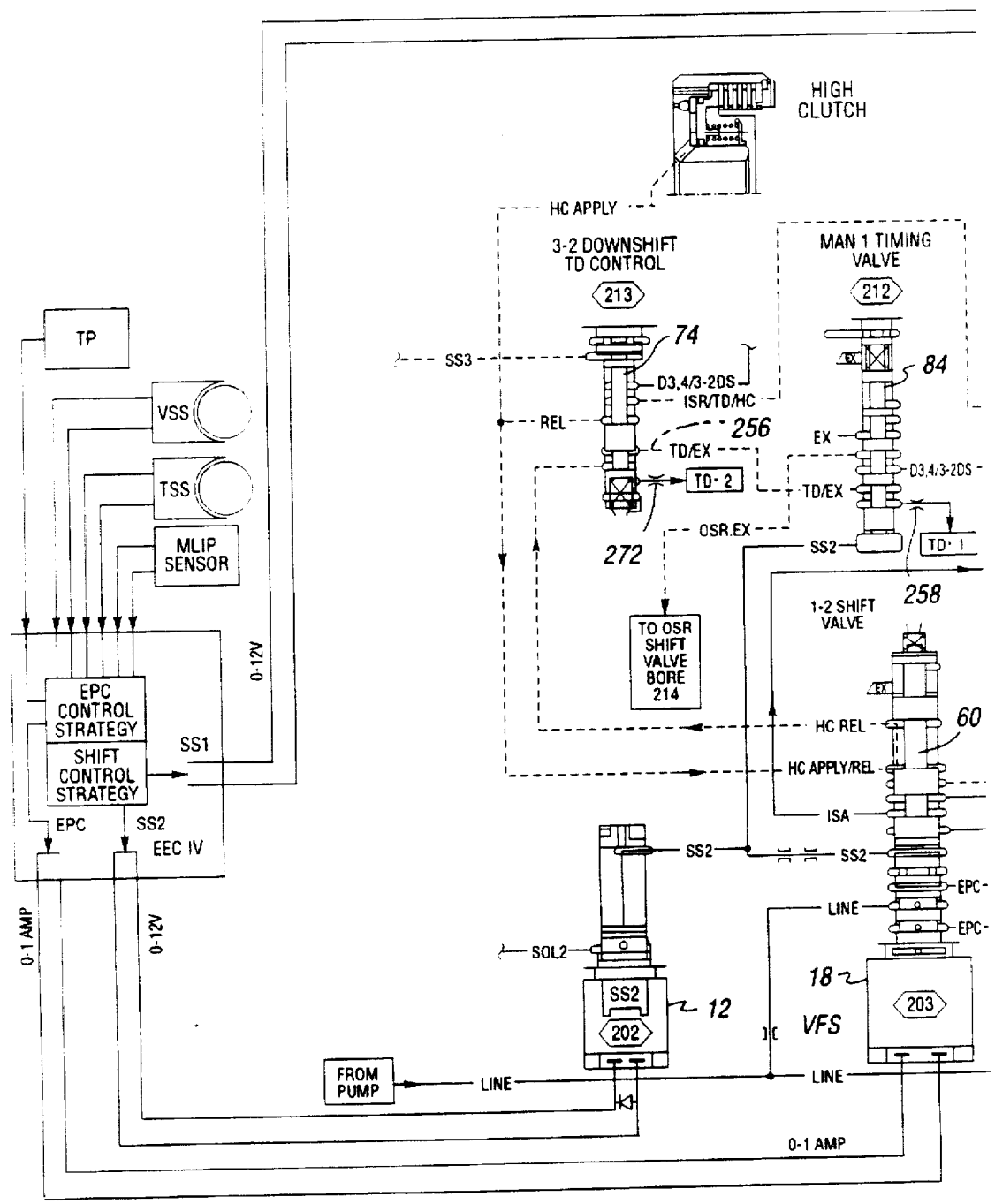
Fig. 28a-a

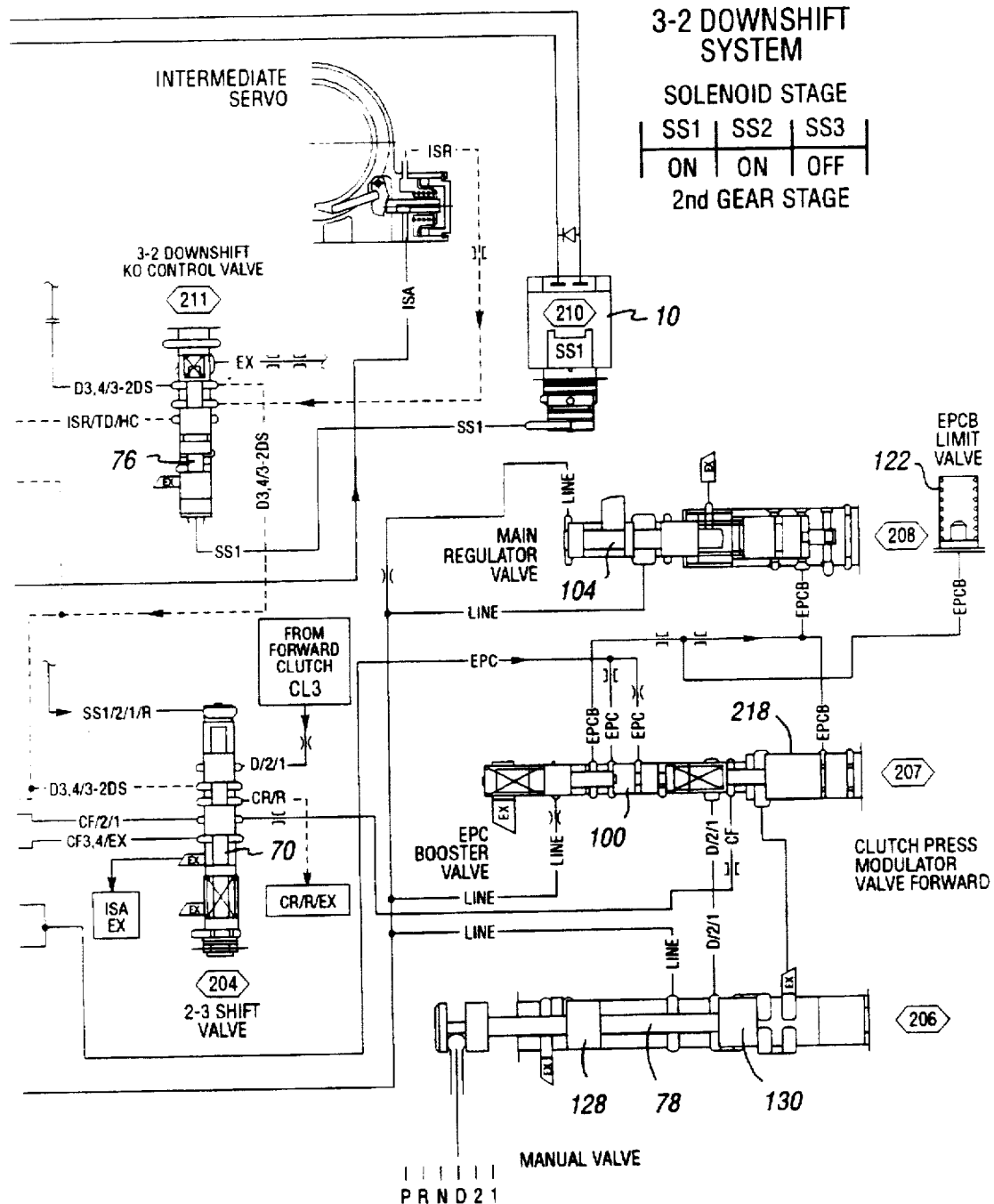
Fig. 28a-b

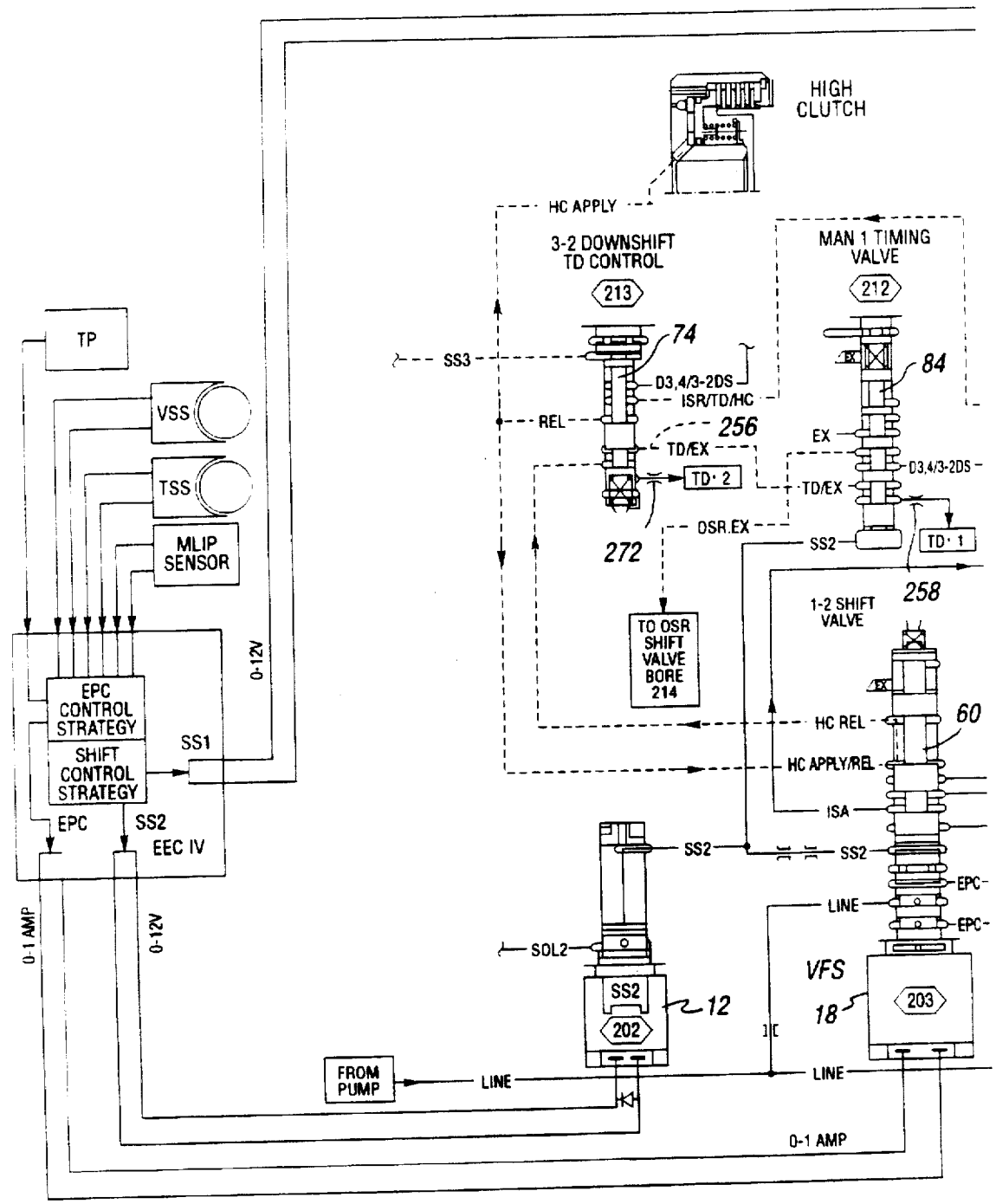
Fig. 28b-a

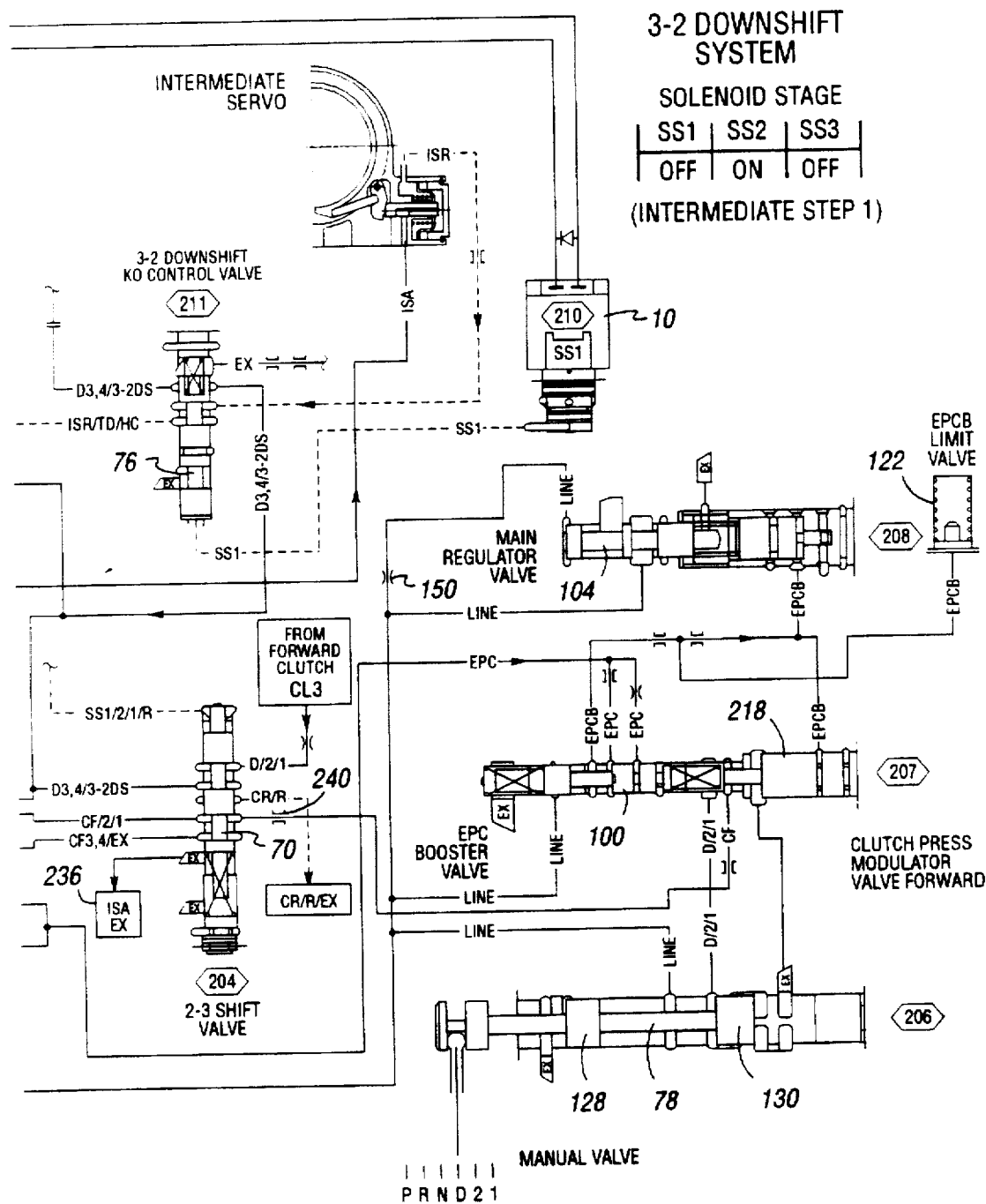
Fig. 28b-b

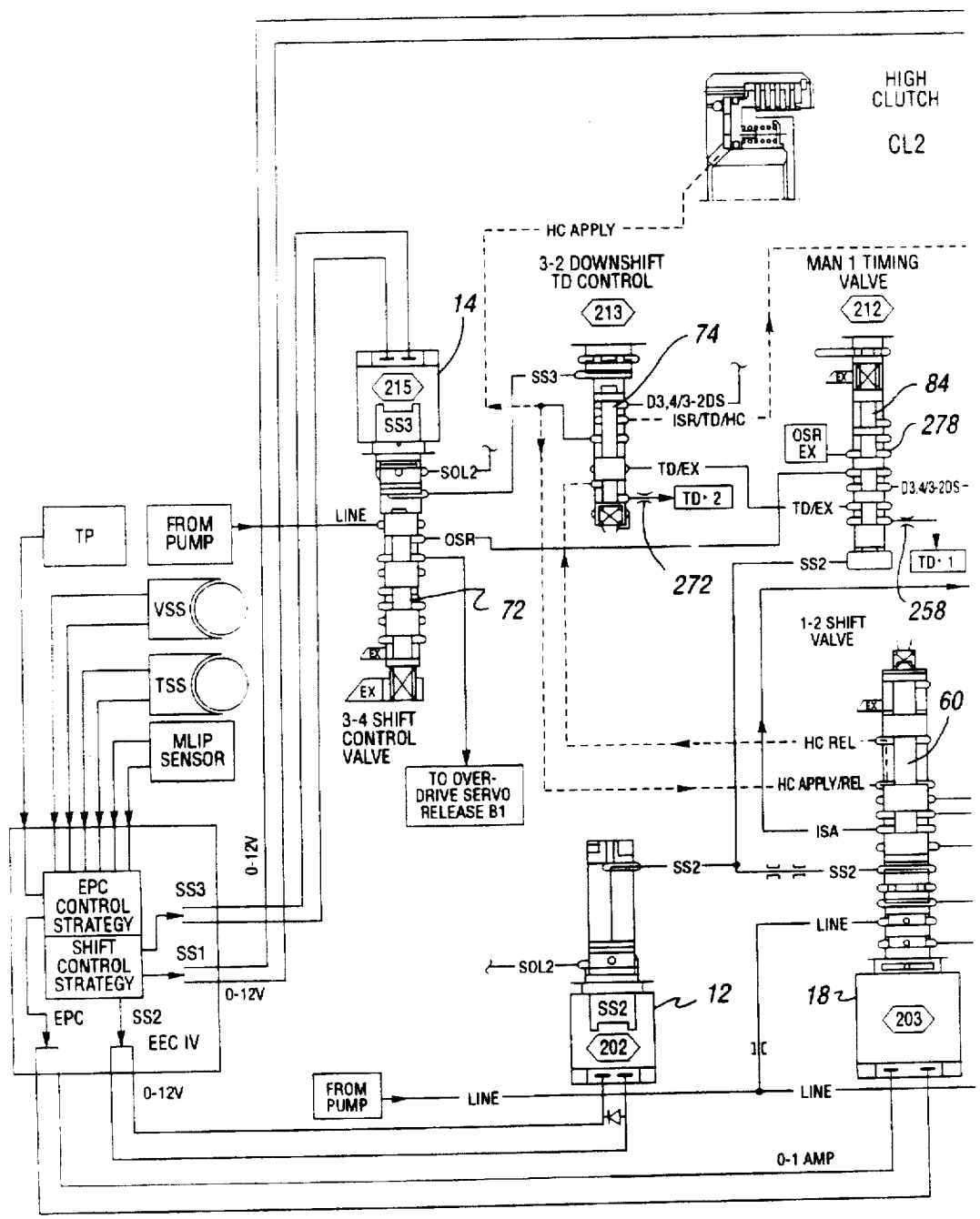
Fig. 32a-a

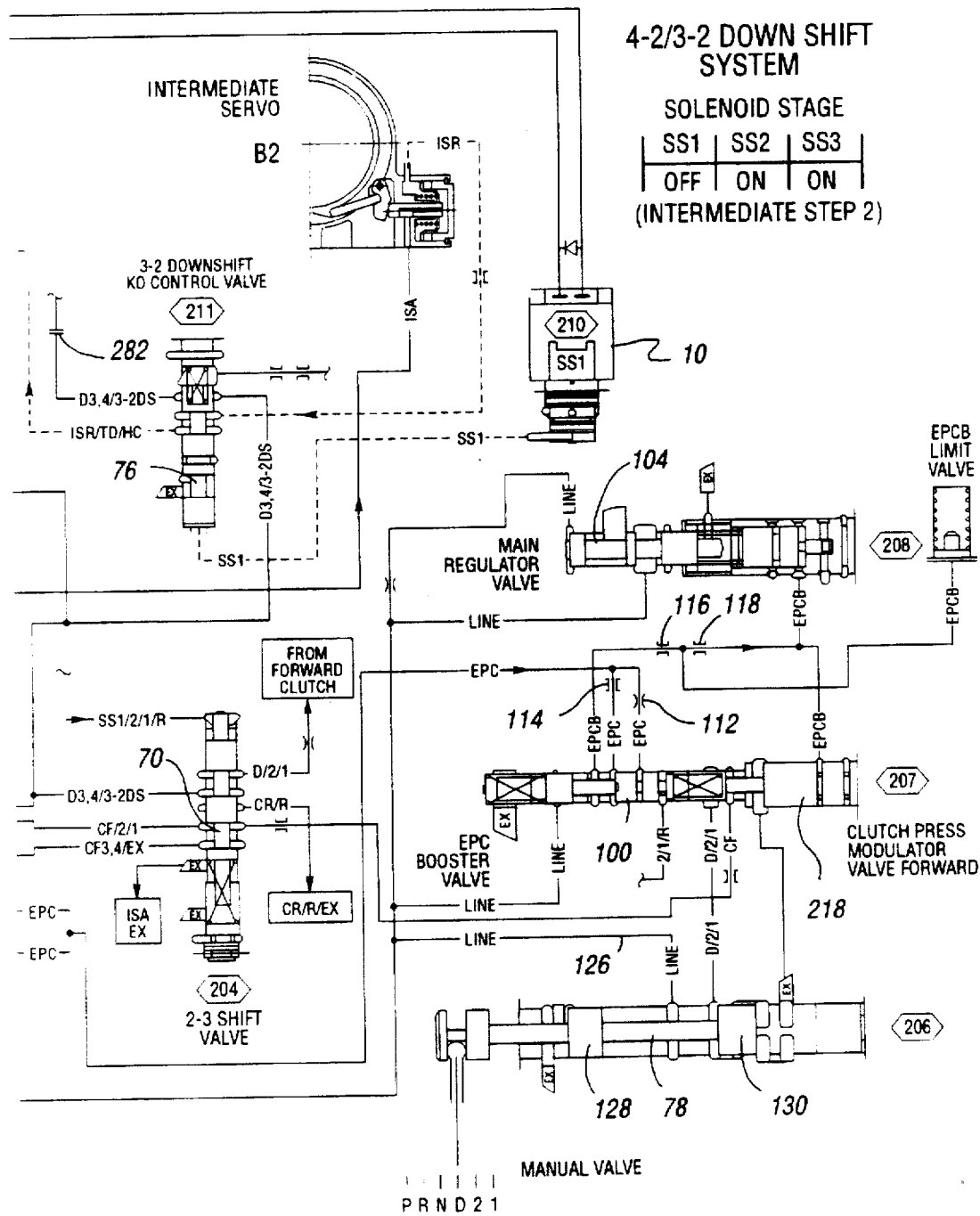

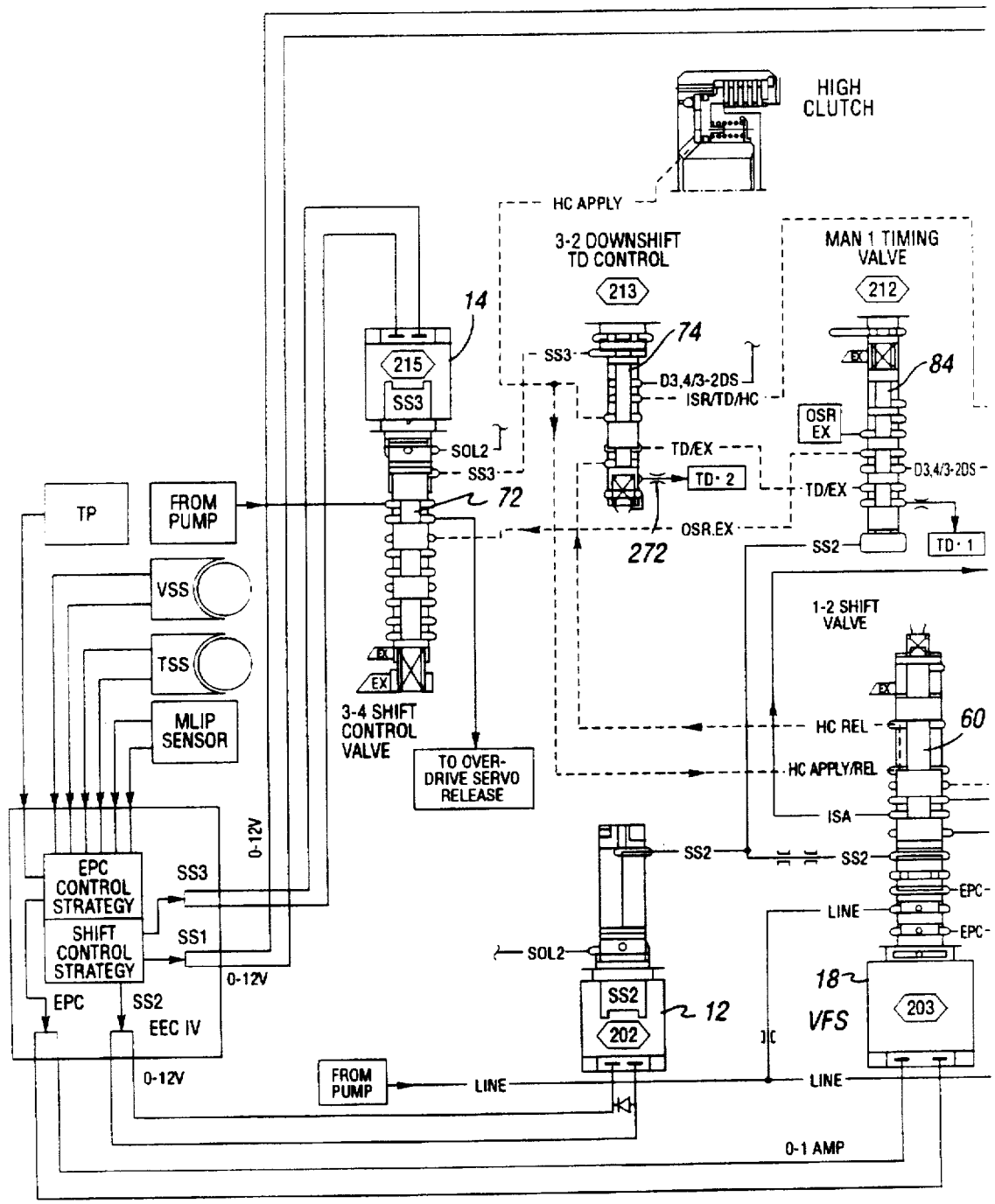
Fig. 38a-a

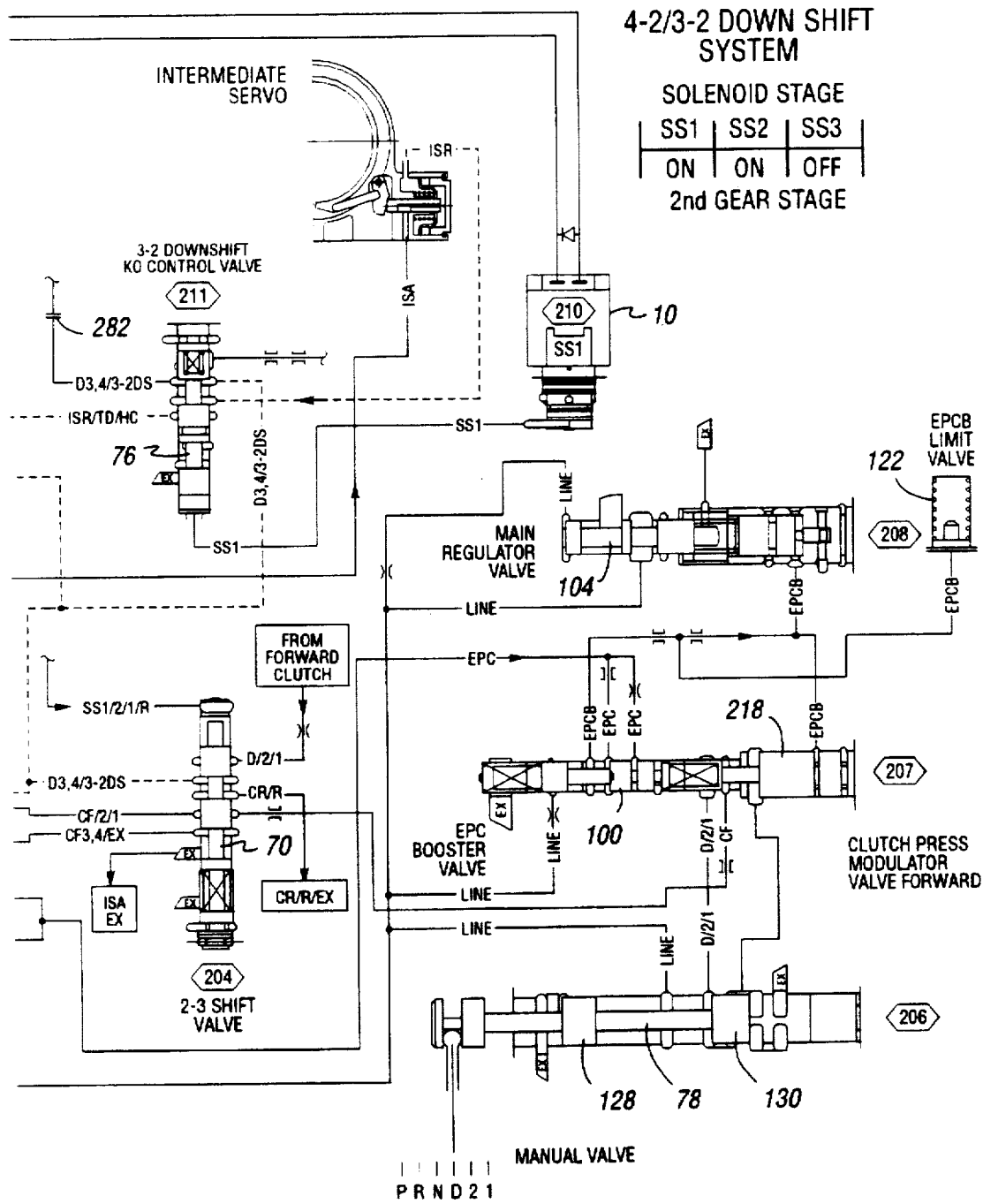
Fig. 38a-b

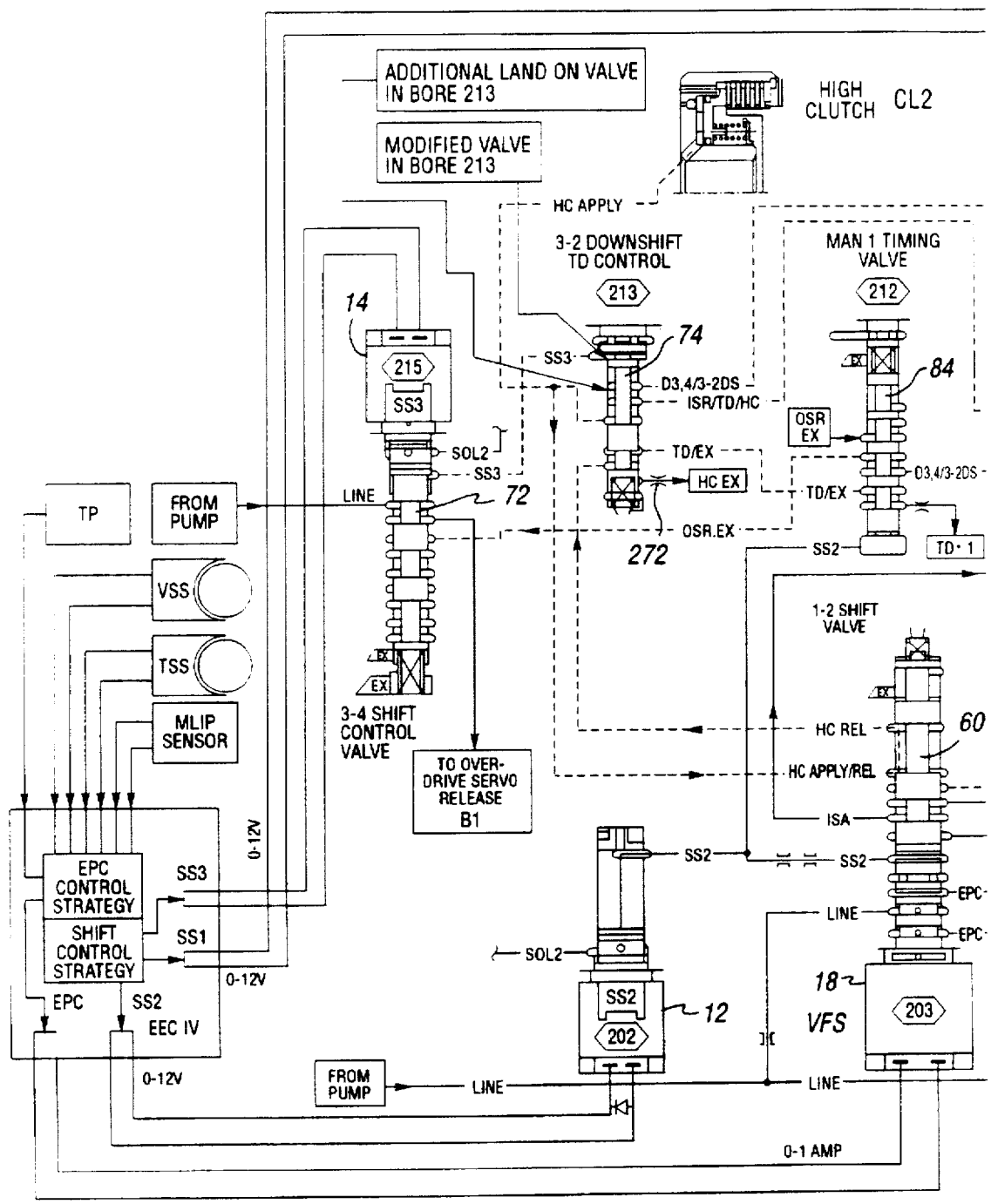
Fig. 38b-a

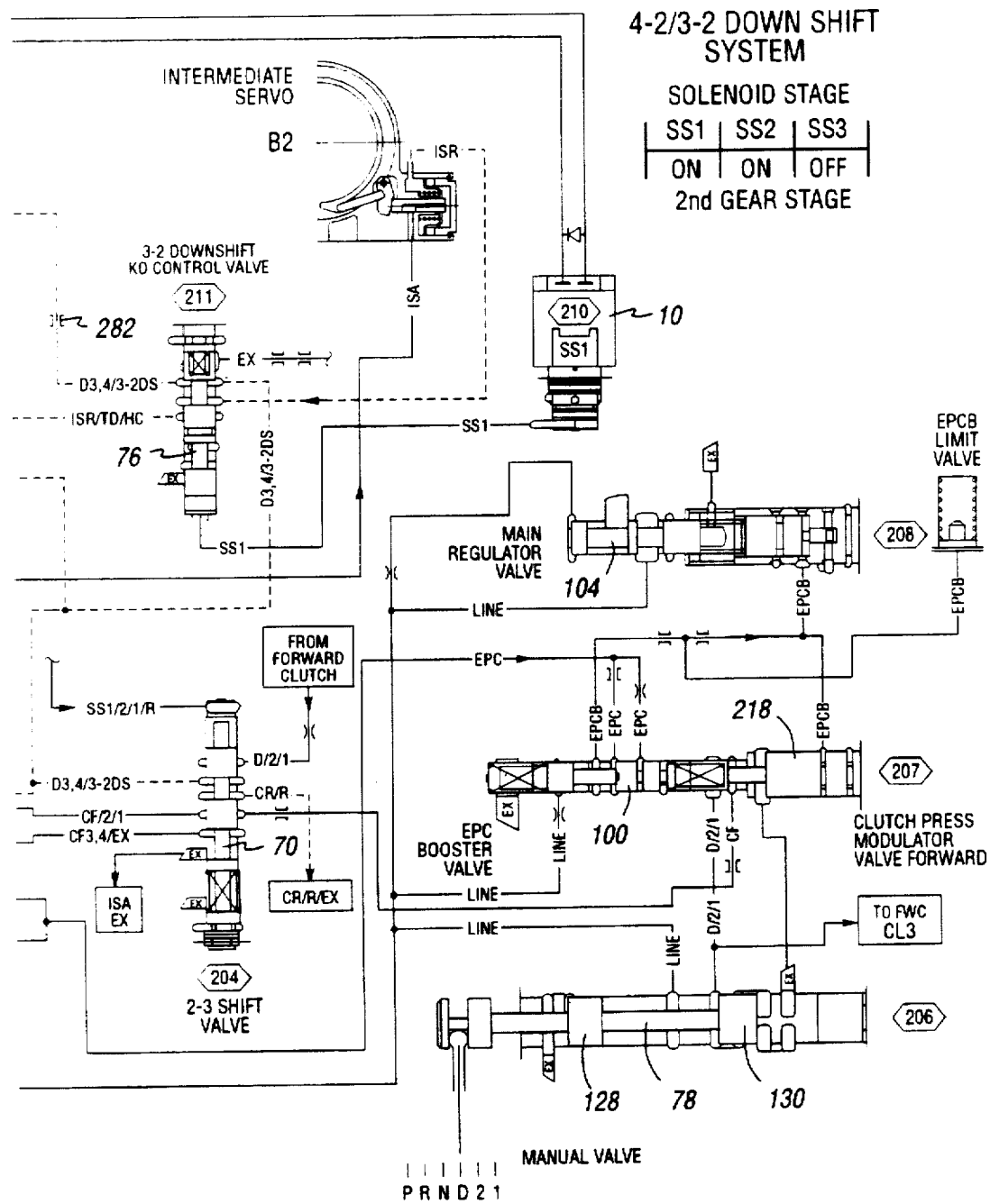
Fig. 38b-b

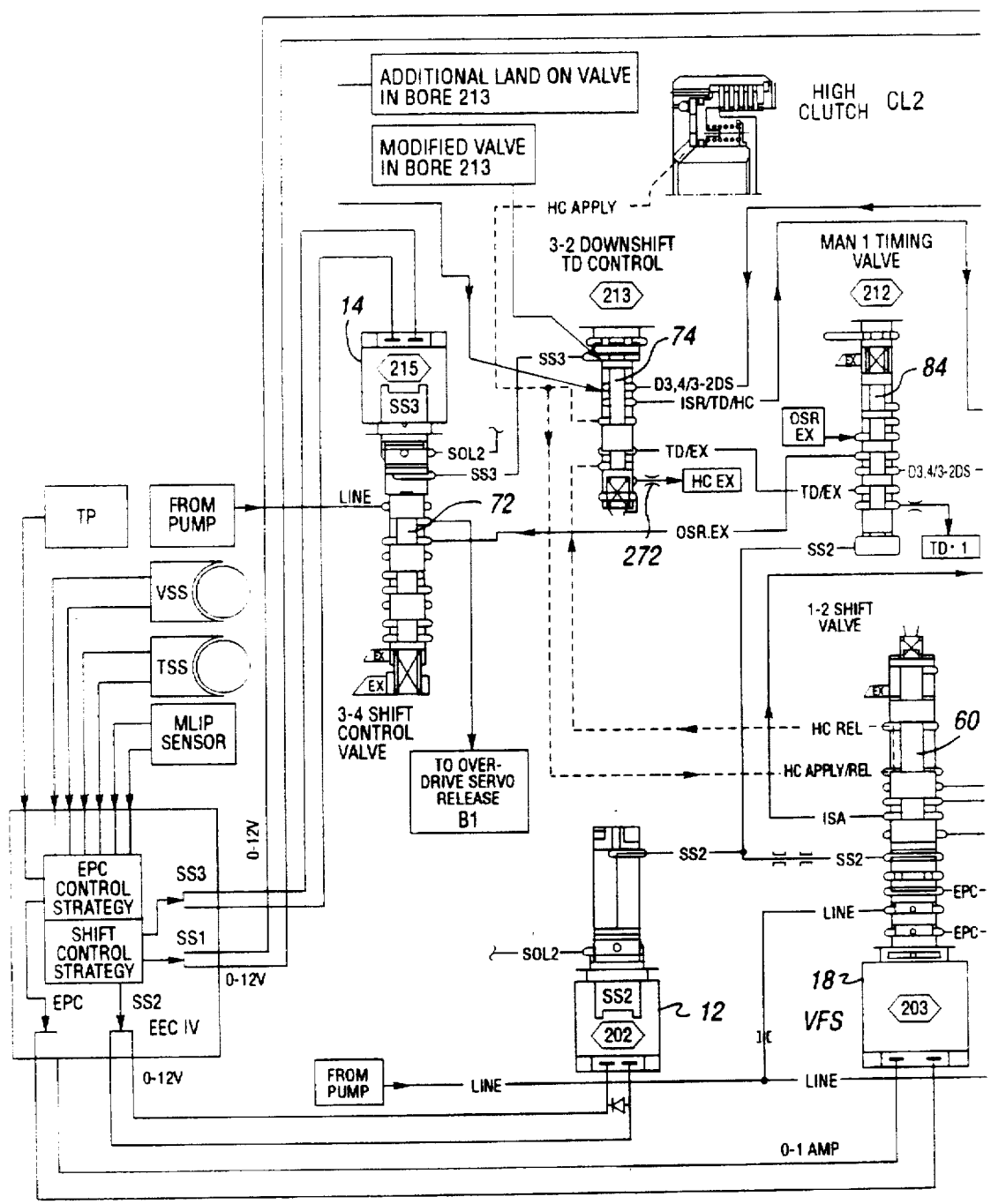
*Fig. 38c-a*

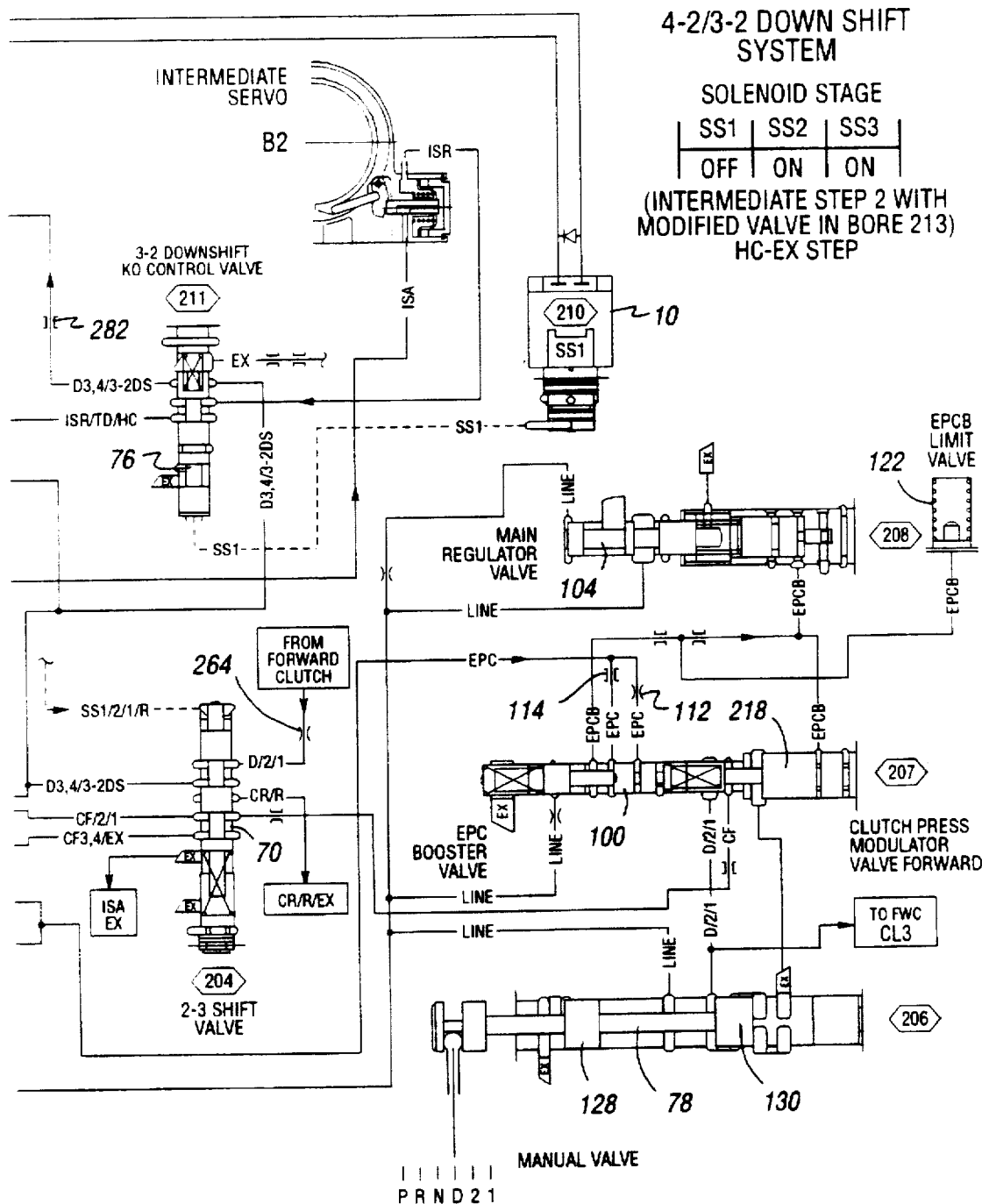
Fig. 38c-b

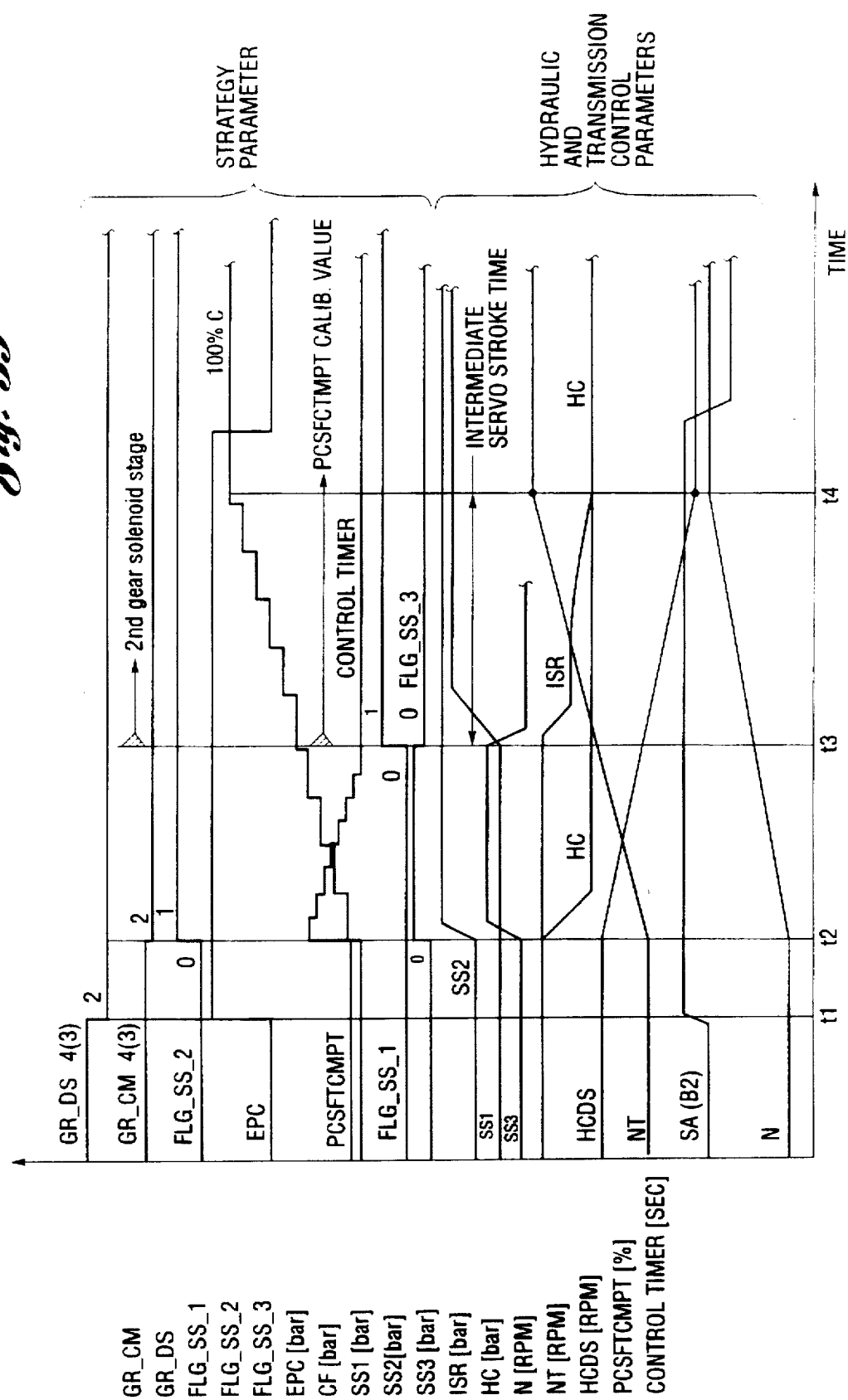

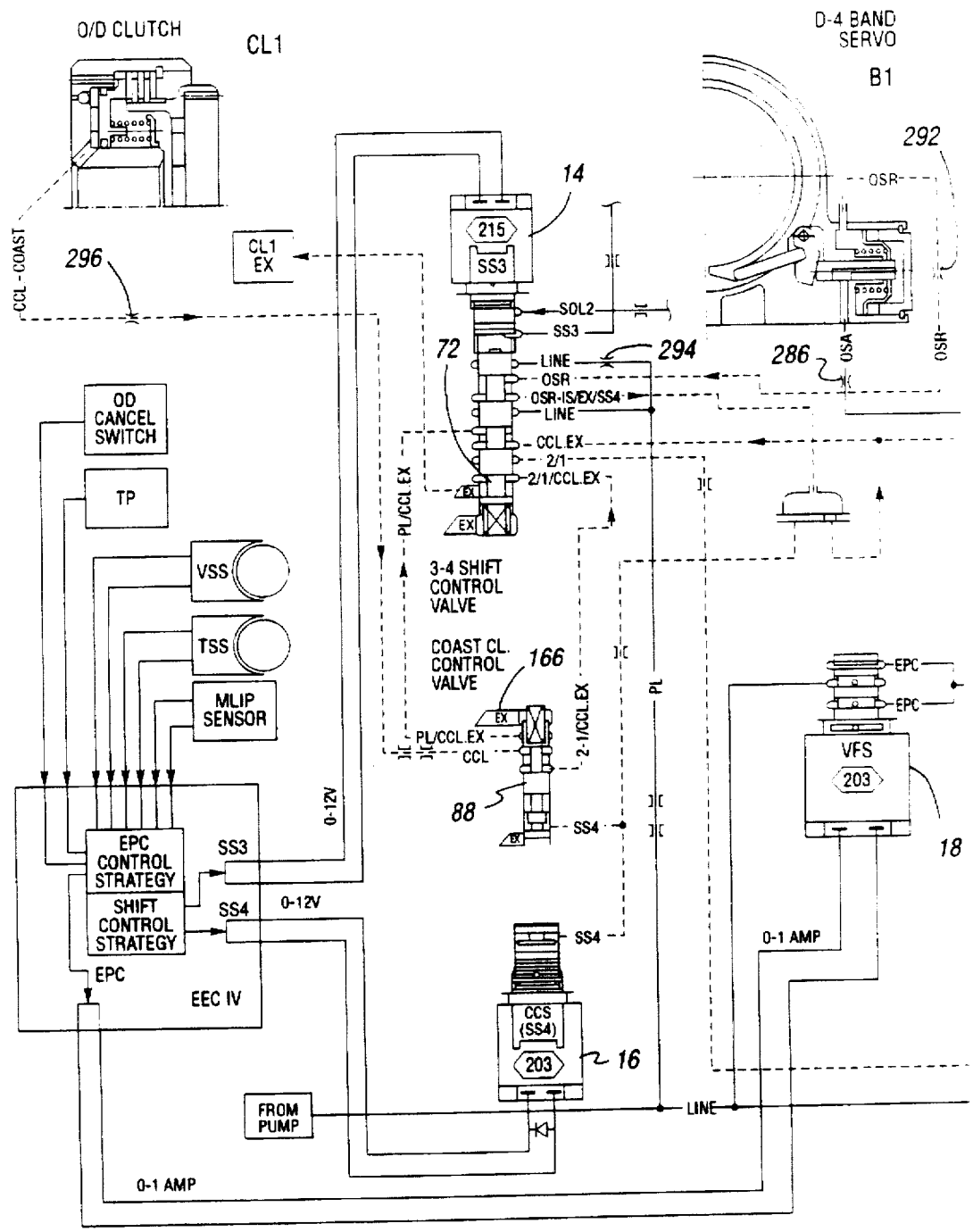
Fig. 44a-a

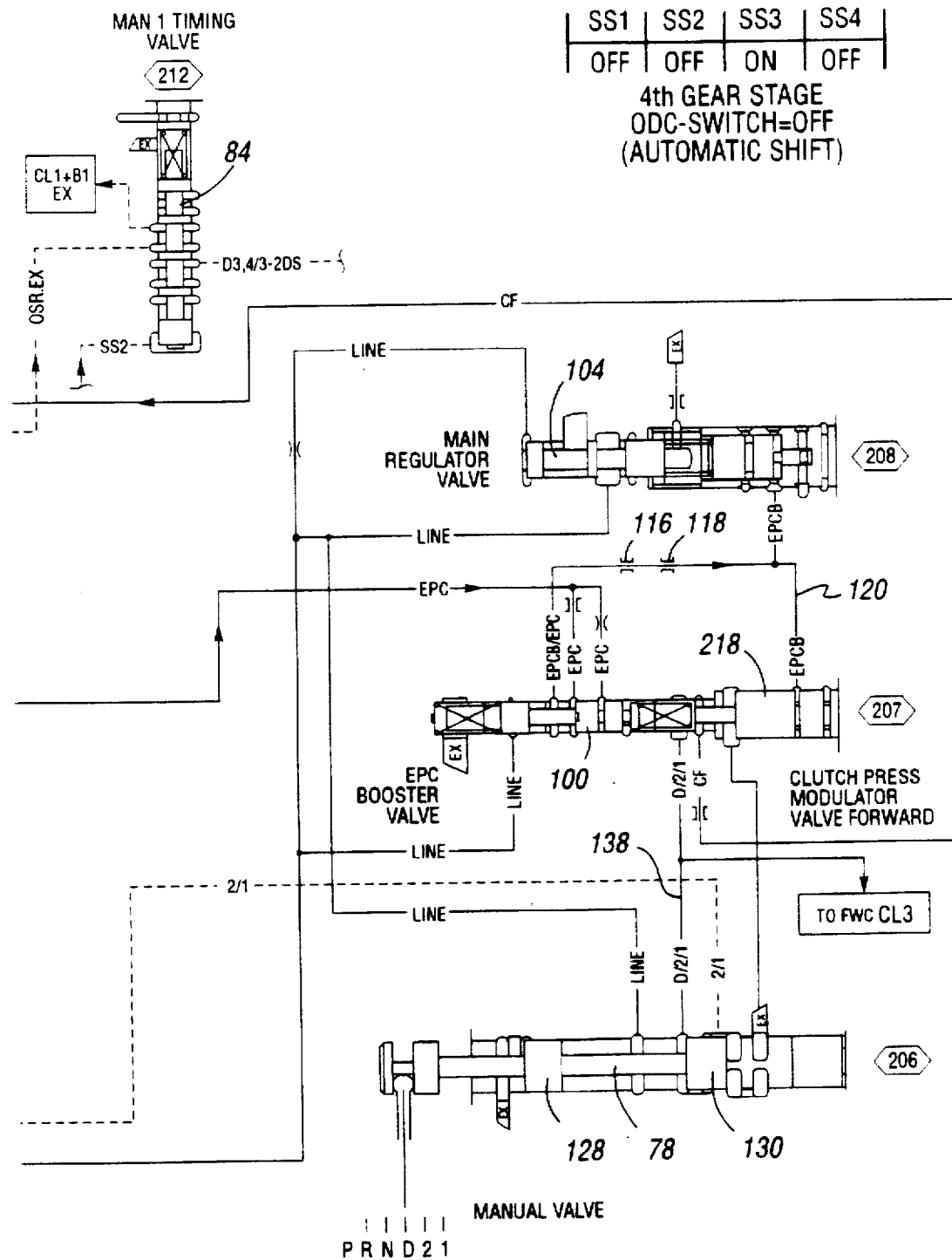
Fig. 44a-b

Fig. 44b-a
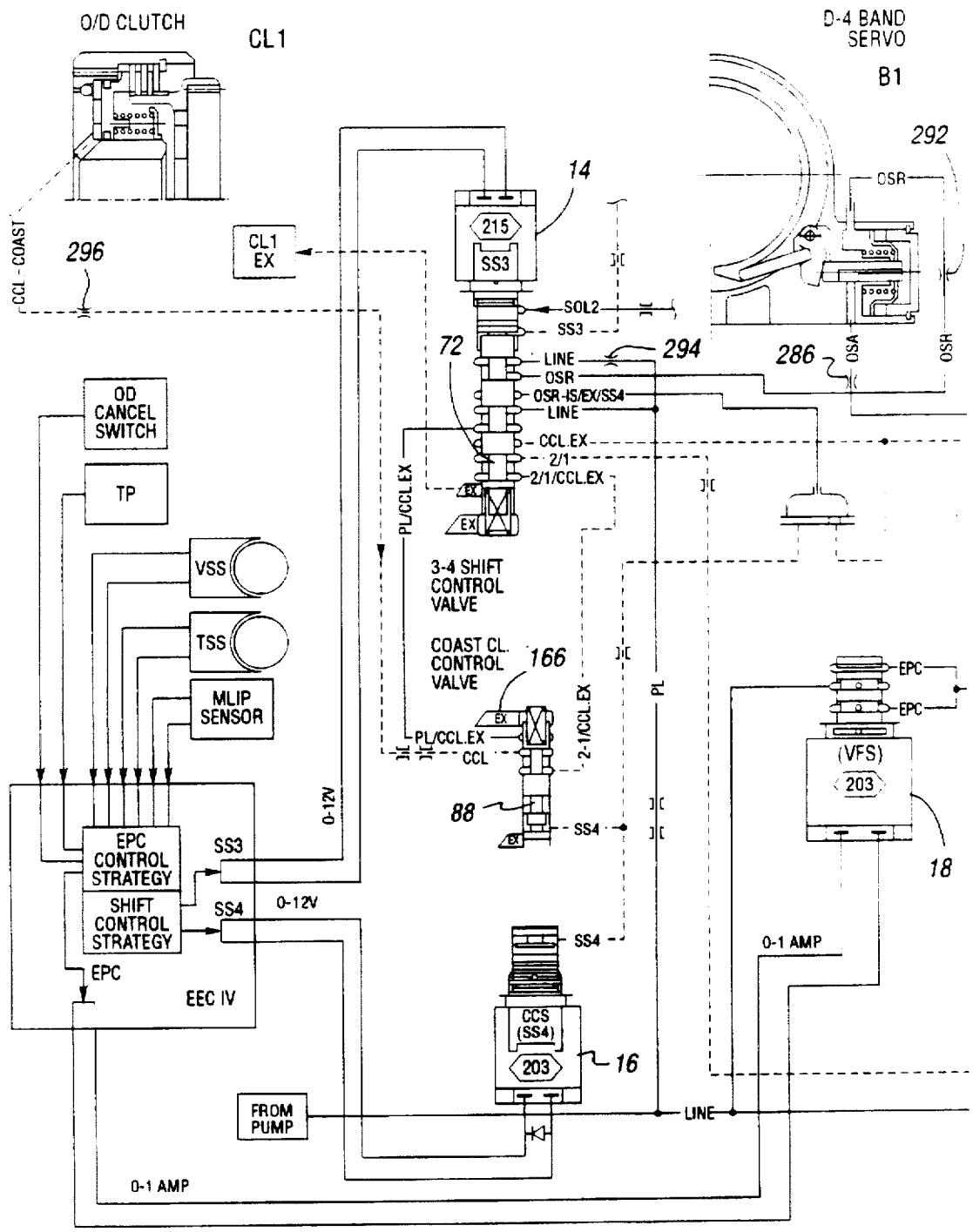

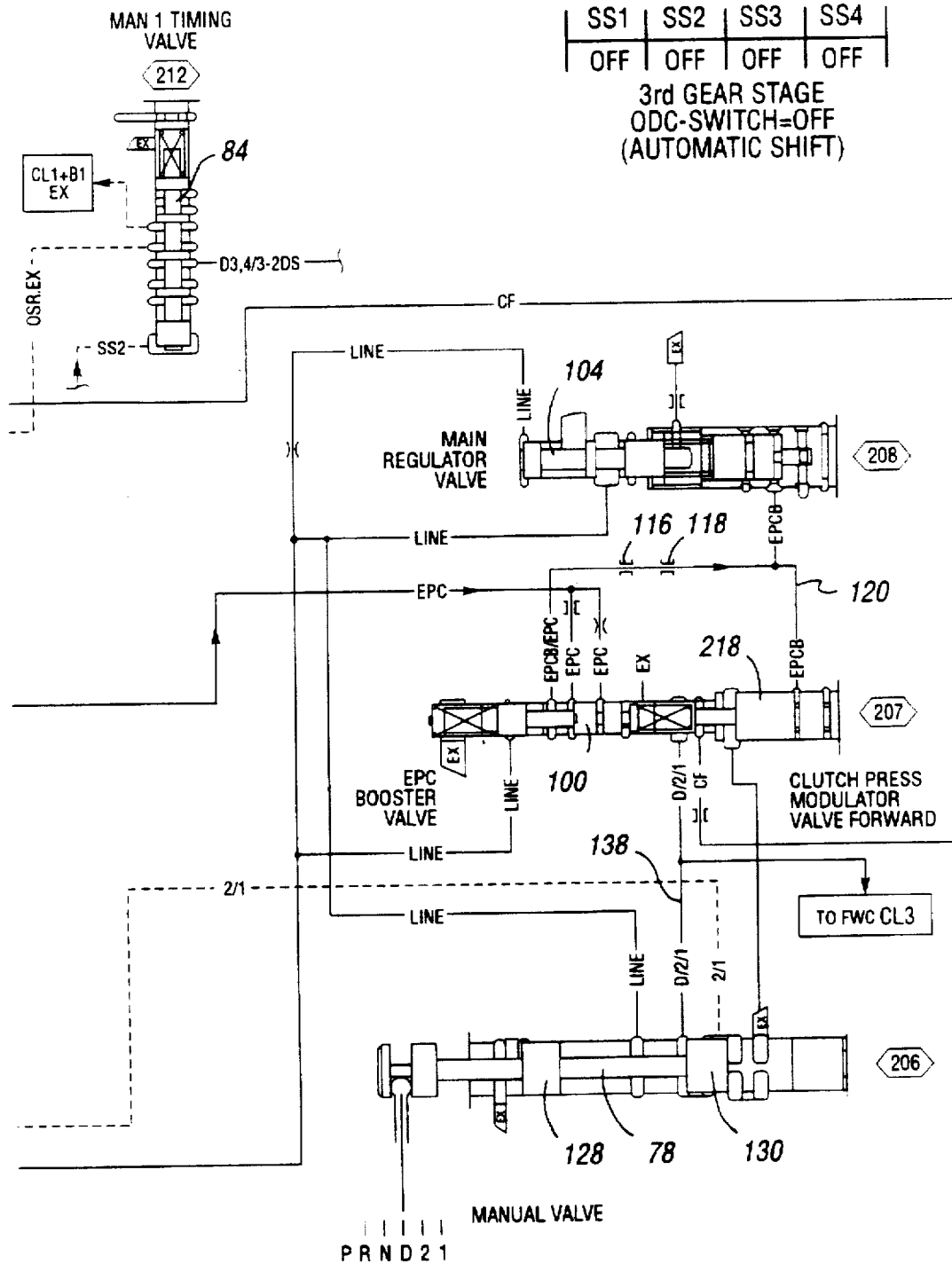
Fig. 44b-b

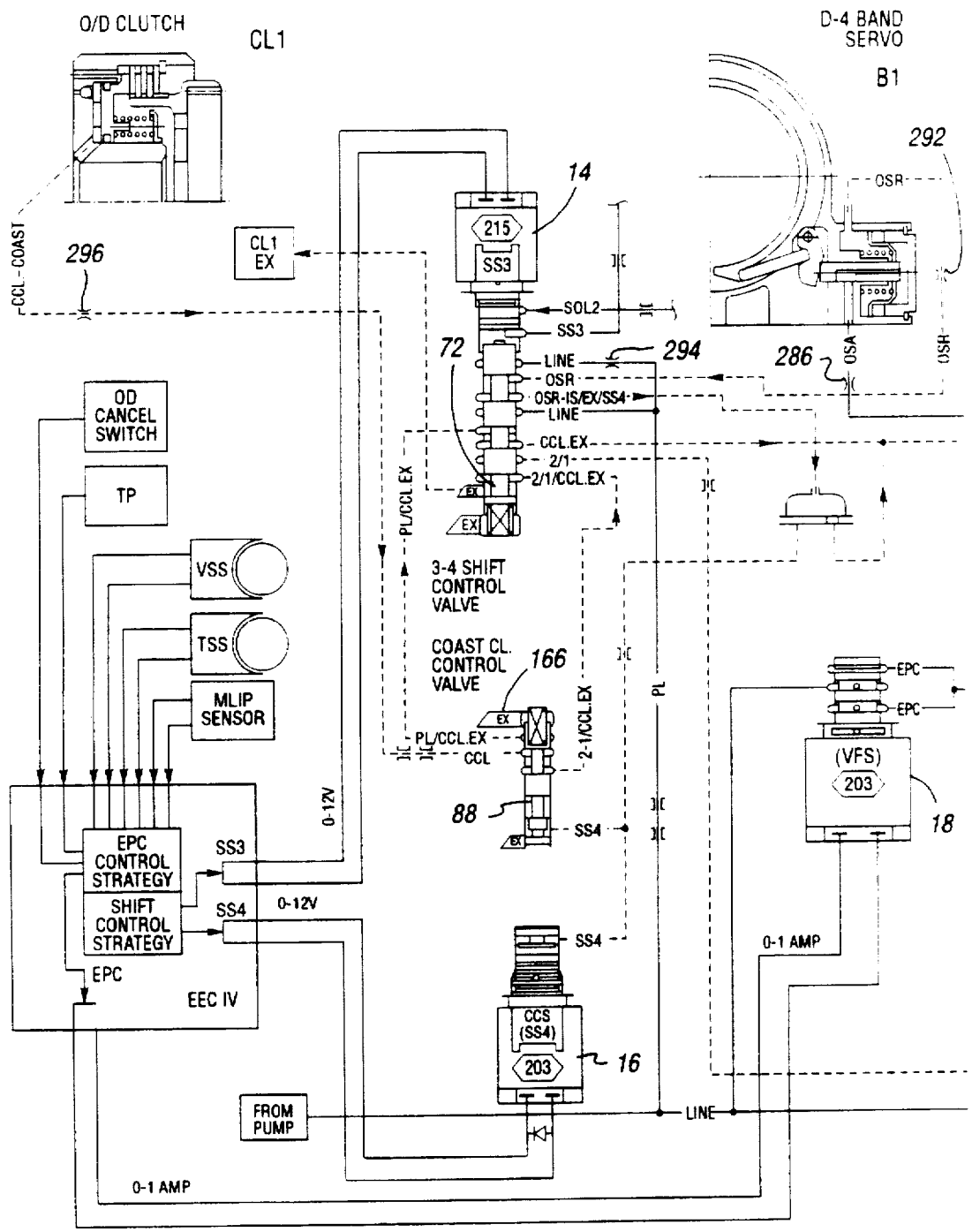
Fig. 44c-a

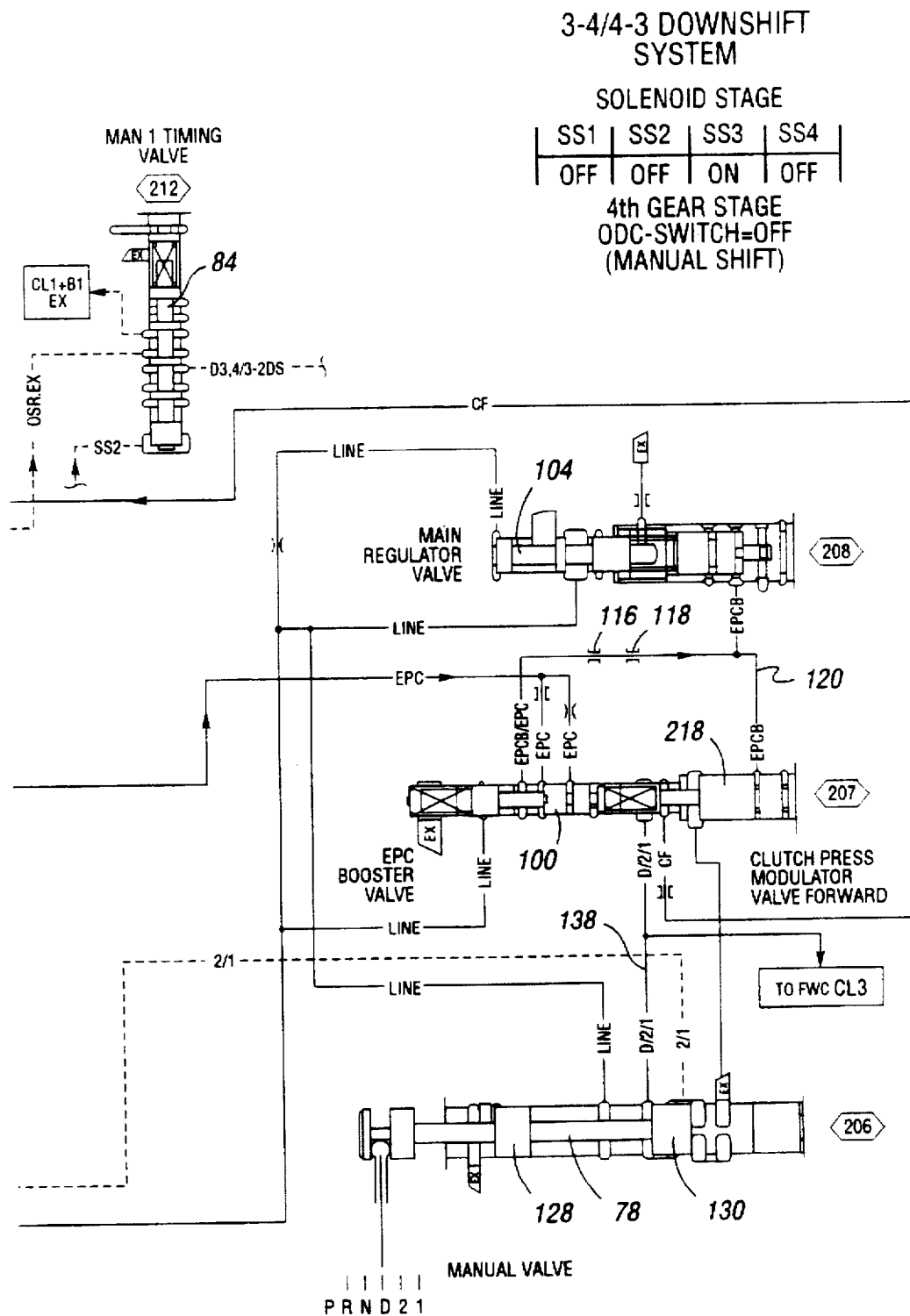
Fig. 44c-b

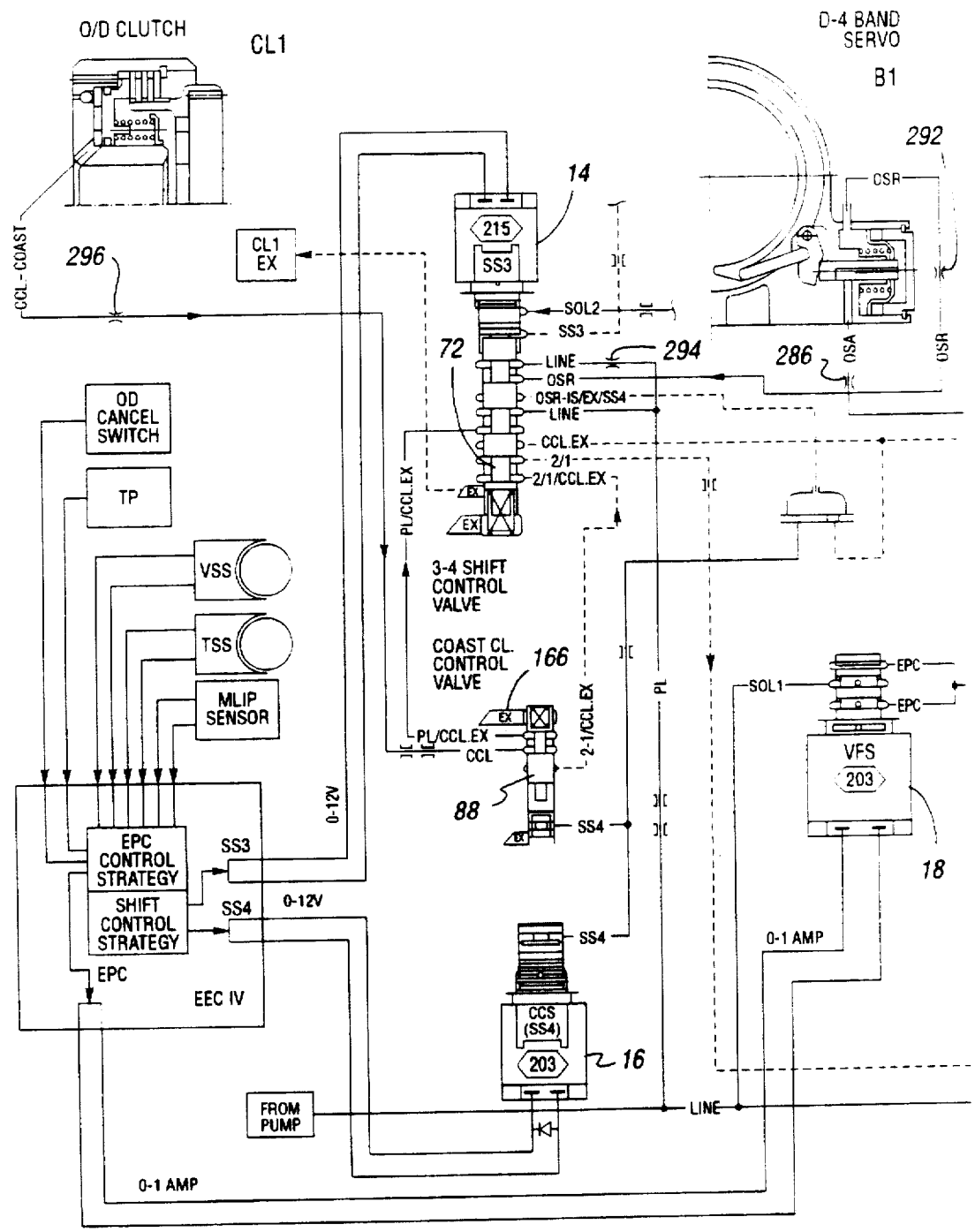
Fig. 44b-a

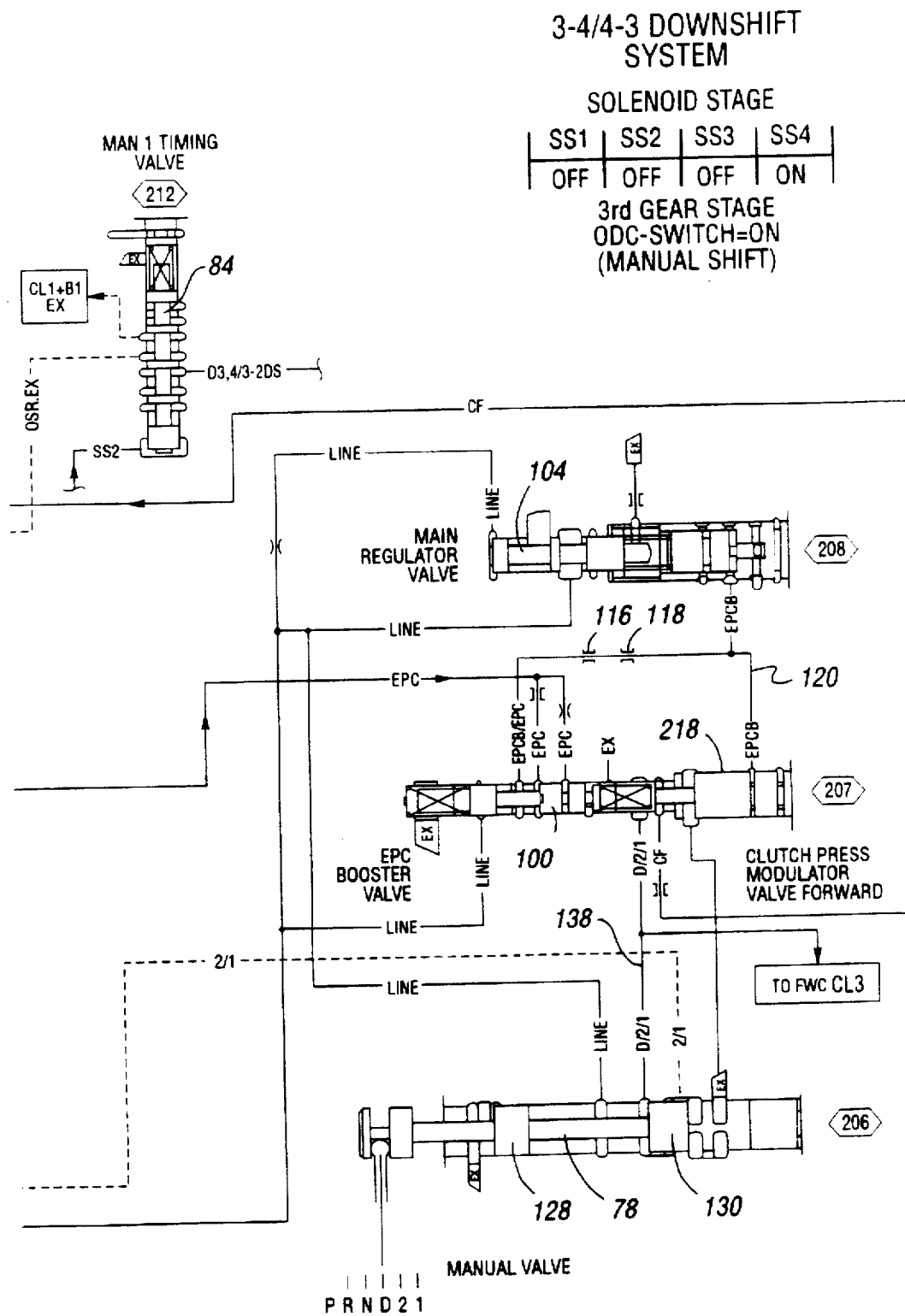
Fig. 44b-b

SHIFT CONTROL SYSTEM FOR A MULTIPLE RATIO AUTOMATIC TRANSMISSION

CROSS-REFERENCE TO RELATED APPLICATIONS

This is a divisional of application Ser. No. 08/509,571, filed on Jul. 31, 1995 now U.S. Pat. No. 5,646,842, which is a division of U.S. patent application Ser. No. 08/323,464, filed Oct. 14, 1994, abandoned, entitled "Multiple Ratio Automatic Transmission And Control System". It is related to U.S. patent application Ser. No. 08/434,235, filed May 4, 1995, entitled "Multiple Ratio Automatic Transmission And Control System". These applications are assigned to the assignee of the present invention and are hereby incorporated by reference.

TECHNICAL FIELD

The invention relates to multiple ratio transmissions for automotive vehicles and to electronic-hydraulic controls for effecting automatic ratio changes.

BACKGROUND AND SUMMARY OF THE INVENTION

Our invention is adapted to be used in a multiple ratio planetary transmission situated in a vehicle driveline having an internal combustion engine with a throttle control and a hydrokinetic torque converter situated between the engine and input elements of the gearing.

The gearing comprises two simple planetary gear units arranged in a manner similar to the gearing arrangement of the well-known Simpson gear set. Located between the turbine of the torque converter and the input elements of the Simpson gearing is a third simple planetary gear unit with a friction clutch adapted to connect two elements of the third gear unit together for rotation in unison. A friction brake also is used for anchoring a reaction element of the third planetary gear unit. An overrunning coupling establishes one-way torque flow between two elements of the gearing. The brake is arranged in series relationship with respect to the clutch.

A second overrunning coupling in a gear unit of the Simpson gearing is used for the purpose of establishing non-synchronous ratio shifts. Forward engagement is achieved by engaging a forward clutch on a shift from neutral to a drive state. Similarly, a separate reverse engagement clutch is used to establish a torque flow path for reverse. In each instance, turbine speed is used as a feedback signal to initiate the start of the forward or reverse engagement.

Ratio changes between the first ratio and the second ratio on an upshift, as well as on a downshift from the second ratio to the first ratio, are achieved in our improved transmission by controlling the engagement and release of an overrunning coupling. The overrunning clutch is arranged in series relationship with respect to a friction brake as a reaction torque flow path for the friction brake associated with the intermediate ratio is established and disestablished. The braking of the friction brake is accomplished with a closed loop control so that harshness is avoided as the overrunning elements of the reaction torque flow path engage. This is in contrast to prior art arrangements, such as that shown in U.S. Pat. No. 5,157,608, where a non-synchronous shift using overrunning couplings is achieved without the cushioning effect made available by the present invention as the associated friction brake is actuated.

Our improved control system controls a 2-1 downshift, for example, by controlling the disengaging element, which is an intermediate ratio brake band, and engaging the overrunning coupling for low ratio. The overrunning coupling engagement is controlled by partially holding the clutch torque over the downshift interval, and it does this in a closed loop fashion.

Ratio changes between higher ratios are controlled in our improved transmission by controlling the application and release of brake servos in two operating steps rather than a single step. The ratio shift that requires the application of the intermediate servo on a 3-2 downshift or a 4-2 downshift, for example, is achieved using two intermediate steps following the command of a shift until the completion of the shift. This is done by having a set of flow control orifices in communication with the intermediate servo during a downshift in the first step that is different than the orifice selection introduced during the downshift in the second step. Ratio changes between overdrive ratio and direct drive ratio and downshifts from overdrive ratio to intermediate ratio involve the control of the overrunning coupling for overdrive. This control strategy distinguishes the present invention from the control strategy for the transmission described in U.S. Pat. No. 5,383,825, issued Jan. 24, 1995, to Joseph E. El-Khoury, Frank W. Timte, Edmond R. League, and Gerard P. Kuchta. That patent is assigned to the assignee of the present invention.

Features of the control strategy shown in U.S. Pat. No. 5,383,825 have been applied in our improved transmission to control ratio changes between third and fourth ratio and between first and second ratio wherein one input parameter for the ratio change controller is the percentage of shift completion. The control system includes a forward clutch pressure modulator valve that acts in cooperation with a 1-2 upshift valve to establish an accumulator effect that cushions the application of the intermediate speed ratio servo. Intermediate servo apply pressure is established as the clutch modulator valve feeds pressure through a control orifice to the apply side of the intermediate servo as the exhaust side of the servo is exhausted through a reverse engagement control valve and reverse engagement modulator. In the case of a 2-1 downshift, the shift solenoid is deactivated causing the 1-2 shift valve to move to the downshift position. Intermediate servo apply pressure then is released through the 1-2 upshift valve and the 2-3 upshift valve to an exhaust port. This causes the intermediate servo to lose capacity.

The pressure made available to the intermediate servo by the forward clutch modulator valve can vary from zero to the maximum stall pressure. Thus, low capacity as well as high capacity 1-2 shifts can be executed. The point at which the inertia phase of the shift begins is dependent on the magnitude of the forward clutch modulator pressure, which is readily calibrated. Thus, a limited amount of slip during a shift can be achieved with a minimum transient torque disturbance during the shift. This is equivalent to an accumulator system of the conventional type in which an accumulator piston would be installed on the release side of the intermediate servo. A fast release of oil from the intermediate servo is prevented. This accumulator feature is entirely electronically controlled by means of software.

On a 2-3 upshift, the control system relies upon a 3-2 downshift KD control valve that connects the intermediate servo release pressure chamber with the high clutch and prevents a pre-filling of the intermediate servo release chamber. The high clutch and the intermediate servo are exhausted through the 3-2 downshift TD control valve (and/or the MAN1 timing valve) during a 3-2 downshift.

The transmission assumes its intermediate stage for a calibratable amount of time thus establishing an electronic accumulator effect. The pressure on the intermediate servo release side can be varied from zero to a corresponding maximum high clutch modulated capacity.

The separate downshift steps on a 3-2 downshift reduces the complexity of the control assembly by applying pressure from the clutch pressure modulator valve to the intermediate servo apply side. Any capacity requirement can be achieved on the high clutch. Only two shift valves are required to accomplish the two different stages as two different orifice sizes for a 3-2 downshift are used, the two shift valves controlling the pressure flow pattern through the orifices of various sizes.

On a 4-3 shift, the electronic control system controls the overdrive band capacity upon engagement of an overrunning coupling which transmits torque during third ratio. On a 4-3 downshift, in order to improve shift feel, the torque flow components ahead of the overrunning coupling are accelerated until the overrunning clutch engages. The overdrive band capacity during the downshift at the engagement point for the overrunning coupling will be reduced. When the overdrive band is completely released, the overrunning coupling will carry full input torque.

On a 3-4 shift, modulated pressure from the clutch pressure modulator valve is applied to the overdrive servo and the pressure will vary from zero to a maximum stall pressure. When the inertia phase begins during a 3-4 upshift, the output shaft torque characteristic is totally dependent on the magnitude of the clutch pressure modulator pressure characteristic. A minimum torque disturbance is achieved with a limited amount of slip during the shift by controlling the clutch pressure modulator valve output pressure. This accumulator function is achieved without the requirement for adding hardware elements, such as an accumulator piston and accumulator spring as in conventional control systems.

The accumulator effect is achieved entirely electronically by means of software on both a 2-1 downshift and a 4-3 downshift. The percentage shift completion value during a shift is monitored, and the duration of an electronic pressure control ramp is determined electronically by the microprocessor using the value for the percentage of shift completion as an input. The overdrive servo is allowed to hold partial torque during the inertia phase of a 4-3 downshift, thereby improving the clutch engagement quality for the associated overrunning coupling.

The multiplexing of the functions of the pressure modulator valve for forward drive, the shift solenoid valves, the orifices and timing valves reduce the complexity of the valve system needed to achieve control of ratio changes between overdrive ratio and intermediate speed ratio and between low speed ratio and intermediate speed ratio. These different control functions are achieved with common valve components.

BRIEF DESCRIPTION OF THE DRAWINGS

FIGS. 3b–3e is a schematic valve diagram of the control system;

FIG. 4 is a chart showing the relationship between speed and time during a shift interval as well as torque for the transmission components during the shift interval, the shift interval involved being a 1-2 upshift;

FIG. 5 is a view similar to FIG. 4, but it describes a 2-1 downshift;

FIG. 12b is a chart showing the variable force solenoid transfer function for the valve of FIG. 12a;

FIGS. 18a-a and 18a-b (hereinafter referred to collectively as FIG. 18a) and FIGS. 18b-a and 18b-b (hereinafter referred to collectively as FIG. 18b) are an enlargement of a portion of the circuit of FIGS. 3b–3d showing the 1-2 upshift controls;

FIG. 20 is a 1-2 upshift timing diagram;

FIGS. 22a-a and 22a-b (hereinafter referred to collectively as FIG. 22a) and FIGS. 22b-a and 22b-b (hereinafter referred to collectively as FIG. 22b) are an enlargement of the circuit of FIGS. 3b–3d showing the 2-3 upshift system;

FIG. 28a-a and FIG. 28a-b (hereinafter referred to collectively as FIG. 28a) are an enlargement of the control system of FIGS. 3b–3d showing the 3-2 downshift control second gear stage;

FIG. 28b-a and FIG. 28b-b (hereinafter referred to collectively as FIG. 28b) are an enlargement of the control system of FIGS. 3a–3d showing the 3-2 downshift control intermediate step 1;

FIG. 32a-a and FIG. 32a-b (hereinafter referred to collectively as FIG. 32a) is an enlargement of the control system of FIGS. 3b–3d showing the 4-2, 3-2 downshift control intermediate step 2;

FIG. 38a-a and FIG. 38a-b (hereinafter collectively referred to as FIG. 38a) are an enlargement of the control system of FIGS. 3b–3d showing a 4-2, 3-2 downshift control second gear stage;

FIG. 38b-a and FIG. 38b-b (hereinafter collectively referred to as FIG. 38b) are an enlargement of the control system of FIGS. 3b–3d showing the 4-2, 3-2 downshift control second gear stage with a modified 3-2 downshift control valve;

FIG. 38c-a and FIG. 38c-b (hereinafter collectively referred to as FIG. 38c) are an enlargement of the control system of FIGS. 3b–3d showing the 4-2, 3-2 downshift control with an intermediate step and with a modified 3-2 downshift control valve;

FIG. 39 shows a 3-2 downshift timing diagram using open loop or closed loop control;

FIG. 44 shows a 4-3 downshift control logic actuated with the overdrive cancel switch on;

FIG. 44a-a and FIG. 44a-b (hereinafter collectively referred to as FIG. 44a) show an enlargement of the control system of FIGS. 3b–3d showing the 3-4, 4-3 controls for the fourth gear stage with the overdrive cancel switch off;

FIG. 44b-a and FIG. 44b-b (hereinafter collectively referred to as FIG. 44b) are an enlargement of the control system of FIGS. 3b–3d showing the 3-4, 4-3 controls for the third gear stage with the overdrive cancel switch off;

FIG. 44c-a and FIG. 44c-b (hereinafter collectively referred to as FIG. 44c) are a view similar to FIGS. 44a-a and 44a-b, but they include a manual shift rather than the automatic shift of FIGS. 44a-a and 44a-b;

FIG. 44d-a and FIG. 44d-b (hereinafter collectively referred to as FIG. 44d) are similar to FIGS. 44a-a and 44a-b, but they include a manual shift rather than the automatic shift of FIGS. 44a-a and 44a-b;

FIG. 47 shows a 4-3 downshift timing diagram actuated with the overdrive cancel switch on.

PARTICULAR DESCRIPTION OF THE INVENTION

General Overview

The electronic control system for the transmission of our invention is a hybrid system wherein solenoids, actuated by an electronic microprocessor, control gear selection, converter clutch operation and system pressure buildup. The friction elements (bands and clutches) are applied and released by hydraulic pressure determined by a hydraulic control unit (main control assembly). This hydraulic control unit contains 4 shift solenoids, shift valves, one variable force solenoid, one PWM-solenoid and pressure modulator valves.

Figure 3A:
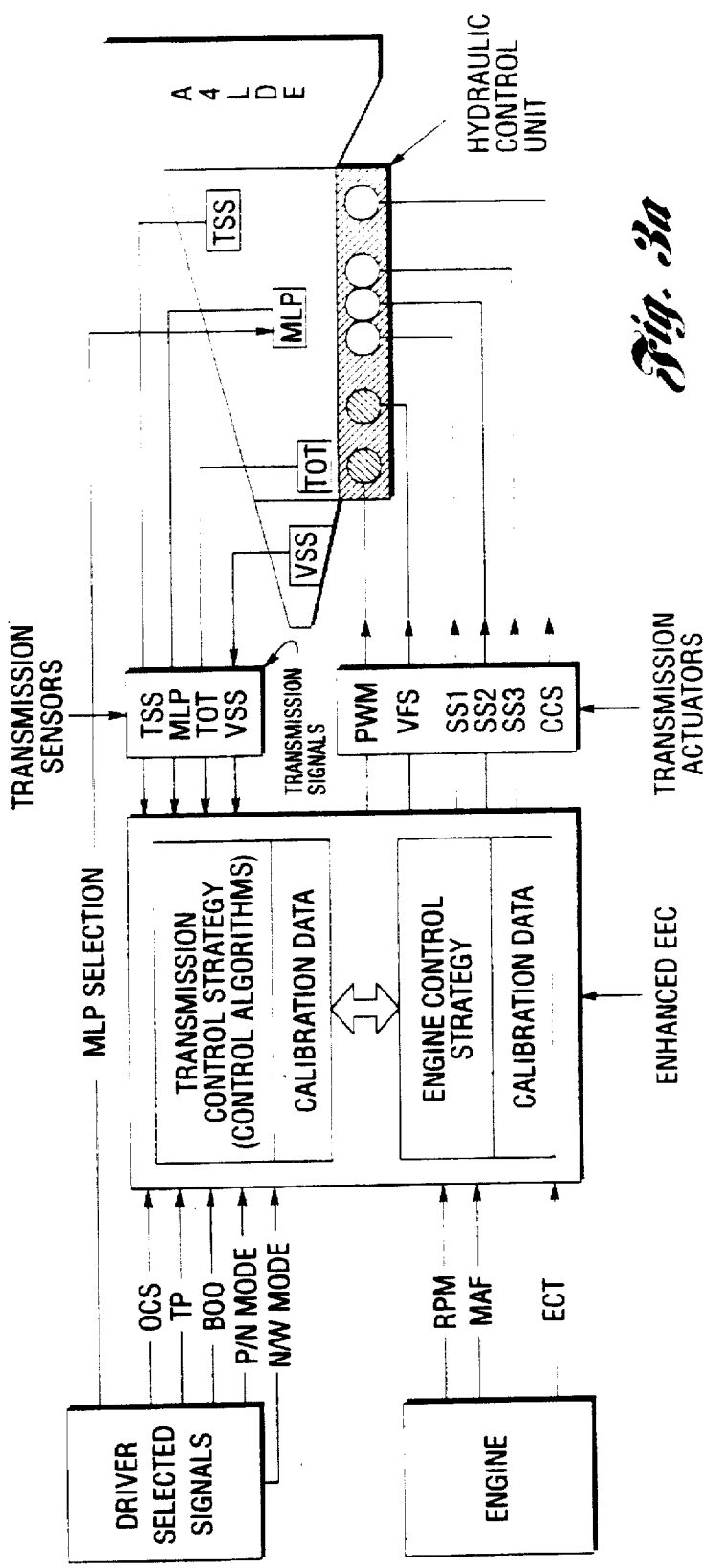
FIG. 3a is a schematic representation of the overall signal flow path for the electronic controller as the transmission control strategy executes control algorithms based on input information from the driver, the transmission, and from the engine itself.

The transmission control strategy is based on various signal inputs generated from the driver, engine and transmission, for each operating condition. FIG. 3a shows a signal flow overview for the transmission. The following signals, as seen in FIG. 3a, are used during execution of the transmission control strategy:

A) Driver
   OCS, TP, BOO, P/N Mode, N/W Mode
B) Transmission:
   VSS, TSS, MLP, TOT
C) Engine:
   N, MAF, ECT.

Figure 1:
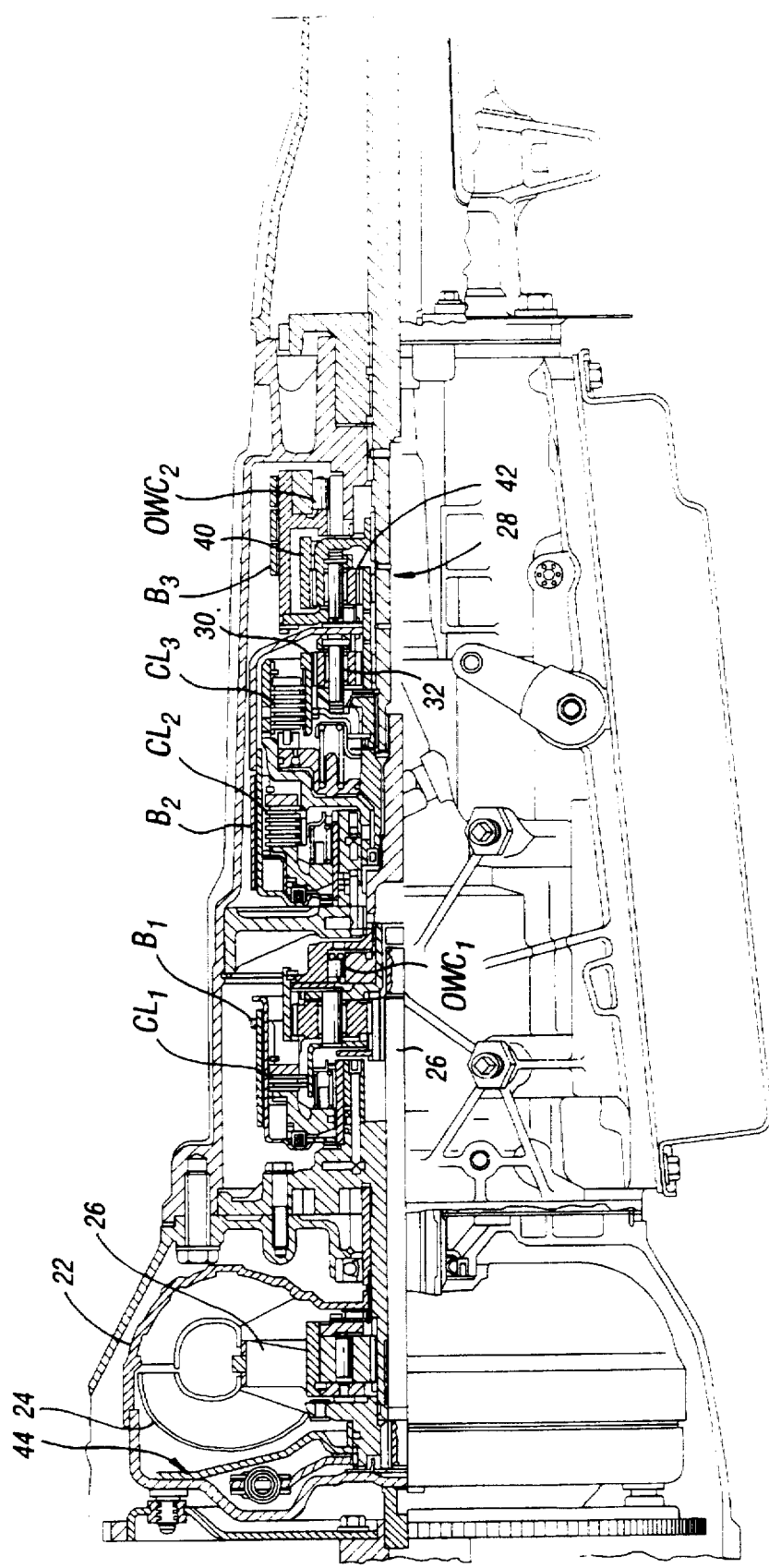
FIG. 1 is a cross-sectional view of a geared planetary transmission adapted to be controlled by our improved control system.
Figure 3B:
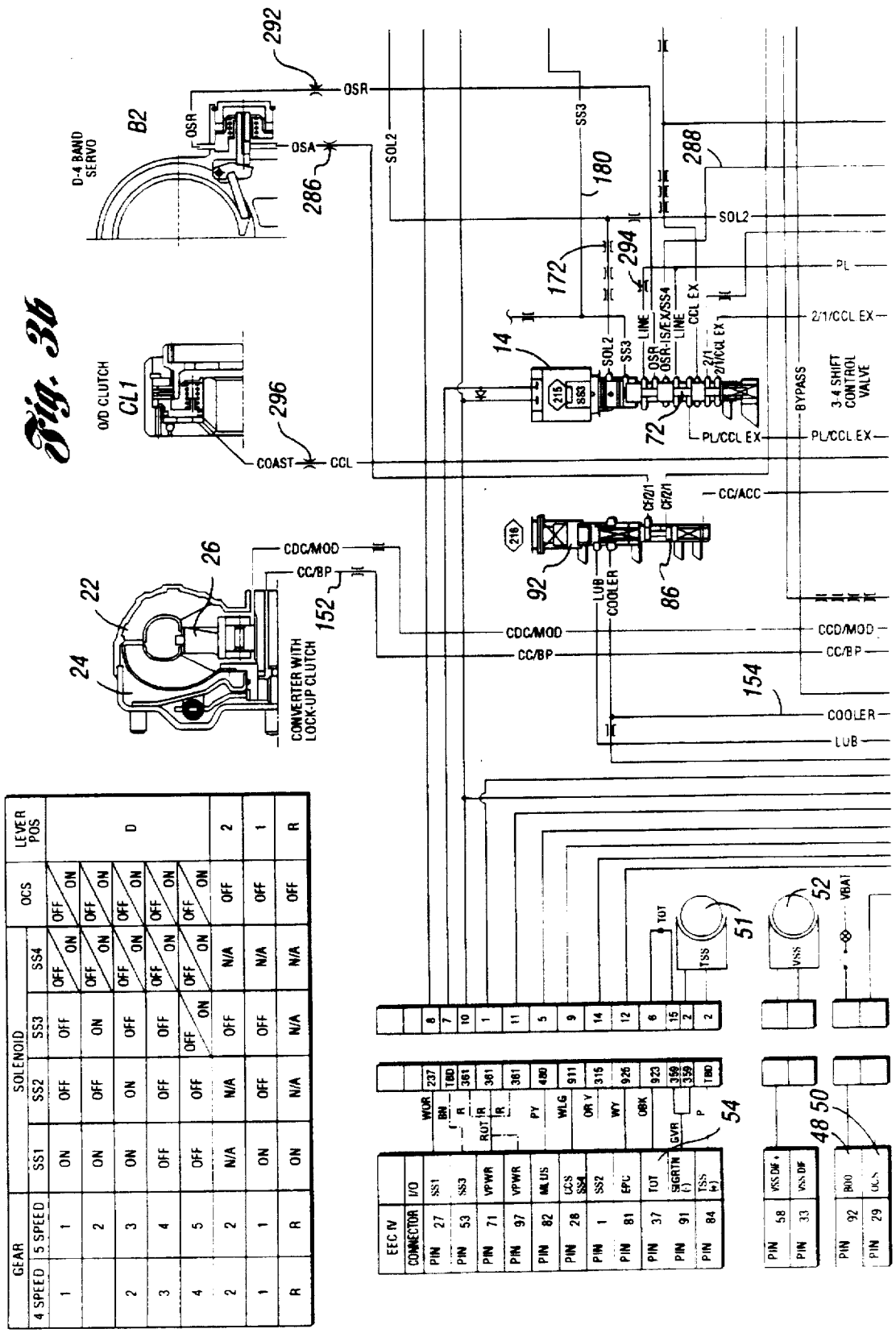
Figure 3C:
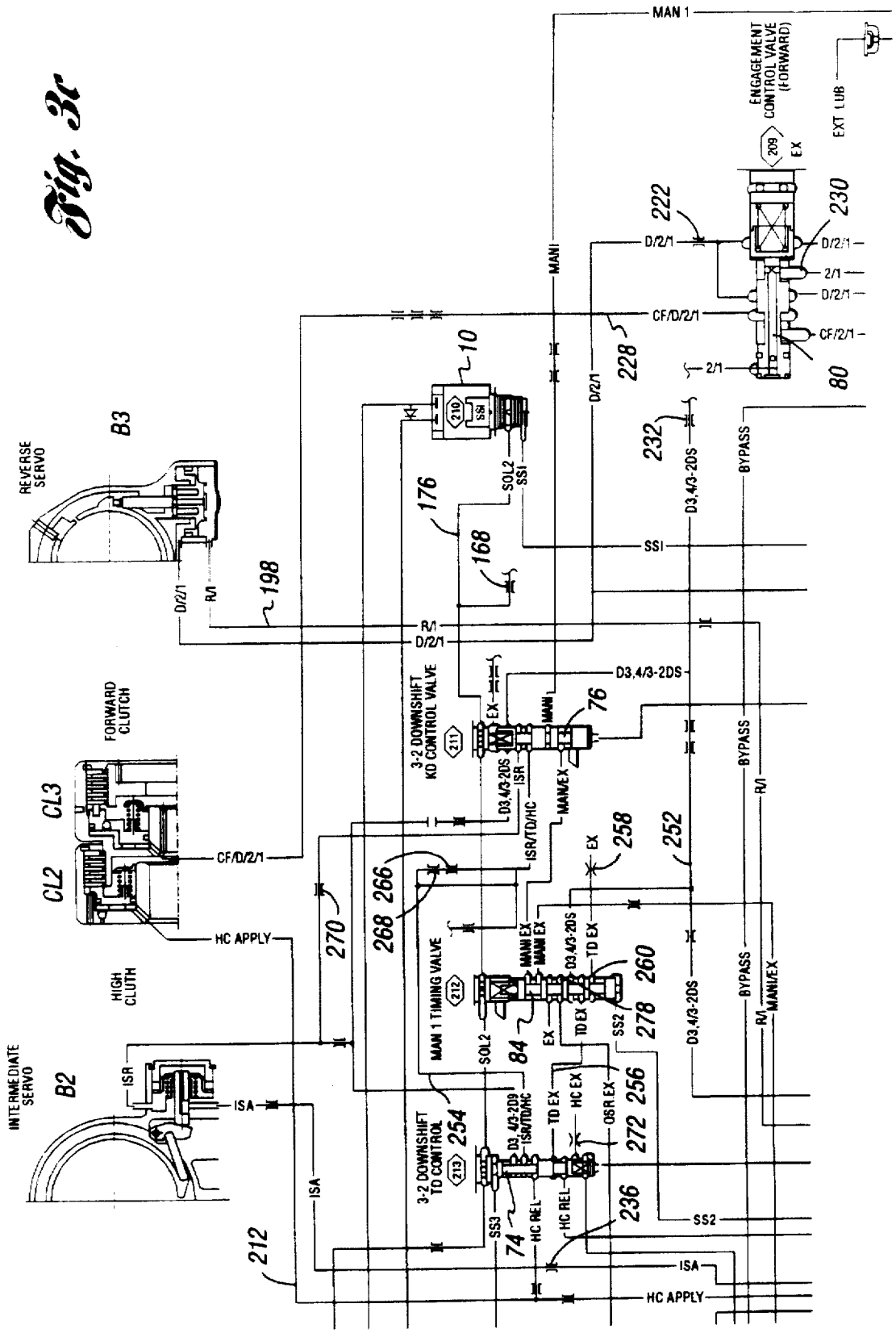
Figure 12A:
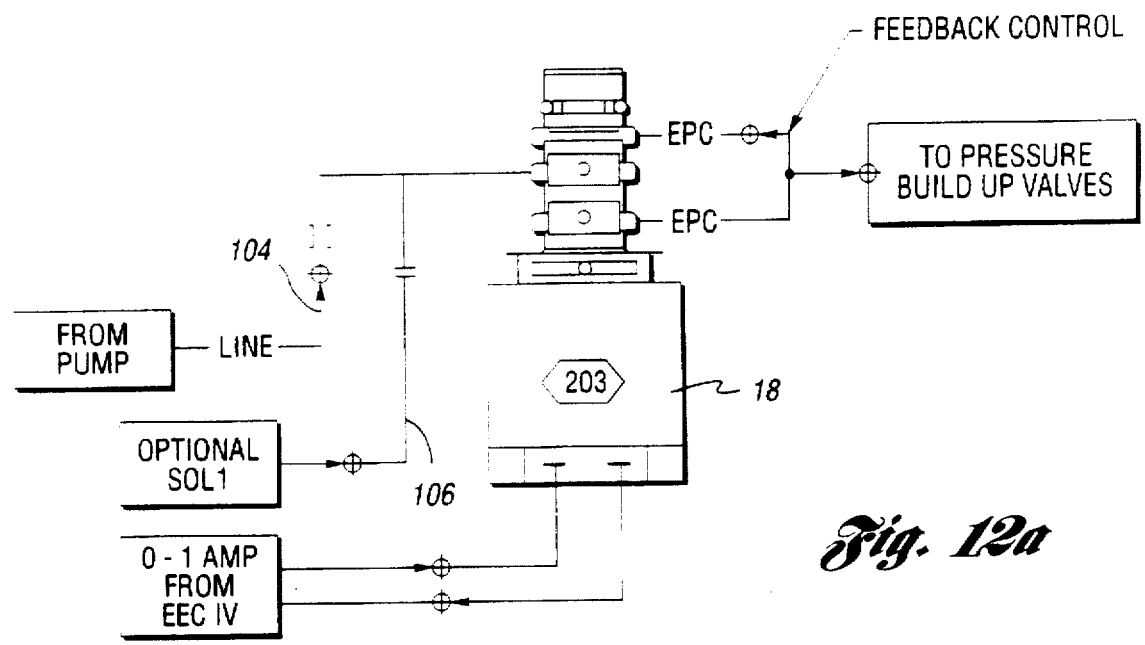
FIG. 12a shows a variable force solenoid that establishes control of the pressure ranges made available to the valve system by the pressure buildup valves.
Figure 12B:
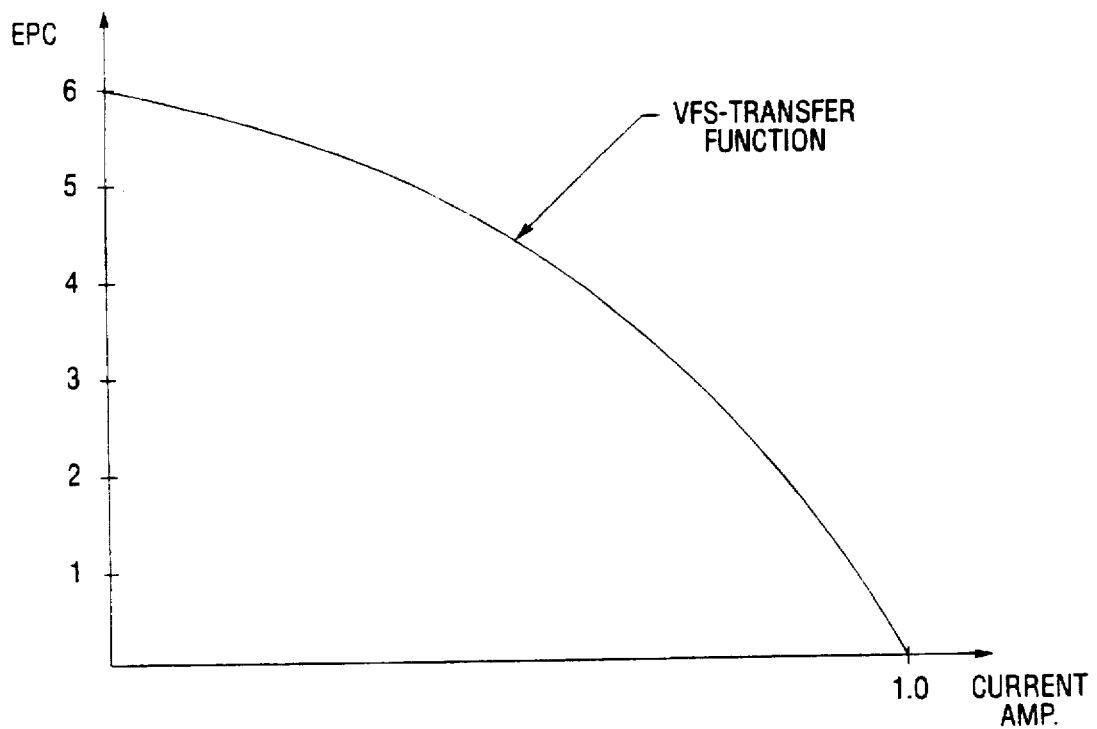
Figure 14:
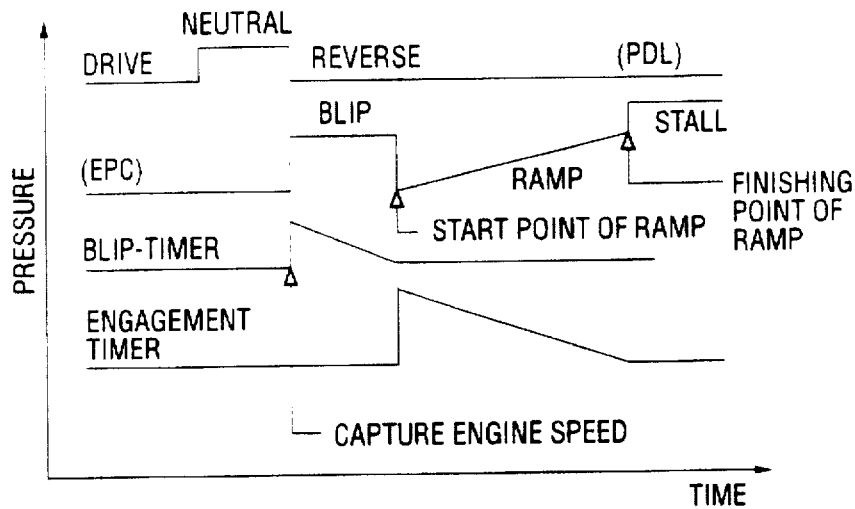
FIG. 14 shows the relationship of pressure over time during a static engagement event.
Figure 16:
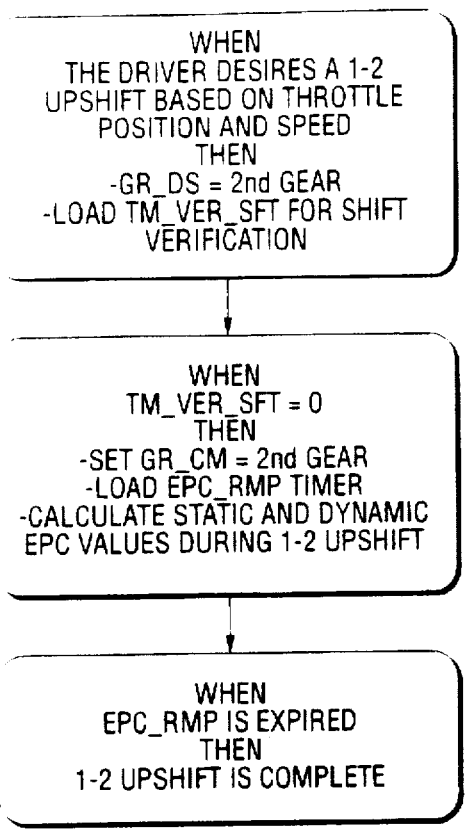
FIG. 16 shows a 1-2 upshift control logic chart indicating the functions that are carried out in sequence by the controller.

The control algorithms of the transmission strategy are executed based on the input signals and calibration data during transmission operation. The transmission operation is basically broken down in the following three major events:

1) shifting event
2) clutching capacity determination
3) converter clutch control The following actuators are responsible for execution of these operating events:

4 ON/OFF solenoids for shifts (SS1–SS4), as seen at 10 in FIG. 3c, 12 in FIG. 3d, 14 in FIG. 3b and 16 in FIG. 3d, 1 VFS for clutch capacity, as seen at 18 in FIG. 3e, 1 PWM solenoid for converter clutch control, as seen at 20 in FIG. 3d.

The transmission actuators convert electrical signals generated by the control algorithms into either a hydraulic signal pressure or pressures directly applied to clutches or bands. An assembly of shift and modulator valves are actuated by these signal pressures. Shift valves effect release or application of hydraulic pressure to the torque transmitting elements (clutches and bands). Pressure modulator valves adjust the amount of clutch or brake capacity of the friction elements.

Transmission Hardware Overview
Transmission Torque Flow

Figure 2:
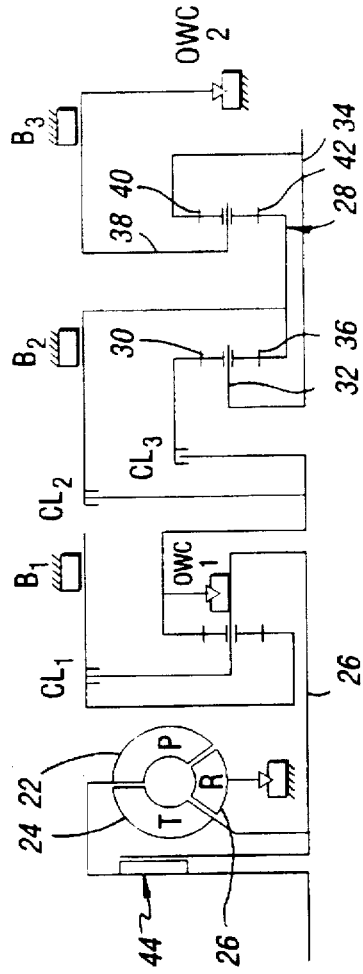
FIG. 2 is a schematic representation of the gearing elements of FIG. 1.
Figure 8:
FIG. 8 is a chart that shows the clutch and brake engagement-and-release pattern for the clutches and brakes illustrated schematically in FIG. 2 as the transmission changes ratio.

The gear set arrangement contains an overdrive planetary gear set connected in series to a Simpson set. FIG. 1 shows the various clutches and bands with conventional abbreviations. FIG. 2 shows, in schematic form, the torque flow paths for the transmission. The clutch and brake engagement and release pattern to effect ratio changes are shown in FIG. 8.

Torque Flow First Gear in DRIVE

The engine torque is transmitted to the housing of the torque converter pump or impeller as shown at 22 in FIGS. 1 and 2. The converter impeller is a centrifugal pump which accelerates the fluid inside of the torque converter towards the turbine blades. The accelerated oil is then decelerated over the turbine blades and the oil at the turbine exit is redirected over the reactor back into the impeller, thereby achieving a torque multiplication effect.

From the input shaft 26, the torque is transmitted to OWC1, which effects a torque reaction in the rotational direction of the engine and overruns in the opposite direction. The engaged clutch CL3 carries torque from the center shaft to the front part of the planetary gear arrangement of the Simpson set 28.

The torque is delivered to the ring gear and is then split into two components. One part is delivered over the planetary carrier to the output shaft 34, which turns in the same rotational direction as the ring gear 30. The sun gear 36 carries the remaining part of the torque in the opposite direction to the rear gear set of the Simpson planetary gear set. The planetary carrier 38 of the rear planetary gear set is held by OWC2. The torque delivered to the sun gear is then transmitted over the planetaries to the ring gear 40, which reduces the velocity and multiplies the torque to the output shaft. This arrangement provides a 2.474 gear ratio.

In coast mode, OWC1 and OWC2 overrun and free wheeling is in effect. The converter clutch stays open until no torque multiplication occurs. It then can be locked afterwards.

Torque Flow: Second Gear in DRIVE

The torque flow is the same as in first gear except that B2 is applied, as seen in FIG. 8. With the engagement of B2, the speed of sun gear 42 is reduced to zero speed. Here, the brake band (B2) serves as a reaction element for the front planetary gear set and generates an output torque multiplication of 1.474 by holding 0.474 times engine torque as a reaction to the output. The output of the rear planetary gearset is zero since the sun gear has zero speed (see FIG. 2). The converter clutch 44 can be locked or unlocked in second gear depending on the driving condition.

Torque Flow Third Gear in DRIVE, Overdrive Cancel Switch=OFF

In third gear, B2 is released and CL2 is applied. The transition from second to third gear must be synchronized since no reaction element is available to hold the CL2 drum when B2 is released. The converter clutch can be locked or unlocked depending on the driving condition. The torque input to CL2 and CL3 is split depending on the gear ratio. CL2 carries 0.321 times engine torque and CL3 carries 0.679 times engine torque. The torque flow to CL2 is the same as in first or second gear.

With the overdrive cancel switch turned off, the coast clutch (CL1) is disengaged, i.e., electronically released, and free wheeling takes place since OWC1 overruns in coast mode (see FIG. 2). This is the direct gear with a gear ratio of one. Since the gear change from second to third and from third to second has to be synchronized, more complex control effort is implemented for these gear changes as will be explained subsequently.

Torque Flow Third Gear in DRIVE, Overdrive Cancel Switch=ON

When the overdrive cancel switch is ON, CL1 is hydraulically applied and engine braking takes place in coast mode. CL1 is electronically controlled and hydraulically actuated along with B1 (see FIG. 2 and FIG. 8).

Torque Flow Fourth Gear in DRIVE

In fourth gear, B1 is applied and carries −0.25 times engine torque as a reaction to the output. B1 decelerates the sun gear of the overdrive planetary gear set to zero speed and generates an 0.75 gear ratio. An engagement of CL1 is hydraulically inhibited and OWC1 overruns. Since B1 carries 0.25 times engine torque and since the overdrive planetary gear set is an input to the Simpson set, CL2 and CL3 hold three-quarters of total engine torque. The gear ratio is 0.75. The converter clutch can be locked or unlocked based on the driving condition (see FIG. 2.)

Torque Flow First Gear in MANUAL Position

In MANUAL1, the torque flow is the same as in first gear in drive position except B3 and CL1 are applied, as seen in FIG. 8, to generate engine braking in coast mode. The converter clutch is hydraulically inhibited and cannot be applied electronically. B3 prevents overrunning of OWC2, and CL1 prevents overrunning of OWC1. The gear ratio is 2.474 (see FIG. 2).

Torque Flow: Second Gear in MANUAL2 Position

In MANUAL2, the torque flow is the same as in second gear in drive position except CL1 is applied to achieve engine braking in coast mode. CL1 prevents overrunning of OWC1 in power OFF condition. The converter clutch 44 can be applied depending on the operating condition. The gear ratio is 1.474.

Torque Flow: Second Gear Plus Overdrive In MANUAL2 Position

The torque flow here is the same as for second gear except B1 is applied. With the engagement of B1, CL1 is hydraulically released and the gear ratio of 1.1 is accomplished. B1 is not hydraulically locked in MANUAL2 position and can be applied and released electronically. This shift arrangement is mainly used for 3-2 inhibition function during MANUAL downshifts.

Torque Flow: REVERSE Position

In REVERSE, torque is delivered over OWC1 and CL2 to the sun gear of the rear planetary gear set. B3 holds the reaction torque, which is −3.11*input torque. With the input through the sun gear and by holding the carrier with B3, the rotational direction of the output ring gear is reversed. The ratio is 2.11. CL1 is not applied in reverse which gives free wheeling in coast mode, allowing OWC1 to overrun. Disconnection of CL1 is required in order to eliminate the hydraulic delay associated with the engagement of CL2 during a static engagement of CL2 and B3. The function during reverse position is to synchronize the engagement of CL2 and B2 during the static engagement event.

Synchronous And Non-Synchronous Shift Control

The transmission has the following shift types embodied in the hardware design:

| Shifts | Synchronous | Non-Synchronous |
| --- | --- | --- |
| 1-2/2-1 | Reaction to Reaction (OWC2 to B2/ B2 to OWC2) | — |
| 2-3 | — | Reaction to Drive (B2 to CL2) |
| 3-2 | — | Drive to Reaction (CL2 to B2) |
| 4-2 | — | Reaction/Drive to Reaction (B1/CL2 to B2) |
| 3-4/4-3 | Reaction to Reaction (OWC1 to B1/ B1 to OWC1) | — |

The shift dynamics of synchronous and non-synchronous upshifts and downshifts now will be described. Pressure control and the resulting torque disturbance are compared for a conventional hydraulic controlled and an electronically controlled system. How the electronic control is accomplished is described subsequently.

Non-Synchronous Upshift Control, 1-2/3-4 Upshifts

All non-synchronous upshifts are reaction to reaction shifts. This is true for the 1-2's and 2-1's and the 3-4's and 4-3's. Reaction-to-reaction shifts means that the gear change is executed by two reaction elements. This is only possible when one holding element of a planetary gear set is a one way clutch, which can sense the rotational direction.

As described previously, OWC2 carries the reaction torque in first gear. When a 1-2 upshift is executed, B1 is energized, and pressure reduces the reaction torque on OWC2. This triggers a negative torque disturbance on the output shaft. The steadily increasing band capacity reverses the output shaft torque at the point where the reaction torque is zero. At this point, the inertia phase is initiated.

FIG. 4 shows in a solid line the torque characteristic of a conventional hydraulically controlled transmission.

1-2 Upshift

At this point, the output torque disturbance rises and is only dependent on the applied pressure control on B2. With conventional hydraulic control, the pressure characteristic cannot be matched to accomplish better shift quality. When the inertia phase is completed, the resulting output torque drops down to the final level. The absolute torque disturbance results in TH (see FIG. 4), which produces poor shift quality.

With electronically controlled pressure characteristic of B2, the absolute torque disturbance can be reduced to the TE level (see FIG. 4) and the sum of the torque disturbances can be minimized. This will give optimal shift quality with controllable slip for lifetime durability. In the case of a 3-4 upshift, torque response characteristic is the same for OWC1 and B1 as for the 1-2 upshift, except that OWC1 is held against the turning driveline. The speed characteristic of OWC1 in this case is the relative speed between the input and output when B1 is applied. The speed difference depends on the gear ratio of the overdrive planetary gear set.

Non-Synchronous Downshift Control, 2-1/4-3 Downshift

During a 2-1 downshift, the pressure on B2 is released. At the point where B2 is disengaged, the relative speeds of B2 and OWC2 are equalized by the engine input torque until OWC2 engages. FIG. 5 illustrates the shift in the shift time domain.

2-1 Downshift

The output torque is proportional to the release pressure of B2. Hence, the output torque follows B2 pressure until it is zero. Once the inertia phase is completed, OWC2 carries the reaction torque in first gear. As seen in FIG. 5, maximum torque disturbance of TH is present, which results in shift harshness.

An electronically controlled system, as seen in FIG. 5, manipulates the pressure release characteristic of B2 so that a partial torque is always carried during the inertia phase. This reduces the output torque disturbance to TE (see FIG. 5) and reduces the amount of energy absorbed by OWC2. This provides better shift quality and a calibration tool to influence the downshift control.

Synchronous Upshift Control, 2-3 Upshift

Figure 6:
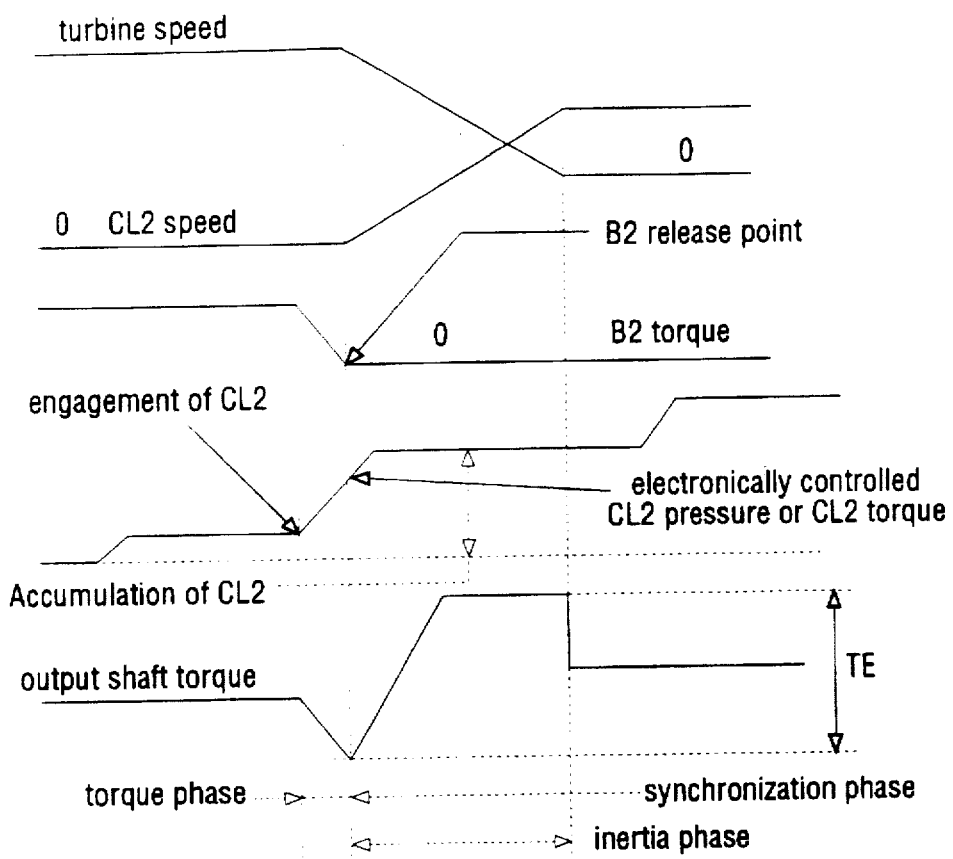
FIG. 6 is a view similar to FIG. 4, but it describes a 2-3 upshift.

The synchronous 2-3 upshift, as seen in FIG. 6, is a reaction to drive shift. Reaction to drive means in this case a gear change from a reaction element to a rotation clutch. The synchronization takes place between the input speed from CL3 of the front ring gear of the Simpson set with the stationary held sun gear connected to CL2. This synchronization event involves the engagement of CL2 and accelerating CL2 to input shaft speed. At the point where CL2 transmits the reaction torque of B2, the brake band 2 has to be disengaged. The timing diagram of FIG. 6 illustrates the synchronization process.

2-3 Upshift

If the 2-3 upshift is not accomplished, capacity loss and engine flair up are the consequences.

With electronic controls applied to this system, the ultimate goal is to influence the pressure profile of CL2 and to synchronize the release of B2 simultaneously. The electronic-hydraulic control system will be explained subsequently.

Here again, the pressure level of CL2 entirely determines the absolute value of the output torque disturbance up to the point where the torque disturbance is completed. Considering the fact that CL2 holds 1*(input torque) in REVERSE position and carries only 0.321*(input torque) during a 2-3 upshift, the clutch CL2 has over-capacity during a 2-3 upshift. The pressure profile has to be accumulated electronically during the inertia phase to compensate for the over-capacitive clutch CL2. The electronically controlled pressure settings on CL2 control the clutch capacities, and with this the output shaft torque disturbance.

Synchronous Downshift Control, 3-2/4-2 Downshift

Figure 7:
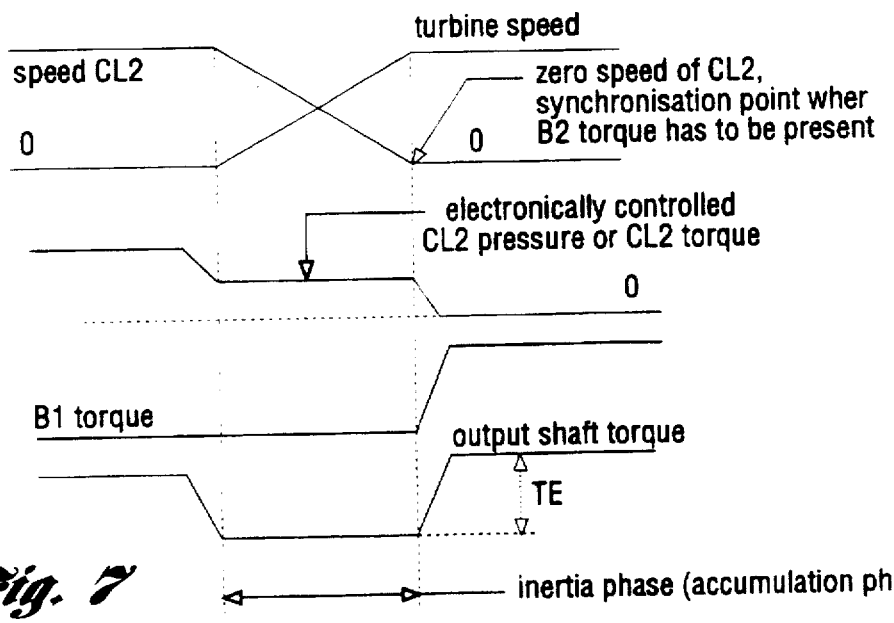
FIG. 7 is a view similar to FIG. 4, but it describes a 3-2 downshift.

The synchronous 3-2/4-2 downshifts are drive-to-reaction shifts. Drive to reaction means that the gear change is executed from a rotating clutch to a reaction element. In this case, CL2 is released, which rotates with 1*(input speed) in third gear and 1.33*(input speed) in fourth gear, and B2 is applied. The synchronization involves the engagement of B2 at the point when CL2 drum speed is zero speed. FIG. 7 illustrates this condition.

If the synchronization point is not met, engine flair up and capacity loss occurs.

The electronic controls have to synchronize the release of CL2 and the apply of B2 at zero speed of CL2 and also control the CL2 pressure profile. This minimizes the torque disturbance of the output until the reaction element B2 takes over. During this accumulation phase, the CL2 torque level has to be slightly higher than input torque*ratio. This reduces the absolute torque disturbance TE to a minimum.

The electronic accumulation of the CL2 release and the synchronization control system is described later.

Electronic-Mechanical Interface

FIG. 8 shows the functional matrix of the transmission. This functional matrix represents the active solenoid stages dedicated to the gears and the manual lever positions. The significance of this matrix is shown by solenoid stages used in "DRIVE" position.

Manual Lever Position: DRIVE

First of all, when the overdrive cancel switch 50, shown in FIG. 3b, is turned on or off, CL1 is applied or released. With ODC=ON, CL2 is applied and the fourth gear is electronically inhibited with engine braking in third gear. For this operation, one single solenoid only has to be dedicated, which is SS4.

For the remaining electronic-mechanical interface, the following facts have to be considered:

A) One solenoid stage is needed for each gear (1st, 2nd, 3rd and 4th).

B) There are two intermediate stages (IS1, IS2), which are used for controlling the synchronous 3-2/4-2 down-shifts.

C) One of the intermediate steps (IS1) is used for the synchronization of the 2-3 upshifts.

Hence, seven solenoid stages are required. In order to realize seven solenoid stages, three ON/OFF solenoids are needed. The ON/OFF solenoids are SS1, SS2, and SS3, as seen in FIGS. 3b-3d.

The PWM-solenoid 20 in FIG. 3d is dedicated, independently, to the shift solenoids, for converter clutch control and can be actuated in each gear in MAN2 and DRIVE position. With the solenoid configuration shown in FIG. 8, the gear selection and gear changes as described above are realized.

The hydraulic control system of FIGS. 3a-3e is designed according to the above described electronic-mechanical configuration. Each single solenoid stage is described subsequently along with the control strategy.

Manual Lever Position: MAN1/MAN2

In MAN2 position (see FIG. 3e), two different gear selections are possible; i.e., second gear and second gear plus overdrive. Second gear is hydraulically locked and is independent of the solenoid stages in first and second gear. Second gear plus overdrive is electronically controlled. B1 can be applied or released with SS3, shown at 14 in FIG. 3b.

In MAN1 position, all shown gears (1st, 2nd and 2nd+OD) are electronically controlled. Due to hydraulic design requirements, the solenoid stage in second gear is different than the second gear stage in DRIVE position. The solenoid stage for second gear+OD is the same as in MAN2 position.

The additional solenoid stages and gear selections are needed to achieve an electronically controlled 3-2 inhibition function in MAN2 and a 3-2/2-1 inhibition function in MAN1 position with engine braking in each gear.

Manual Lever Position: PARK, REVERSE, NEUTRAL

In PARK, REVERSE and NEUTRAL position, only one solenoid stage is used, which is the first gear state. This solenoid stage is used also for static engagement control into PARK and REVERSE. The layout of the engagement control system is therefore designed without the requirement for changing solenoid stages. This simplifies the hydraulic control system significantly for static reverse and forward engagements.

Sensors And Actuators

There is a distinction between driver actuated sensors and sensors which determine the transmission status. The signals are used by the control algorithms in the EEC module for decision making. Based on the signals, the control algorithms decide how the transmission actuators are applied to achieve the desired operating mode of the transmission. Further, several engine sensors are used for determining several input parameters for the transmission, such as the engine speed (RPM), engine torque (MAF) and engine coolant temperature (TOT), as seen in FIGS. 3a and 3b.

Driver Actuated Sensors

Manual Lever Position Sensor (MLP)

The manual lever position (MLP) sensor is mounted on the outside of the transmission. It determines the neutral/park start switch function and senses the lever position using a resistance network (see FIG. 8). The neutral start switch function allows the engine to start only in neutral or park position. The resistance network is responsible for sensing the selection of the lever position, which is actuated by a mechanical linkage.

The transmission contains six lever positions. The seventh position is the overdrive position, which is canceled or enabled by the overdrive cancel switch. The control strategy is loaded in a register called PDL with a number 1 through 7, depending on the manual lever position and the state of the overdrive cancel switch. The following chart illustrates this:

| Manual Lever Position (6 position) | State of Overdrive Cancel Switch | Value of PDL REGISTER |
|---|---|---|
| PARK | — | 7 |
| REVERSE | — | 6 |
| NEUTRAL | — | 5 |
| DRIVE | OFF | 4 |
| DRIVE | ON | 3 |
| MANUAL2 | — | 2 |
| MANUAL1 | — | 1 |

The following control strategies use the MLP signal:

Distinguishing between automatic and manual control algorithms,

Static engagement control system,

Manual upshifts and downshifts.

Throttle Position Sensor (TP)

The throttle position sensor is a potentiometer which senses the throttle movement of the driver. This signal represents the performance desires of the driver.

TP is used for following control strategies:

shift control to determine the desired gear from functions TP versus VS,

Converter clutch control to determine the desired converter clutch engagement from functions TP versus VS, Determination of throttle angle rates for converter clutch control (unlock converter clutch for tip-in or tip-out condition), Determination of dynamic EPC (Electronic Pressure Control) for clutch capacities during a shift.

Overdrive Cancel Switch (ODC)

The overdrive cancel switch 50 in FIG. 3b indicates that the driver does not want to shift into top gear (4th gear)

automatically. When the overdrive cancel switch is enabled, fourth gear is inhibited by the shift control strategy and CL1 is engaged to provide engine braking in third gear. As stated above, the PDL register, representing the MLP, is set to 3.

Brake ON/OFF Switch (BOO)

The brake ON/OFF switch 48 (see FIG. 3b) senses the brake actuated by the driver. This signal is used by the converter clutch control strategy to unlock the converter clutch when the brake is applied.

P/N-mode Switch

This switch, seen in FIG. 3a, is used for selection between a "NORMAL" mode shift pattern and a "PERFORMANCE" mode shift pattern. The shift control strategy uses this signal to distinguish between performance and normal mode.

Transmission Sensors

Turbine Speed Sensor

Figure 9:
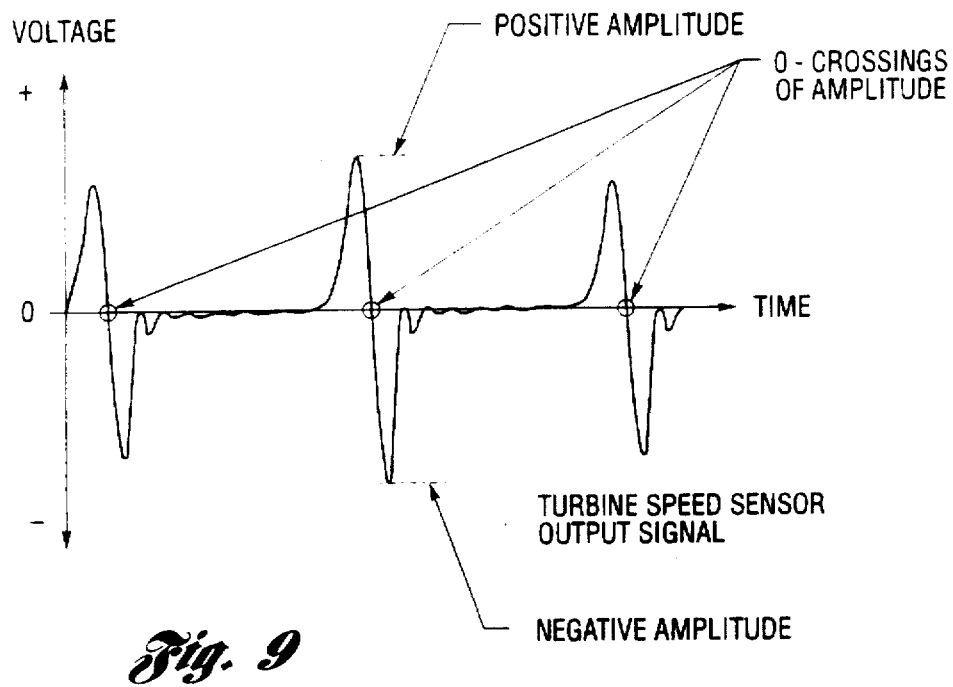
FIG. 9 is a chart showing the output signal of the turbine speed sensor used in the control strategy.

The turbine speed sensor 51, seen in FIG. 3b, senses the input speed of the transmission. The turbine speed sensor is a variable reluctance type of sensor. The trigger wheel generating the signal at the sensor is welded on the overdrive carrier and has 8 teeth. The overdrive carrier is splined into the input shaft. The sensor has the following characteristic data:

min detectable signal: 150 RPM with +/-340 mV amplitude maximum signal allowed: 7000 RPM with +/-90 v amplitude FIG. 9 shows the turbine speed output signal. The control strategy senses the zero crossings of the amplitude and calculates the frequency of this signal.

The turbine speed signal is used for the following parts of the control strategy:

Determination of the converter clutch slip,

Determination of speed ratio and torque multiplication of torque converter,

Determination of "start" of a static engagement for clutch capacity control during an engagement event.

Vehicle Speed Sensor (VSS)

The vehicle speed sensor, shown at 52 in FIG. 3b, is a variable reluctance type of sensor. It is mounted on the output shaft. Using this signal, the vehicle speed is inferred from the dynamic rolling radius (depending on tire size) and the rear axle ratio.

The control strategy uses the VSS as follows:

Shift control to determine desired gear from the functions of TP versus VS,

Converter clutch control to determine the desired converter clutch engagement from the functions of TP versus VS, Determination of vehicle acceleration and deceleration rates for shift control in coast mode.

Transmission Oil Temperature Sensor (TOT)

The TOT sensor, shown at 54 in FIG. 3b, is a thermistor which varies its resistance with temperature. The characteristic is that of a NTC-thermistor (NEGATIVE TEMPERATURE COEFFICIENT), which means low temperature has high resistance and high temperature has low resistance. The control strategy uses TOT for the following purposes:

Compensation of shift quality by adjusting clutch capacity for changes in oil viscosity, Compensation of shift pattern for cold temperatures, Enable or disable converter clutch control depending on a temperature threshold, Compensation of converter clutch engagement schedule for high transmission oil temperatures.

Engine Sensors Used for Transmission Purposes

Engine Speed Sensor(N)

The engine speed sensor senses crankshaft speed and is mainly used for engine purposes. The transmission control strategy uses engine speed for the following operating modes:

Wide open upshifts are executed in dependence on N.

Determination of absolute slip across the torque converter,

The clutch capacity for a static engagement is determined by functions N versus EPC.

Mass Air Flow Sensor (MAF)

The mass air flow sensor is mounted on the intake manifold of the engine. It monitors the amount of air consumed by the engine. Since the air mass is proportional to the engine output torque, this signal is used along with engine speed to determine the torque generated by the engine from tables of engine speed versus air mass.

The calculated output torque is loaded into a register called TQ_BAR and is manipulated via a separate control strategy by air/fuel ratio, spark, engine friction, accessories and air conditioning to get the net input torque to the transmission. This control strategy is called "Real Time Torque" calculation.

The value loaded into the TQ_BAR register is used in the transmission strategy to calculate the required clutch capacities.

Transmission Actuators

In general the transmission actuators like SS1, SS2, SS3, SS4, VFS1 and PWM-solenoids of FIGS. 3c, 3b, 3d and 3e at 10, 12, 14, 16, 18 and 20, respectively, transform electrical signals applied to a component by the control strategy into hydraulic pressure. The electrical signals for the actuators are the outputs of the control algorithms. The generated output pressure is used to either actuate shift valves or are used as signal pressures for regulator valves.

4 Shift Solenoids (SS1,SS2,SS3,SS4)

Figure 10:
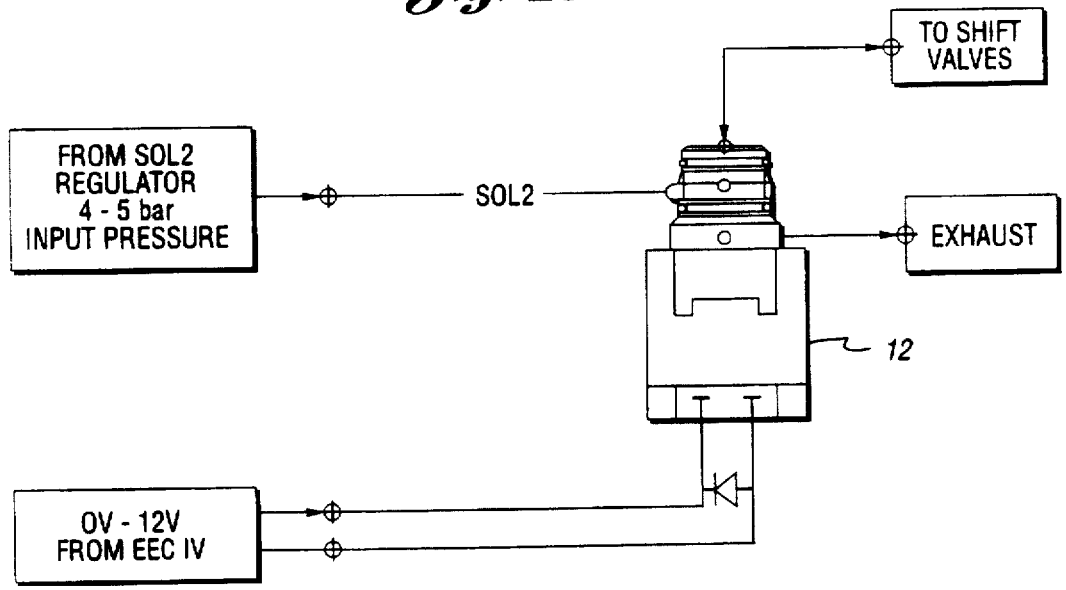
FIG. 10 shows the shift solenoids and their relationship to the other elements of the valve system.

The shift solenoids are used to transform a 0–12 V electrical signal into a 0–5 bar output pressure (see FIG. 10). The solenoids are normally closed, which means when no voltage is applied, the pressure to the shift valves is released and the input pressure (SOL2) is sealed against exhaust. The input pressure to solenoid 12 in FIGS. 3d and FIG. 10 is SOL2 pressure and is regulated between 4–5 bar. This will be explained subsequently. When the 12 v are applied, SOL2 pressure is released to the shift valves and sealed against the exhaust port.

The electrical characteristics are:

(i) resistance: 28 ohm at room temperature and (ii) inductance at 1000 Hz: 106 mH +/−12 v apply.

Variable Force Solenoid (VFS)

The variable force solenoid at 18 in FIG. 3e transforms a 0–1 AMP current into a 0–6 bar output pressure. The output pressure is called EPC (Electronic Pressure Control) and is applied as a signal pressure to regulator and modulator valves. The regulator and modulator valves generate the required clutch pressure and clutch capacity. The digitally calculated EPC-pressure from the control strategy is converted by a solenoid driver circuitry into a 0–1 ampere signal. For failure mode reasons, the transfer function is laid out to have at zero ampere maximum pressure (see FIG. 12b). The input pressure to the VFS can be either line pressure from 4–22 bar or a regulated SOL1 pressure from 4–8 bar. Due to a hydraulic feedback applied to the VFS, the variable input pressure does not influence the output pressure characteristic (see FIG. 12a).

The electrical characteristic of:

resistance: 3.8 ohm at room temperature inductance: di/dt must be <1 ms when input current is changed instantaneously from 800 to 1000 mA at +14 v and 120 degree C.

Pulse Width Modulated Solenoid (PWM)

Figure 11A:
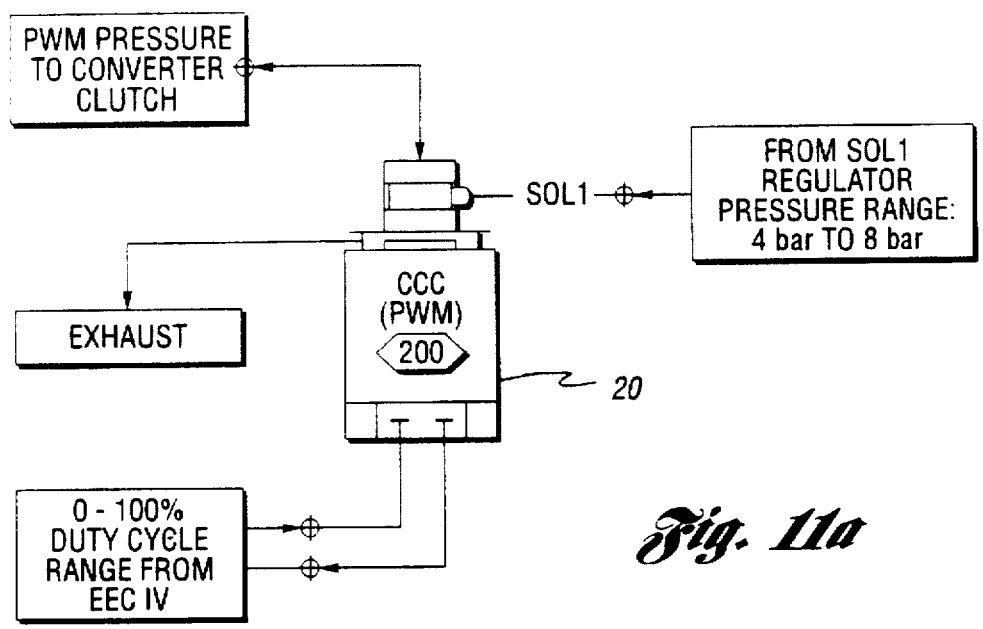
FIG. 11a shows the pulse width modulated solenoid for developing a pulse width modulated pressure in the converter.
Figure 11B:
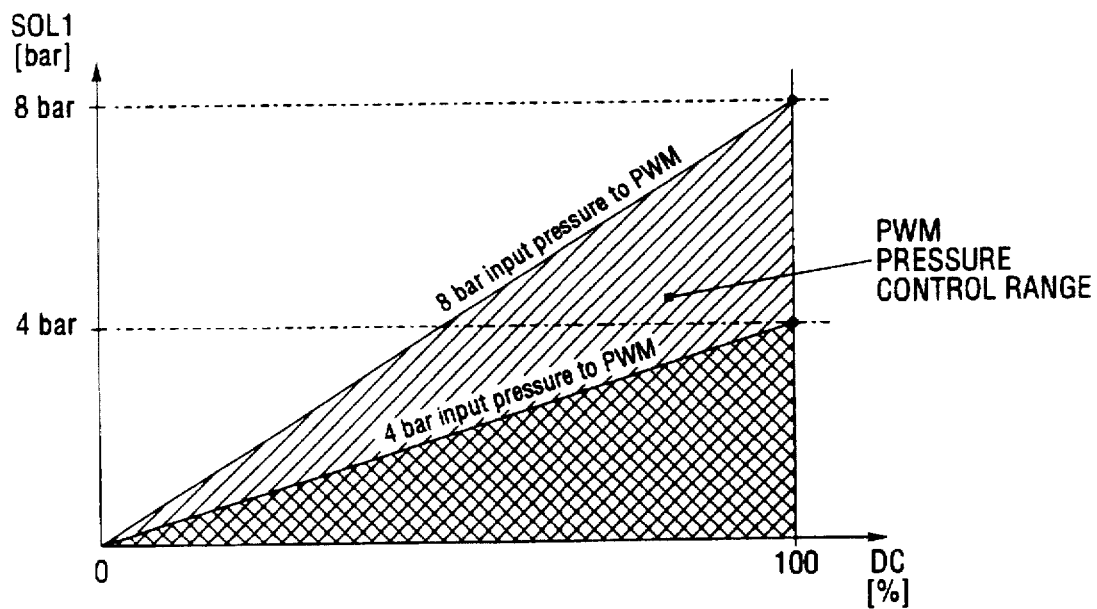
FIG. 11b shows the characteristics of the pulse width modulated solenoid of FIG. 11a where pressure is plotted against duty cycle.

The transmission uses a PWM solenoid, shown at 20 in FIG. 3d and in FIG. 11a, for converter clutch control. The PWM solenoid converts a percentage duty cycle into a pressure characteristic (see FIG. 11B). A 0–100 percent duty cycle is applied to the solenoid. The input pressure is a regulated pressure from 4–8 bar called SOL1 pressure. Zero percent duty cycle releases the converter clutch pressure to exhaust and a 100 percent duty cycle allows 8 bar and 4 bar to be applied to the converter clutch. A duty cycle within between 0% and 100% produces a pressure characteristic as shown in FIG. 11B.

The duty cycle frequency is 40 Hz. The percentage duty cycle is calculated by the converter clutch control strategy to adjust a desired slip value across the torque converter. A solenoid driving circuit converts the calculated value into an actual duty cycle.

Control Strategy Overview (Software)

General

The transmission control strategy contains a set of modules which are distinct and independent. Each set contains a specific function. These modules are designed according to the characteristics of the transmission hardware and are structured as follows into three basic modules:

A) SHIFT MODULE

B) EPC MODULE

C) CONVERTER CLUTCH CONTROL MODULE.

The control strategy contains transmission calculations derived from the sensors to support the execution of each module. All three modules have sub-modules according to sub-functions.

Important Transmission Calculations

-PCSFTCMPT=percentage shift complete

This calculates the percentage of the gear ratio depending on the old gear and the commanded gear.

PCSFTCMPT=(RT_TRANS-GRRAT[GR_OLD])/
(GRRAT[GR_CM]-GRRAT[GR_OLD])

RT_TRANS=current calculated gear ratio

GRRAT=gear ratio in each gear

GR_CM=commanded gear

GR_OLD=old gear

-RT_TRANS=instantaneous calculated gear ratio

RT_TRANS=NT/NO

NT=turbine speed

NO=output shaft speed

-SLIP_ACT=actual slip across the torque converter

SLIP_ACT=N-NT

NT=turbine speed

N=engine speed

-SPD_RATIO=speed ratio across the torque converter

SPD_RATIO=NT/N

-ERR_TO=error between actual slip and desired slip. This value is used to determine the proportional, derivative and the integral gains of the PID controller

ERR_TO=SLIP_DES-SLIP_ACT

SLIP_DES=desired slip value across the torque converter

Shift Module

Figure 13:
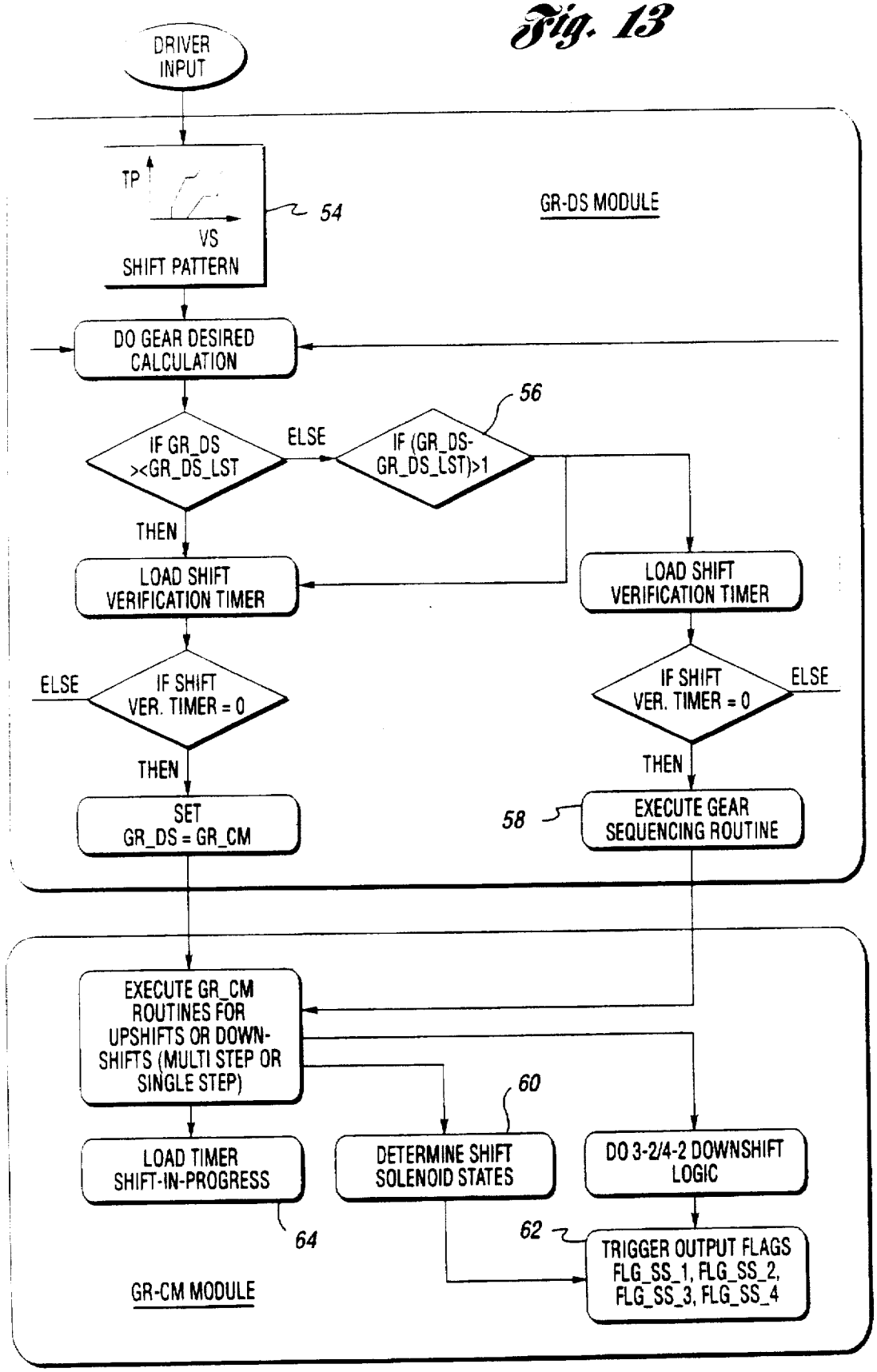
FIG. 13 is a flow diagram illustrating the functions that occur during performance of the 3-2 and the 4-2 downshift logic.

The shift module contains two major component modules, as seen in FIG. 13, which are the commanded gear module and the desired gear module. The desired gear module contains the shift verification algorithms, whereas the commanded gear module contains the algorithms for execution of a shift via the solenoid stages. The commanded gear module effects all the shift solenoid timing to execute synchronous/non-synchronous up- or down shifts.

Desired Gear Module

The desired gear module has three sub modules which are:

A) shift verification timer

B) desired gear calculation

C) gear sequencing calculation.

The major output of this module is the desired gear register GR_DS which represents the desired gear selected by the driver. The desired gear is calculated, as seen at 54 in FIG. 13, based on shift curves TP vs. VS with the desired gear calculation module. During this calculation procedure, a shift verification time is loaded whenever GR_DS is changed. When the driver desires multistep upshifts or downshifts, another register holds the previously desired gear, which is GR_DS_LAST. When the difference between GR_DS and GR_DS_LAST is greater than 1, as indicated at 56 in FIG. 13, a multistep upshift is desired. Accordingly, if the difference is smaller than 1, a multistep downshift is desired. If a multistep upshift is desired and the shift verification timer is expired, the gear sequencing calculation, at 58 in FIG. 13, determines in which sequence the gears are executed. The shift verification timer is always reset when GR_DS has changed. In this module, it will also be determined whether the driver desires an upshift or a downshift.

Gear Commanded Module

The gear commanded module, seen in FIG. 13, actually executes the desired gear. When the shift verification time is expired, the content of the GR_DS register will be loaded into the gear commanded register GR_CM. The gear commanded module has five major sub-modules for automatic upshifts with PDL register loaded with either 3 or 4 (excluding the manual shifts which are handled later in this disclosure):

A) gear commanded module for automatic upshifts

B) gear commanded module for automatic downshifts

C) determine shift solenoid states module

D) 3-2/4-2 downshift control module

E) shift-in-progress time calculation module.

In the automatic upshift and downshift modules, the shift sequencing times are determined for multistep upshifts and downshifts. Depending on which value the GR_CM contains, the shift solenoid states are calculated by the shift solenoid state module at 60. The outputs of the shift solenoid state module are the shift solenoid flags FLG_SS_1, FLG_SS_2, FLG_SS_3 and FLG_SS_4, as seen in FIG. 13 at 62. These flags determine which solenoids are energized or de-energized depending on the type of shift. At the point where the gear is commanded, a shift-in-progress time is loaded into a register called TM_SFT_IN, as indicated at 64 in FIG. 13. This shift-in-progress time is used to hold the dynamic EPC values when a shift is still in progress. This is explained subsequently. The 3-2/4-2 downshift control module executes the synchronous 3-2/4-2 downshift with the solenoid timing involved for a successful completion. This operation is unique for the transmission and will be explained later.

FIG. 13 shows the strategy for execution of both upshifts and downshifts.

EPC Module

The EPC module is responsible for calculating the clutch capacities under all driving conditions. The output register of the control algorithms is called TV_PRES. As outlined above, the calculated EPC value, which is loaded into the TV_PRES register, is converted by the driver circuitry into 0–1 ampere current. This current is applied to the VFS and transformed to an output pressure proportional to the current. The output pressure of the VFS, shown at 18 in FIG. 3e, controls modulator and regulator valve systems connected to clutches and bands. The pressure output of the regulating devices represent the clutch capacities. A detailed description of the pressure buildup system is outlined below). The EPC module is also subdivided into several modules. The sub modules are as follows:

A) Stall/Engagement module
B) Coast Boost Module
C) Normal EPC Calculation
D) EPC Dynamic Calculation
E) TQ_IALPHA Calculation.

A) Stall/Engagement Module

The stall/engagement module calculates the required EPC values for stall and static engagement conditions. Stall conditions means that the torque converter is operated under a torque multiplication condition and higher clutch capacities have to be applied. Stall condition is determined by calculating the speed ratio across the torque converter. With the speed ratio value, the torque multiplication factor is determined depending on the torque converter design. Torque multiplication is eliminated by the strategy when a certain speed ratio or a threshold vehicle speed has been reached.

The engagement control logic involves the static engagement of the forward clutch (CL3) in manual lever position "DRIVE". In manual lever position "REVERSE", the high clutch (CL2) and the rear servo (B3) must be engaged.

In general, four different engagements are possible, which are drive to reverse, reverse to drive, neutral to reverse and neutral to drive. The engagement control system is entirely dependent on the state of the PDL register, which represents the MLP position and the action of the driver (refer to FIG. 4). When an engagement is executed, a BLIP timer is loaded and a special "BLIP" —EPC value is set. When the blip-timer is expired, an ENGAGEMENT timer is loaded and an EPC ramp is executed. The starting and finishing points of the ramp are functions of engine RPM. The engine rpm has been captured at the point where the PDL register has sensed an engagement. When the engagement timer is expired, the EPC value is adjusted to the required value.

FIG. 14 illustrates the execution of an engagement from drive to reverse.

B) Coast Boost Module

The coast boost logic calculates the EPC settings in all manual positions in "power off" mode with the overdrive cancel switch turned off. This would be in PDL positions 1, 2 and 3. The coast boost logic provides enough pressure in coast mode to apply the coast clutch (CL1) during a manual lever position change from 4 to either 1, 2 or 3. The coast clutch is a rotating clutch and needs specific pressure settings in power off mode for an engagement due to centrifugal force influence on the clutch. The coast boost logic provides individual functions, EPC vs. VS (vehicle speed), for each affected manual position for the coast clutch. A reliable engagement of the coast clutch is required to get engine braking in all manual lever positions lower than 4.

C) Normal EPC Calculation

This module calculates the required EPC values to satisfy static capacity requirements during a shifting and non-shifting event. The clutch capacities for the transmission are determined as follows:

For the forward clutch (CL2) and high clutch (CL3), the clutch capacity is determined as follows:

$$MK=([P*AK-FS]*RM*2*N*\mu)/RT,$$

where:

(μ=coefficient friction constant)
MK=clutch torque
P=applied pressure
FS=total spring load of clutch
RM=friction radius
N=number of plates, and
RT=transmission ratio.

For the overdrive band (B1), the deenergized band capacity formula is valid:

$$MB=([P*AB-FS]*[1-e^{-\mu*a}]*IH*RM)/RT$$

For the intermediate band (B2) the energized band capacity formula is valid:

$$MB=([P*AB-FS]*[e^{\mu*a}-1]*IH*RM)/RT,$$

where
MB=band capacity
AB=area of servo applied to the band
a=wrap angle, and
IH=lever ratio.

The relationship of clutch capacity (MB, MK) to the applied pressure P is linear. The coefficient of friction constant is different for a shifting event and for a non-shifting event. The normal EPC calculation module expresses clutch capacity in linear dependency on pressure P. The required amount of EPC pressure is equivalent to the pressure P and is derived from the above equations as follows:

$$EPC(P)=TQ\_BAR*SLOPE+INTERCEPT$$

The slope and intercept values represent the geometrical conditions of each element. The pressure P and the signal pressure EPC represent the amount of pressure required to produce a certain clutch capacity. TQ_BAR is the input torque applied to the clutch. It has to be equal to generated clutch torque MK and MB. The normal EPC module calculates for each gear, with a dedicated slope and intercept, the capacity required. When a shift is taking place, separate slopes are used for each shift since the coefficient of friction is different compared to a statically held clutch. The calculated value is then loaded into the TV_STAT (EPC static register) register. When no shift is taking place, the value of the TV_STAT register is transferred to the TV_PRES register, and finally applied to the VFS with an equivalent current.

D) Dynamic EPC Calculation

The dynamic EPC module calculates additional EPC pressure applied to the clutch during a shifting event. This additional EPC pressure is a calibration tool to optimize the amount of capacity required during a shift, and hence to obtain good shift quality. The dynamic EPC is loaded into a register called TV_DYN. During a shift, TV_DYN and TV_STAT are added and loaded into the final register TV_PRES.

E) TQ IALPHA Calculation

The TQ_IALPHA module calculates the amount of inertia torque present during each shift. This calculation takes all rotating masses into account. These have to be accelerated or decelerated during an upshift or downshift. The amount of inertia torque calculated is added to the input torque TQ_BAR and converted by the normal EPC calculation module into pressure settings.

Converter Clutch Module

The converter clutch module is dedicated to control the converter bypass clutch. The major output register is the bypass clutch duty cycle called BCSDC. This duty cycle is applied to a PWM-solenoid, which converts the duty cycle signal into an output pressure (see FIG. 11b). The converter clutch module is subdivided in the following major sub-modules:

A) lock up/unlock shift schedule
B) hot lock up shift schedule
C) scheduled bypass clutch slip
D) torque feed forward system
E) modulation over a shift
F) unconditionally unlock module.

A) Lockup/Unlock Shift Schedule

This module contains a shift pattern TP vs. VS to lock or unlock the converter bypass clutch in each gear. Based on these shift curves, the converter clutch can be locked in second, third and fourth gear.

B) Hot Lockup Shift Schedule

The converter clutch shift schedule can be modified when the transmission oil temperature (TOT) has exceeded a certain value. An open torque converter can contribute to excessive heat generation under heavy driving condition. In order to prevent overheating of the torque converter and the transmission, the converter can be locked at earlier vehicle speeds.

C) Scheduled Bypass Clutch Slip

This module determines the "TARGET" bypass clutch slip values depending on the driving condition. It loads the target slip values into a register called SLIP_TRG_S. The target slip value is then used to PID (proportional, integral, derivative) control the actual slip, SLIP_ACT, to the target value.

D) Torque Feed Forward System

Figure 15:
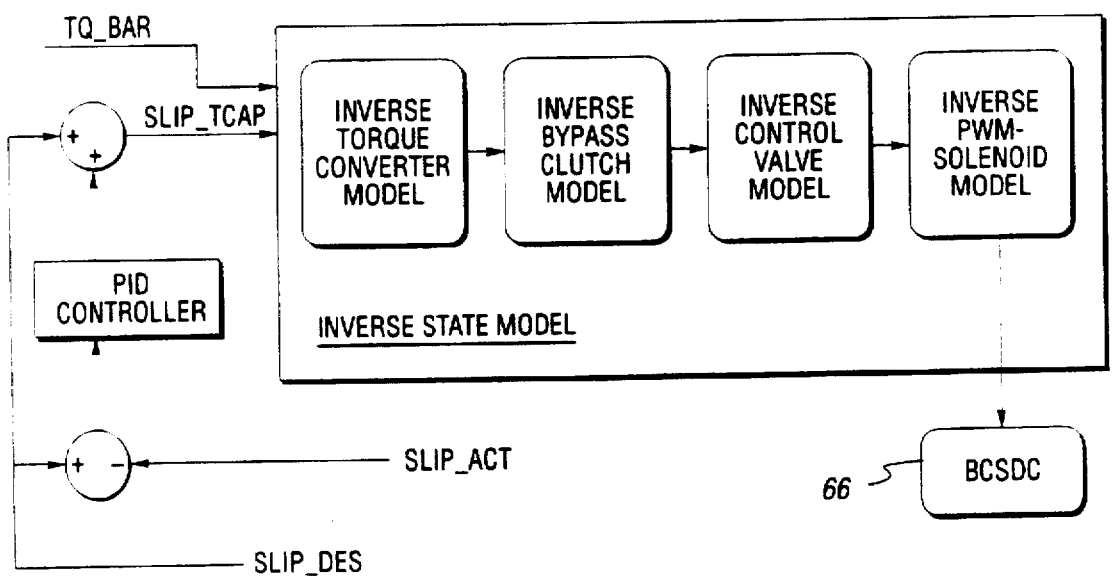
FIG. 15 is an inverse state model of the converter clutch system for the PID controller to control the bypass clutch for the transmission.

The "torque feed forward" system contains an "inverse state model" of the converter clutch. As seen in FIG. 15, the input to this model is the input torque TQ_BAR and SLIP_TCAP, which is the total desired slip across the torque converter. The output from this inverse model is the bypass clutch duty cycle BCSDC, as shown at 66. The inverse model basically includes an inverse torque converter model, an inverse bypass clutch model, an inverse control valve model and an inverse PWM-solenoid model. SLIP_TCAP is the sum of the desired slip SLIP_DES and the PID-controlled slip SLIP_ERR_PID. ERR_TO is the difference between SLIP_ACT and SLIP_DES.

This slip error is used to calculate, with the PID-controller gains, the amount of PID-controlled slip. Assuming that the converter hardware correlates with the inverse model, the calculated duty cycle should generate the amount of slip asked by SLIP_TCAP. FIG. 15 shows the complete system.

This system has the advantage of controlling a converter clutch system partially open loop and partially closed loop. It can be controlled by increasing or decreasing the amount of PID-controlled slip (SLP_ERR_PID). The calculated total slip is then fed along with the input torque through the inverse model.

In any operating mode when the converter clutch has to be controlled by adjusting a target slip value, this control system is in effect. The complete control system, which is unique for the transmission, is described in detail below.

E) Modulation Over the Shift

The "modulation over the shift" controls the desired slip value across the torque converter when a shift is taking place. The converter clutch can be modulated during upshifts and downshifts. The major tool for adjusting a slip value during a shift is in item D) described torque feed forward system. The complete system for the application is described subsequently.

F) Unconditionally Unlock Module

This module is responsible for unlocking the torque converter clutch completely, which means to set the BCSDC value to zero percent. This produces zero pressure on the converter clutch apply side and unconditionally unlocks it. Unconditional unlock is commanded when extreme driving conditions take place; i.e., braking, tip-in, tip-out, closed throttle condition, etc. The unconditional unlock system for the transmission is shown and described subsequently.

Functional Description of Control System

The hydraulic control system as well as the control strategy for the transmission now will be described. FIGS. 3a–3e establish a foundation for the actual description. It describes the total environment of the control system in the vehicle, the control strategy and the transmission itself including all interactions with the engine and the driver.

The control system is described in sub systems. It includes the hydraulic control sub systems as well as the complete system, including the control strategy which directs the hydraulic controls.

The hydraulic control system is packaged in a main control assembly consisting of:

valve body with 16 valve bores numbered from 200 to 216 including a connecting labyrinth 4 ON/OFF solenoids 10, 12, 14 and 16

1 Variable Force Solenoid 18

1 PWM-solenoid 20

11 shift valves 68, 70, 72, 74, 76, 80, 82, 84, 86, 88 and 90

1 accumulator valve 1 thermostat valve 92

2 blow off valves 94, 96

3 modulator valves 98, 100, 102

1 main regulator valve including a booster valve 104

1 manual valve 78

18 sleeves and retainer 21 springs 2 brackets to hold the solenoids separator plate which separates the valve body labyrinth from the case labyrinth by connecting holes upper and lower gaskets.

All these components comprise the hydraulic control system, which is described below.

1-2 Upshift/2-1 Downshift

Hydraulic Control System

The 1-2 upshift and 2-1 downshift controls are a nonsynchronous shift control system. By applying the intermediate band (B2), the high clutch drum connected to the sun gear of the Simpson set is decelerated to zero speed and OWC2 overruns during a 1-2 upshift. During a 2-1 downshift, the intermediate band (B2) is released the sun gear is accelerated to 0.8* engine speed. OWC2 engages again, which holds the carrier of the rear part of the Simpson set to obtain a reaction torque.

Figure 19:
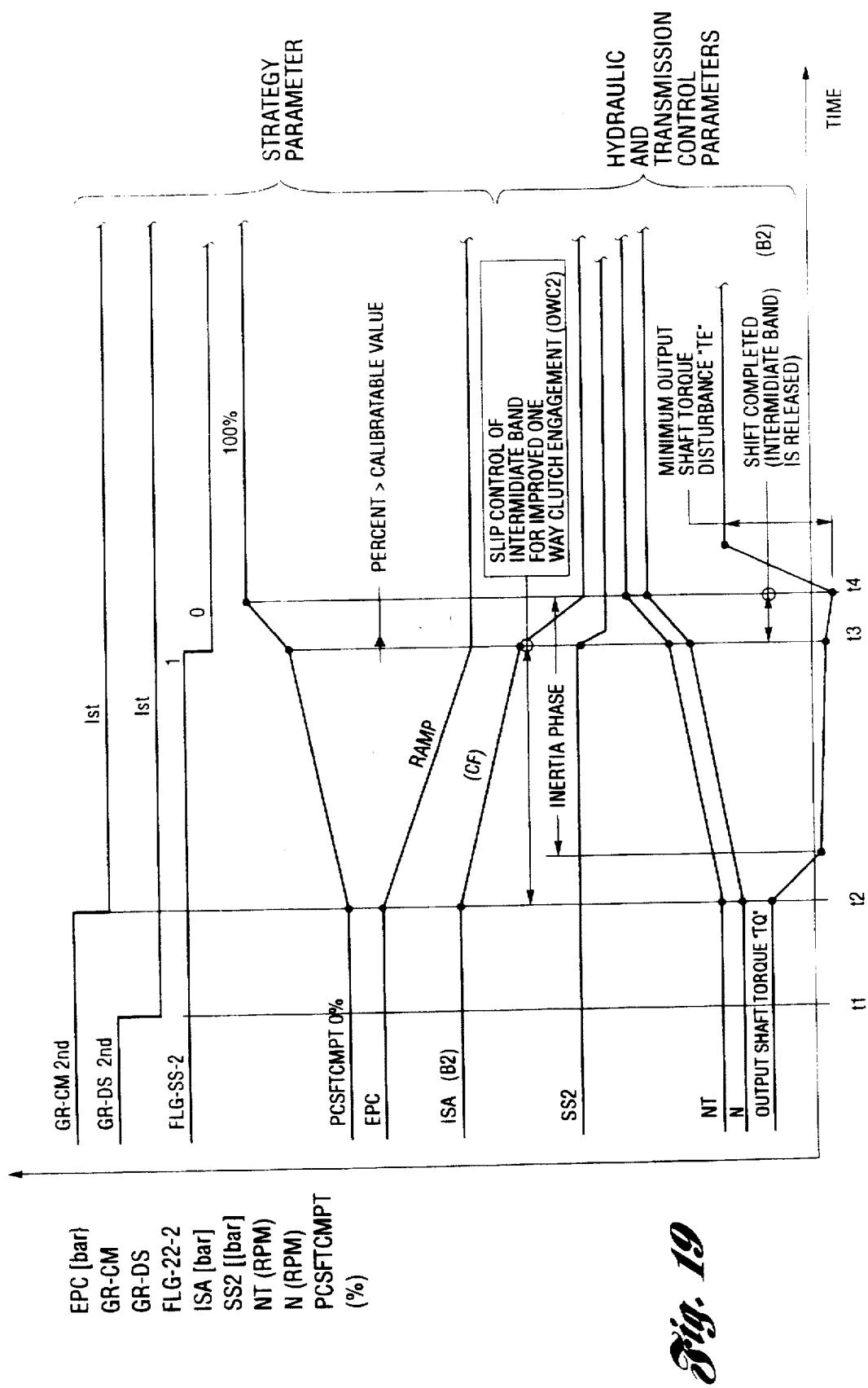
FIG. 19 is a 2-1 downshift timing diagram.

The hydraulic control system is designed to accomplish good 1-2/2-1 shift quality. FIGS. 19 and 20, respectively, show 1-2 upshift and 2-1 downshift timing diagrams. The 1-2 upshift system consists of the following components:

- main regulator system 104 in bore 208
- clutch pressure modulator (forward) 218 in bore 207
- EPC boost valve system 100 in bore 207
- variable force solenoid 18 in bore 203.

These components are responsible for the pressure buildup during a 1-2 upshift and a 2-1 downshift:

- shift solenoid 1 SS1 in bore 210
- shift solenoid 2 SS2 in bore 202
- 1-2 upshift valve 68 and spring in bore 203
- 2-3 upshift valve 70 and spring in bore 204.

1-2 Upshift System

As described above, the forward clutch modulator in bore 207 is not only used for the forward engagements, but also for all upshifts including the 1-2 upshifts. The manual lever position is in DRIVE. LINE pressure is derived from the main regulator system in bore 208 and redirected into the D/2/1 circuitry. The D/2/1 pressure is the input pressure to the clutch pressure modulator (forward) 80. The EPC output pressure of the variable force solenoid 18 in bore 203 is applied as a signal control pressure to the main regulator 104 and the clutch pressure modulator (forward) 218.

The solenoid stage for a 1-2 upshift for second gear is SS1=ON, SS2=ON and SS3=OFF. SS1 pressure is applied through the two-way ball check 234 in FIG. 3e and in FIG. 18b to the head of the 2-3 upshift valve 70 in bore 204. This moves the 2-3 upshift valve into upshift position and opens the intermediate servo apply exhaust port, seen at 236 in FIG. 3e and in FIG. 18, at the last land of the 2-3 upshift valve. Shift solenoid 2 is also energized and is applied on the head of the 1-2 upshift control valve 68 in bore 203, which moves this valve to upshift position.

The CF pressure generated from the clutch pressure modulator 218 in passage 238 is applied over orifice 240 and passage 242 to the input port of the 1-2 upshift control valve 68. Since the 1-2 upshift control valve is in upshift position, the CF pressure is applied through orifice 236 in FIG. 3c on the intermediate servo apply side, energizing the intermediate band (B2). The intermediate servo release (ISR) and the high clutch are exhausted over the reverse engagement control valve and the reverse engagement modulator 102 in bore 205 shown in FIG. 3e.

2-1 Downshift System

The solenoid stage is SS1=ON, SS2=OFF and SS3=OFF. Here shift solenoid SS2 has been turned off. When shift solenoid 2 is turned OFF, the spring in bore 203 of the 1-2 upshift valve 68 moves the shift valve into downshift position. The intermediate servo apply pressure (ISA) is released over the passage 246 connecting the 1-2 upshift valve and the 2-3 upshift valve, into the exhaust port 236. This solenoid state also effects first gear. The CF pressure input port of the 1-2 shift valve is sealed against the exhaust ports. At this point the intermediate servo loses capacity and the servo release spring pushes the servo back into the installed position.

Shift Control Strategy For 1-2 Upshift/2-1 Downshift

A general overview of the control strategy is discussed above. In order to describe the particular functions of the complete 1-2 upshift/2-1 downshift control system, the following parameters are considered:

- GR_DS desired gear (control strategy)
- GR_CM commanded gear (control strategy)
- EPC register (control strategy)
- FLG_SS_2 shift solenoid flag 2 (control strategy)
- PCSFTCMPT percentage shift complete (control strategy)
- SS2 shift solenoid 2 pressure
- ISA(B2) pressure
- N engine speed
- NT turbine speed
- TQ output shaft torque

1-2 Upshift Control

The timing diagram shown in FIG. 20 represents the 1-2 upshift timing as follows:

t1

Control Strategy

At this point the driver desires a 1-2 upshift based on shift curves throttle position (TP) versus vehicle speed (VS).

Figure 17:
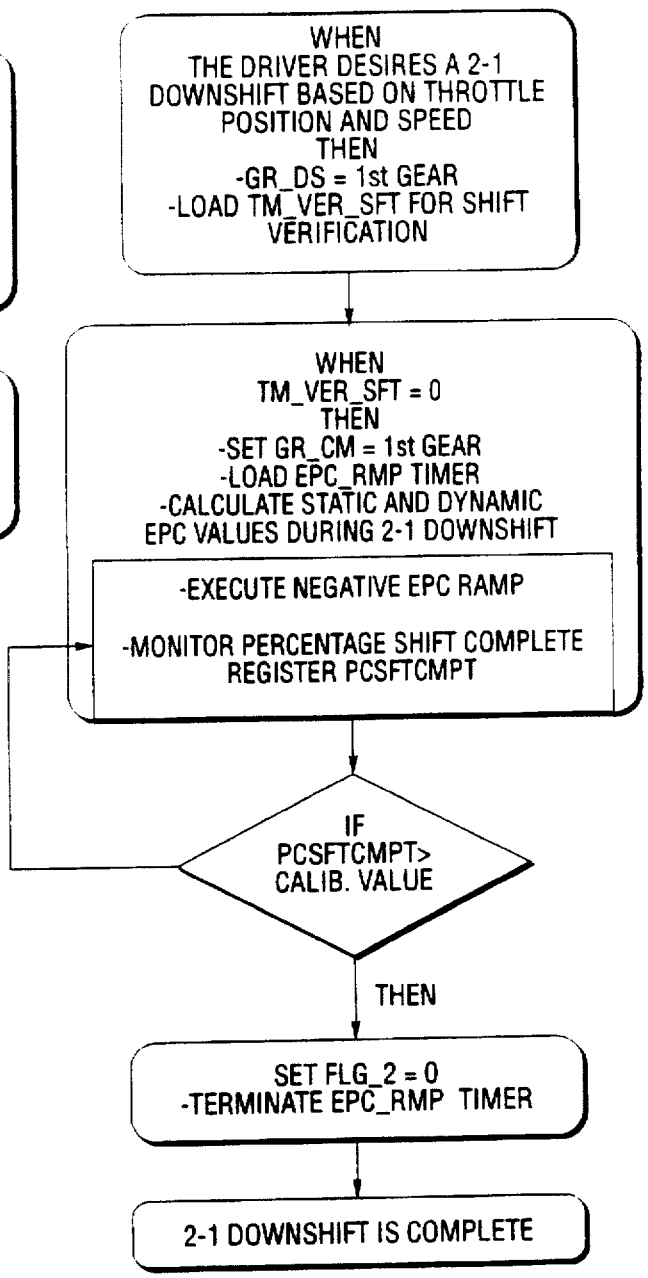
FIG. 17 shows a logic flow chart for the functions that occur during a 2-1 downshift.

The GR_DS register changes from first to second and a shift verification timer called TM_VER_SFT is loaded (see the flow chart of FIG. 17). During this time, no gear is commanded until the shift verification is completed. The dynamic EPC value for second gear is added at this point in order to save time for pressure buildup when the actual gear is commanded.

Control Hardware

EPC pressure is raised due for the same reason explained above.

t2

Control Strategy

The shift verification timer TM_VER_SFT is expired and the GR_CM register is changed to second gear. Since the GR_CM register represents the output states of the solenoids, FLG_SS_2 is set to 1 (see FIG. 19). An EPC ramp timer called EPC_RMP is loaded and an EPC ramp is triggered. Static and dynamic EPC values are calculated to satisfy the required capacity for a 1-2 upshift and are added to the EPC ramp resulting in the total amount of EPC.

Control Hardware

Since shift solenoid 2 is energized by the control strategy, the shift solenoid 2 pressure increases. The 1-2 upshift valve in bore 203 moves to upshift position and CF pressure is built up according to the commanded EPC ramp. The intermediate servo starts to stroke and to engage.

t3

Control Hardware

The intermediate band transmits the same torque as the reaction element OWC2 resulting in zero reaction torque on OWC2. The torque phase is completed and the output shaft torque is reversed and follows the CF pressure characteristic. The output shaft torque is completely dependant on the applied CF pressure on the intermediate band. Since the reaction torque is zero, the inertia phase is initiated. Engine speed and turbine speed start to drop (see FIG. 20).

t4

Control Strategy

The EPC ramp timer EPC_RMP is expired and the EPC ramp is completed. The shift is completed.

Control Hardware

The inertia phase for the output shaft torque is completed and so is the shift itself. The intermediate servo apply pressure has reached the maximum value of the ramp.

FIG. 17 is a flow diagram for the logic of the control strategy. The corresponding diagram for a 2-1 downshift is shown in FIG. 16.

Summary

The major reason why the CF pressure characteristic is applied on the intermediate servo is that it can vary the pressure from zero bar to maximum stall pressure. Low capacity as well as high capacity 1-2 upshifts can be executed. An additional advantage is the second gear start up feature, which is accomplished with the EPC boost system.

As outlined above, at the point where the inertia phase begins during a 1-2 upshift, the torque disturbance is totally dependant on the CF pressure characteristic. With the capability of varying the CF pressure by the electronic control system in the form of an EPC ramp, a minimum torque disturbance TE can be accomplished with a limited amount of slip during the shift. The negative slope of the torque phase can also be influenced by the CF characteristic.

This accumulation is software-controlled and does not require any further hardware changes. A complete accumulator system is eliminated and replaced by the CF modulator system which is also used for the forward engagements.

2-1 Downshift Control

The timing diagram shown in FIG. 19 represents the 2-1 downshift control timing as follows:

t1

Control Strategy (see Flow Chart of FIG. 16)

At this point, the driver desires a 2-1 downshift based on shift curves, throttle position (TP) versus vehicle speed (VS).

The GR_DS register changes from second to first and a shift verification timer.

TM_VER_SFT is loaded. During this time, no gear is commanded until the shift verification is completed. The dynamic EPC value for first gear is added at this point in order to save time for pressure buildup when the actual gear is commanded.

Control Hardware

EPC pressure is raised for the same reason explained above.

t2

Control Strategy (see Flow Chart of FIG. 16)

The shift verification timer TM_VER_SFT is expired and the GR_CM register is changed to first gear. An EPC ramp timer called EPC_RMP is loaded and a negative EPC ramp is triggered. Static and dynamic EPC values are calculated to satisfy the required capacity for a 2-1 downshift and are added to the EPC ramp resulting in the total amount of EPC. The shift solenoid FLG_SS_2 still remains at 1. The percentage shift complete register PCSFTCMPT is monitored during the execution of the EPC ramp.

Control Hardware

Since shift solenoid 2 is still energized by the control strategy, the shift solenoid 2 pressure stays high. The 1-2 upshift valve 68 in bore 203 stays in upshift position and CF pressure is steadily decreased according to the commanded EPC ramp. The intermediate servo starts to lose some capacity and the engine RPM N, as well as the turbine RPM, "NT", start to rise. The inertia phase is initiated. The output shaft torque decreases since CF pressure is decreasing as well. This is demonstrated in FIG. 19.

t3

Control Strategy

The percentage shift complete register is monitored, as indicated in FIG. 16. If the percentage shift complete register PCSFTCMPT has reached a value greater than a calibration threshold, the shift solenoid flag FLG_SS_2 is set to zero and the ramp timer EPC_RMP is terminated.

Control Hardware

The CF pressure ramp steadily reduces capacity up to this point. The intermediate band still transmits a partial torque. Shift solenoid 2 is now de-energized and the intermediate servo apply pressure is completely exhausted over the exhaust port 236 at the 2-3 upshift valve 70 in bore 204.

t4

Control Strategy

The percentage shift complete value is at 100 percent and the shift is completed.

Control Hardware

The inertia phase on the output shaft torque is completed and so is the shift itself. The intermediate servo apply pressure has reached zero pressure. OWC2 is engaged and output shaft torque is rising to the first gear level.

FIG. 19 shows the logic of the control strategy for 2-1 downshift control.

Summary of 2-1 Downshift

The 2-1 downshift control uses a software accumulation system to control the downshift event. By introducing a negative EPC ramp and by monitoring the percentage shift complete register PCSFTCMPT, a smooth one-way clutch engagement can be accomplished. The output torque disturbance TE is minimized and good shift quality is accomplished. By allowing the intermediate servo to hold partial torque during the inertia phase, the one-way clutch engagement quality can be improved.

The advantage of this system is that 1-2 upshift as well as 2-1 downshift accumulation is accomplished electronically without special accumulator hardware.

2-3 Upshift Control System

Hydraulic Control System

The 2-3 upshift is a synchronous upshift where the high clutch (CL2) is engaged and the intermediate band (B2) is released. Synchronization takes place between the ring gear and the stationary sun gear of the front planetary gear set of the Simpson set. The stationary sun gear is released by B2, and at the same time CL2 is engaged. The sun gear accelerates up to input shaft speed. The sun gear, ring gear and carrier rotate at input shaft speed. This is also explained above. If this synchronization is not accomplished, capacity loss and engine "flair up" will occur.

General

The capacity of the high clutch (CL2) is designed to hold maximum capacity in REVERSE position. In this case, the high clutch carries 1* input shaft torque. In third gear or during a 2-3 upshift, the high clutch is carrying 0.321* input shaft torque. Hence, the high clutch has over-capacity for a 2-3 upshift.

Figure 21A:
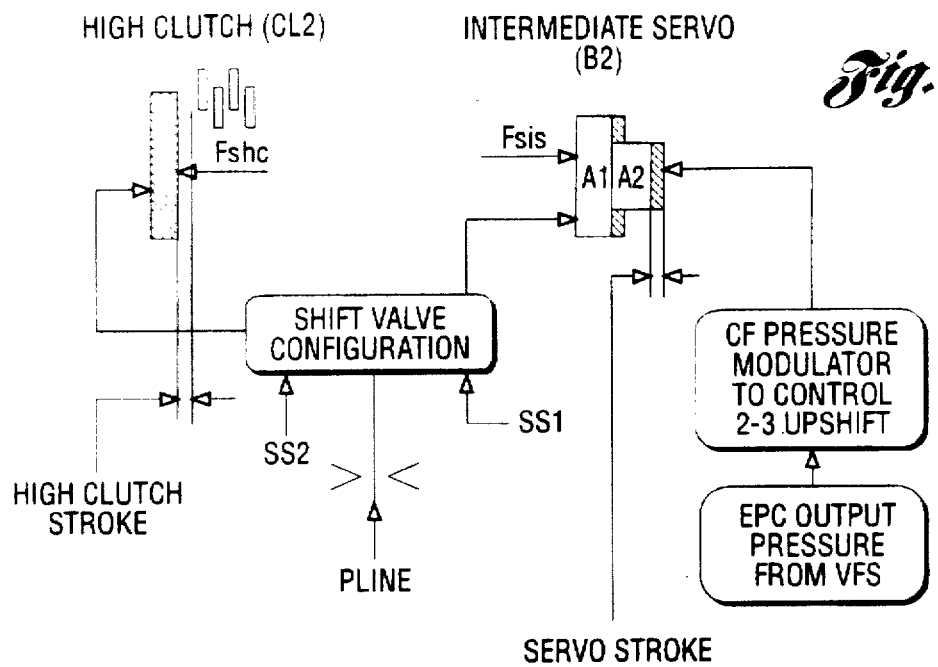
FIG. 21a shows the physical relationship between the intermediate servo and the high ratio clutch in the valve system.

In order to compensate hydraulically for this condition, the intermediate servo stroke volume is used to accumulate the high clutch. FIG. 21a shows the BASE hydraulic system used for a 2-3 upshift.

The intermediate servo is a differential piston with the areas A1 and A2. A1 is the release side of the servo and A2 is the apply side. The intermediate servo return side is applied with line pressure PLINE and the servo apply is connected with the clutch pressure modulator, applying CF pressure. This represents the intermediate servo accumulation control system to control the high clutch during a 2-3 upshift.

Figure 21B:
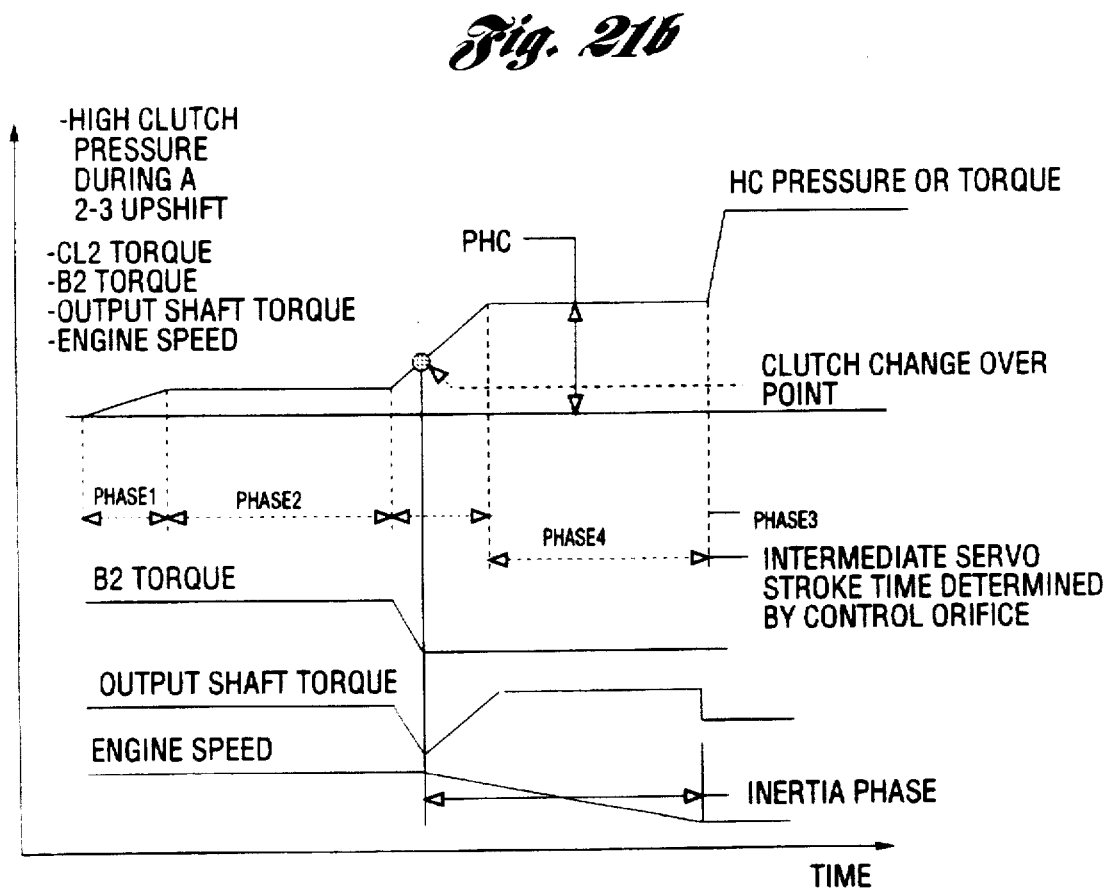
FIG. 21b shows the pressures, torque and engine speed during each phase of a 1-2 upshift.

When a 2-3 upshift is executed, the following four phases are present (see FIG. 21b):

Phase 1

The high clutch is being filled.

Phase 2

The high clutch is stroking. The stroke pressure is determined by:

HC Stroke Pressure=Fshc/Ahc

Phase 3

This is the synchronization phase for the high clutch and the intermediate band. The line pressure applied on the high clutch compresses the friction plates, and the high clutch starts to transmit torque. The high clutch pressure increases and decreases the reaction torque on the intermediate band (B2). At the point when the reaction torque is zero, the intermediate servo starts to stroke and the high clutch transmits full torque. The output shaft torque characteristic changes from the negative slope of the reaction torque to the high clutch pressure characteristic.

Phase 4

This is the accumulation phase. The line pressure which is the same forward clutch pressure feeds the system with pressure. The load applied at the front area of the servo determines the high clutch accumulation pressure. The force generated on the release side of the servo is in equilibrium with the load applied on the apply side. Changing the load on the apply side will change the accumulation pressure. The relationship is as follows:

$$PHC=(CF*A2)/A1-Fsis/A1,$$

where

PHC=high clutch accumulation pressure;

CF=clutch pressure forward;

Fsis=intermediate servo release spring load;

A1=release area of intermediate servo; and

A2=apply area of intermediate servo.

Here the CF pressure is electronically controlled by the pressure settings for the EPC output pressure of the VFS. By varying the EPC pressure, the CF pressure is varied; and with this, the high clutch accumulation pressure. The accumulation time is determined by the size of the control orifice which allows a metered flow to the high clutch. During this time the inertia phase of the 2-3 upshift is executed and the 2-3 upshift is completed. When the intermediate servo has stroked, the high clutch pressure raises up to line pressure level. (See FIG. 21b.)

Hydraulic Control System

FIGS. 3b–3e and the enlargement of FIGS. 22a and 22b show the 2-3 upshift control system. It consists of the following components:

for pressure buildup:

clutch pressure modulator (forward) 218 in bore 207,

EPCB valve 100 in bore 207, main regulator system in bore 208,

VFS 18 in bore 203, for shift execution:

shift solenoid 1, shown at 10, in bore 210, shift solenoid 2, shown at 12, in bore 202, 2-3 upshift control valve 70 in bore 204, 1-2 upshift control valve 68 in bore 203, MAN1 timing valve 84 in bore 212, 3-2 downshift KD control valve 76 in bore 211, 3-2 downshift TD control valve 74.

The 2-3 upshift is controlled by turning off two solenoids, which are SS1 and SS2. The shift solenoid sequence is as follows:

|  | SS1 | SS2 | SS3 |
|---|---|---|---|
| 2ND GEAR | ON | ON | OFF |
| INTERMEDIATE STEP 1 | OFF | ON | OFF |
| 3RD GEAR | OFF | OFF | OFF |

One design feature is a transmission default into third gear in case of a power loss. Defaulting into third gear maintains the ability to continue vehicle operation. In this regard, the third gear solenoid stage was established with all solenoids turned off.

In second gear, SS1 and SS2 are turned on. This solenoid stage is described in previous sections. When shift solenoid 1 is turned on, the 2-3 upshift valve is in upshift position. The CF/3/4/EX circuitry is open to the ISA exhaust port. The 1-2 upshift valve, also in the upshift position, seals the intermediate servo apply pressure against the CF/3/4/EX exhaust port. When both solenoids are turned off simultaneously, both shift valves move into the downshift position and the intermediate servo apply pressure is exhausted in quickly through the CF/3/4/EX circuitry into the ISA exhaust port. This ISA exhaust port was designed to effect first gear where the intermediate servo apply is exhausted with only shift solenoid 1 turned on.

In order to prevent this quick exhaust of the intermediate servo, an intermediate step has been implemented. This intermediate step is shown in FIG. 22b. By turning off shift solenoid 1 and leaving shift solenoid 2 turned on, the following functions are accomplished:

- the 2-3 upshift valve 70 is in downshift position and closes the ISA exhaust port. This prevents a fast exhaust of the ISA pressure.

- the 3-2 downshift KD control valve 76 is shifted to downshift position and prevents a pre-filling of the intermediate servo release during the intermediate step, which would lead to capacity loss on brake B2 otherwise. When the 2-3 upshift valve 70 is in downshift position, D/2/1 pressure is distributed into the D3, 4/3-2DS circuitry, shown at 252 in FIGS. 3e and 3a. This pressure is prevented from entering the ISR/HC/TD circuitry, shown at 254 in FIG. 3c with the last land of the downshifted 3-2 downshift KD control valve 76 sealed against the ISR/HC/TD passage.

With the downshifting of the 2-3 upshift valve 70, CF modulator pressure is linked to CF3, 4/Ex passage 246. This is needed to use the CF modulator 218 as a capacity controlling tool on the ISA side during a 2-3 upshift.

High clutch (CL2) and intermediate servo (B2) are exhausted over the 3-2 downshift TD valve 74 in bore 213, over the 3-2 downshift KD control valve 76 in bore 211 and over the TD/EX passage 256, seen in FIG. 3c, through orifice 258 into an exhaust port. This is possible since with the shift solenoid 2 turned on, the MAN1 timing valve 84 is in its upshift position and opens the exhaust port 260. The transmission stays only a calibratable amount of time in this intermediate stage until the valves 3-2 downshift KD control valve 76 and the 2-3 shift valve 70 in bores 211 and 204, respectively, are in their upshift positions.

When shift solenoid 2(SS2) is turned off the actual 2-3 upshift is initiated. This is shown in FIG. 22a. All solenoids are turned off and the MAN1 timing valve 84 in bore 212 and the 1-2 upshift valve 68 in bore 203 are shifted into their downshift positions. The valve 84 in bore 212 closes the exhaust port 260 and fills the TD/EX and HC Rel circuities. The actual feed of the high clutch and the intermediate servo release takes place through the D3, 4/3-2DS input port on the 1-2 upshift valve 68 through the control orifice. 264 in FIG. 3e, which is placed in front of the 2-3 upshift valve 70 in bore 204. The high clutch is energized over the HC-APPLY passage 212. The intermediate servo is energized over the 3-2 downshift TD control valve 74 in bore 213 and the 3-2 downshift KD control valve 76 in bore 211 through orifices 268, 266 and 270. The 2-3 upshift then is completed.

2-3 Upshift Control Strategy

Figure 22:
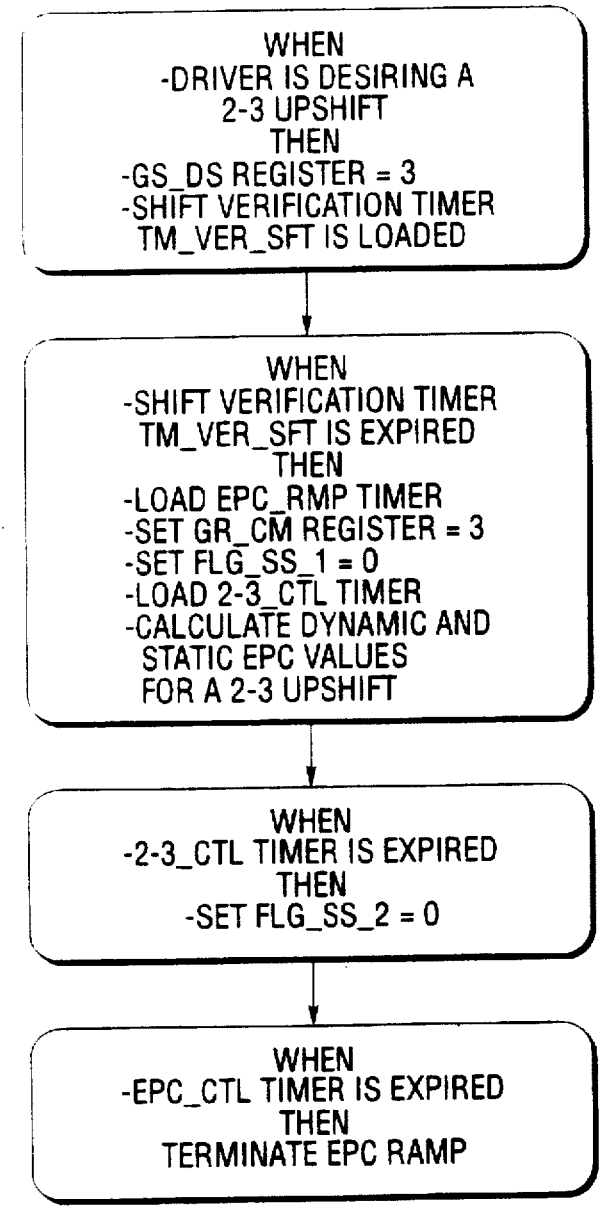
FIG. 22 shows the control strategy for a 2-3 upshift and the functions that are carried out in sequence.
Figure 23:
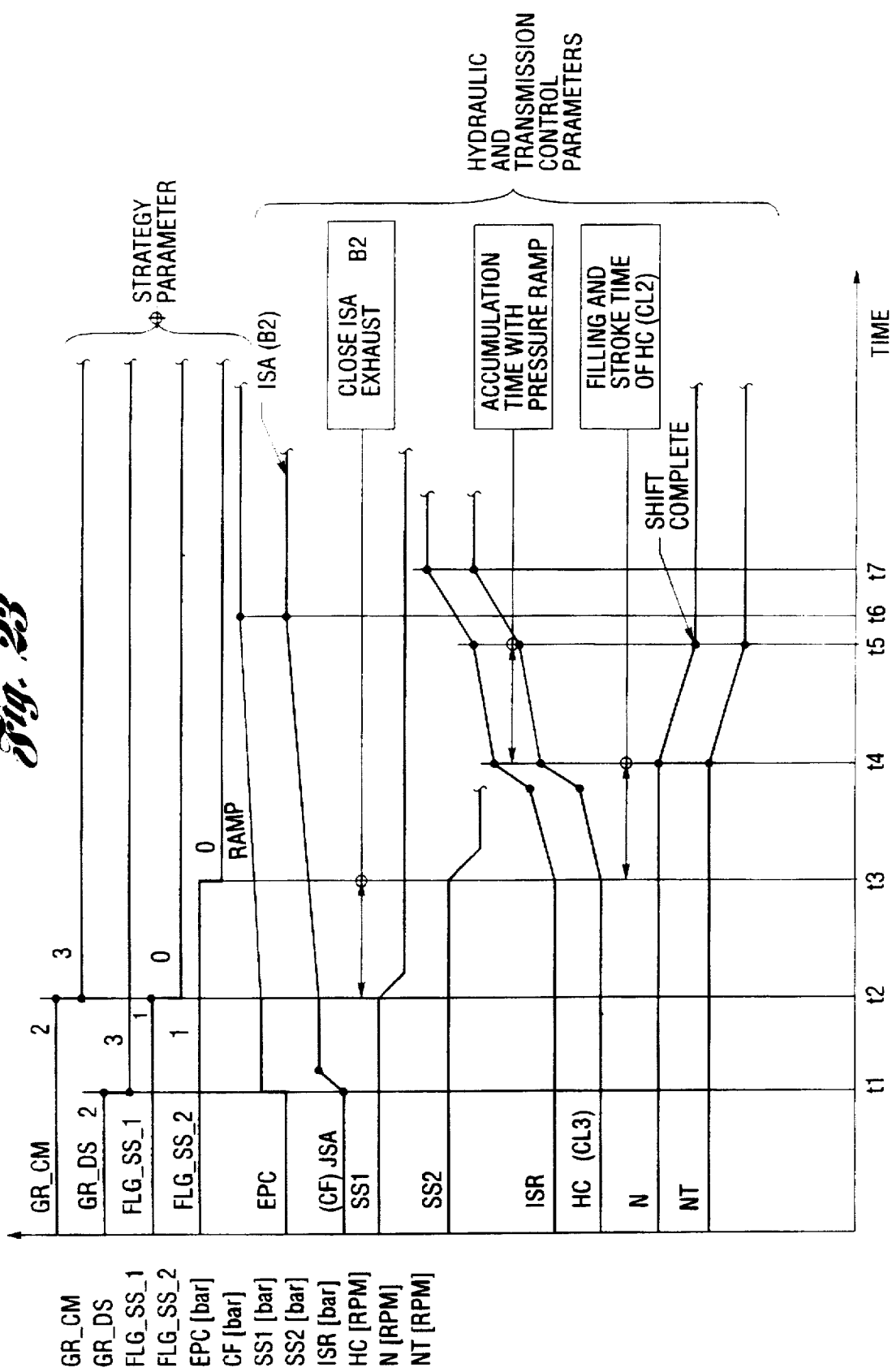
FIG. 23 is a 2-3 upshift timing diagram.

In order to describe the total control system, the following parameters are considered:

GR_CM commanded gear (control strategy)
GR_DS desired gear (control strategy)
FLG_SS_1 shift solenoid flag 1 (control strategy)
FLG_SS_2 shift solenoid flag 2 (control strategy)
EPC register (control strategy)
ISA pressure (intermediate servo apply pressure)
SS1 pressure
SS2 pressure
ISR pressure (intermediate servo release pressure)
HC pressure (high clutch pressure)
N engine speed
NT turbine speed FIG. 23 shows a 2-3 upshift timing diagram which illustrates the function of the complete system. The 2-3 upshift is sub-divided into 7 phases.

t1
Control Strategy (see FIG. 22)

The driver desires a 2-3 upshift, which is triggered by functions of throttle position versus vehicle speed. The GR_DS register is changed to 3 and the shift verification timer TM_VER_SFT is loaded. The dynamic EPC is added at this point for a 2-3 upshift to initiate pressure buildup prior to the execution of a 2-3 upshift.

Control Hardware

The CF pressure rises due to the desired dynamic EPC values.

t2
Control Strategy (see FIG. 22)

The shift verification timer TM_VER_SFT is expired and the gear commanded register GR_CM is changed to 3. At this point shift solenoid flag FLG_SS_1 is set to zero, and a 2-3 upshift control timer 2-3_CTL is loaded to delay the reset of shift solenoid flag LG_SS_2. The 2-3 upshift control timer can be modified with transmission oil temperature (TOT) since the exhaust slopes of the shift solenoids are a function of oil viscosity. The EPC_RMP timer is loaded, which initiates a positive pressure ramp. In addition static and dynamic EPC values are calculated for a 2-3 upshift and added to the EPC ramp.

Control Hardware

The shift solenoid 1 is de-energized and the valves 76 and 70 in bores 211 and 204 are in their downshift positions. The ISA exhaust port is closed by the shift valve in bore 204, and the pre-filling of the intermediate servo release is prevented by the 3-2 downshift KD control valve 76 in bore 211.

t3
Control Strategy (see FIG. 22)

The 2-3 upshift delay timer 2-3_CTL is expired and the shift solenoid flat FLG_SS_2 is set to 0.

Control Hardware

The shift solenoid 2 is de-energized and the 2-3 upshift is initiated by filling the high clutch and the intermediate servo release circuits. This is accomplished by downshifting the valves in bore 203 (1-2 upshift valve) and in bore 212 (man 1 timing valve).

t4
Control Hardware

The synchronization between the high clutch and the intermediate band is completed and the start of a 2-3 upshift takes place. The intermediate servo starts to stroke and follows the commanded EPC pressure ramp to accumulate for a 2-3 upshift. The engine rpm N and the turbine rpm NT are dropping.

t5
Control Hardware

The intermediate servo has fully stroked and the accumulation process is completed. The 2-3 upshift has to be completed during this accumulation time. The intermediate servo is grounded and the high clutch pressure raises up to D/2/1 pressure level.

t6
Control Strategy

The EPC_RMP time is expired and the EPC ramp is completed.

Control Hardware

The high clutch pressure is about to rise to the D/2/1 pressure level.

t7
Control Hardware

The high clutch pressure is now at the D/2/1 pressure level.

The 2-3 upshift control strategy is shown in flow diagram form in FIG. 22.

Summary

Electronic control is used for shift execution and to improve the pressure settings for the accumulator system on the apply side. With the CF pressure generated by the clutch pressure modulator 218 in bore 207, the load on the intermediate servo apply side can be varied from zero to maximum CF pressure.

Conventional hydraulic systems have line pressure as the controlling pressure on the servo apply side. Since the line pressure is clipped by the idle line pressure system to an idle line pressure threshold, the minimum 2-3 upshift capacity is clipped with the consequence that low and medium torque shifts are executed with a "single capacity" 2-3 upshift.

This system also effects a 2-3 back out control to handle power off 2-3 upshifts. In a conventional hydraulic system, a back out valve which is provided to dump the ISA pressure into the ISR circuit when the TV pressure has fallen under a certain value. The system releases the intermediate servo before the high clutch is applied. A "back-out system" is eliminated in our improved circuit since the variable load on the intermediate servo allows accumulation pressures with lower load than idle line pressure on the intermediate servo.

3-2/4-2 Downshift System

Preview

Figure 24:
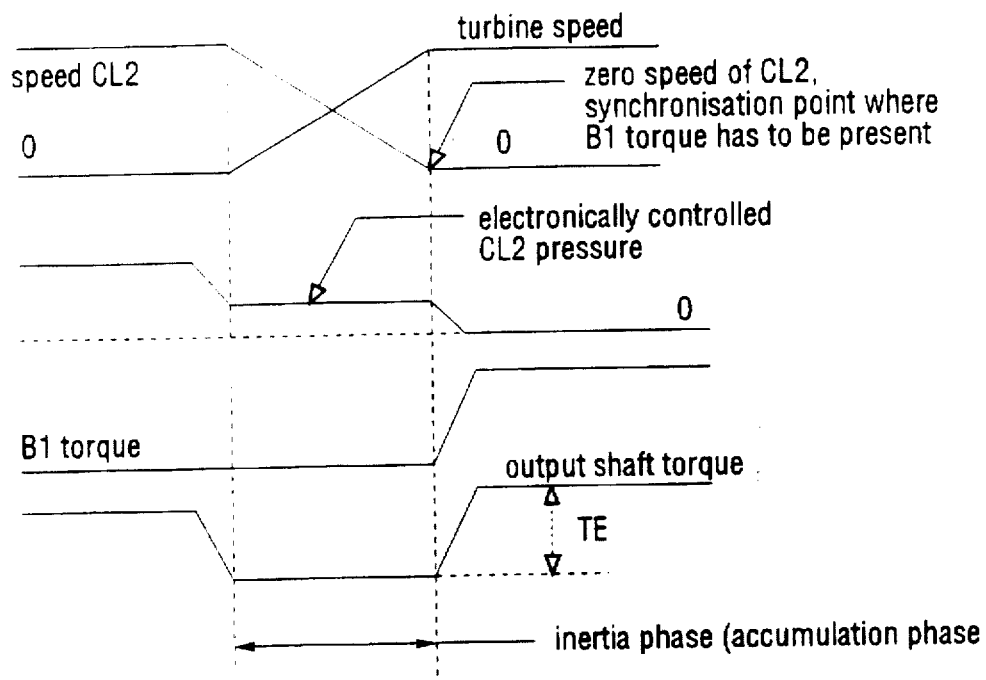
FIG. 24 is a 3-2/4-2 downshift diagram indicating the speeds and the torques that exist throughout the duration of the downshift interval.

The 3-2 and 4-2 downshifts are synchronous downshifts. The electronic control system synchronizes the release of the high clutch (CL2) and the apply of the intermediate band (B2). The synchronization point is at zero speed of the high clutch drum (CL2 speed). At this point intermediate band torque has to be present. Simultaneously the pressure profile of the high clutch has to be controlled in order to minimize the output shaft torque disturbance TE (see FIG. 24).

Figure 25A:
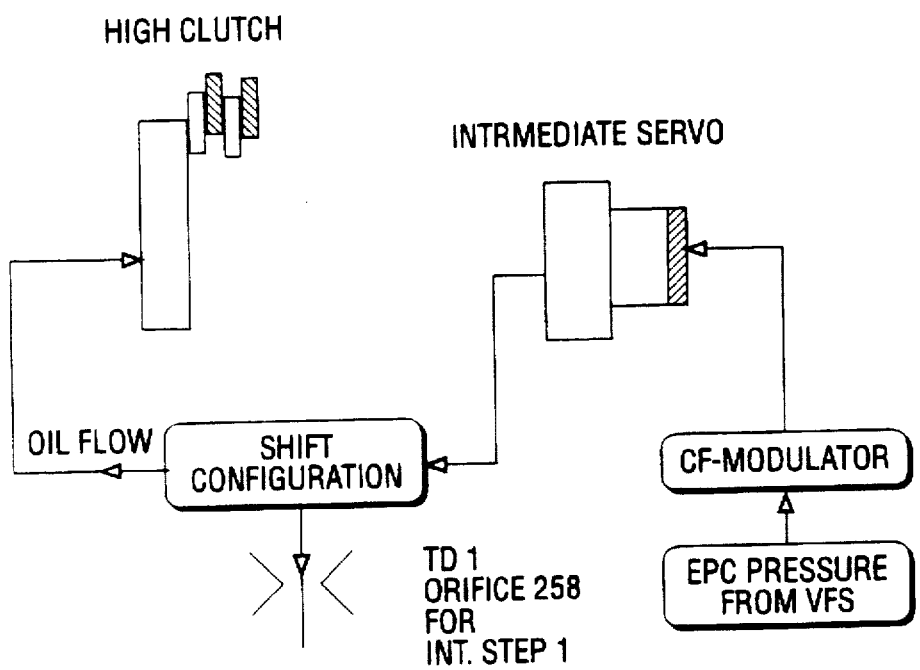
FIG. 25a shows the physical relationship between the high clutch and the intermediate servo during the first of two intermediate steps during a downshift.
Figure 25B:
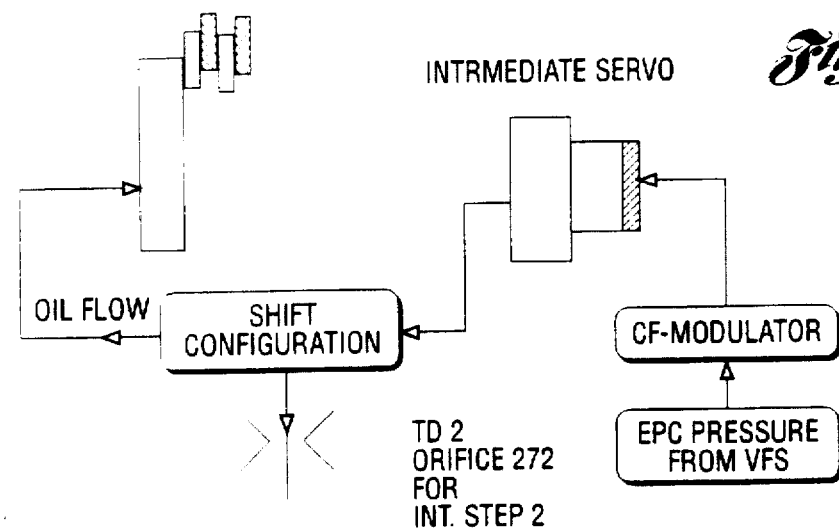
FIG. 25b shows the clutch and brake servo elements indicated in FIG. 25a, but they illustrate the second intermediate step during the downshift.

The transmission has two solenoid stages designated as intermediate steps between third/fourth gear and the final second gear stage. The two intermediate steps are achieved with shift solenoids SS1, SS2 and SS3. FIGS. 25a and 25b schematically represent the control systems in a simplified manner. The intermediate servo apply is controlled, as explained earlier, by the clutch pressure modulator valve 218 producing CF pressure.

The oil in the high clutch and intermediate servo release circuit is exhausted over a shift valve configuration through two different torque demand orifices, which are orifices 258 and 272 (see FIG. 3c and FIGS. 28a and 28b. The intermediate servo creates pressure on the high clutch piston, producing a distinct pressure profile on the high clutch.

This pressure profile is produced during the intermediate servo stroke phase and is entirely dependent on the CF-pressure and the EPC pressure characteristic. This pressure profile serves as an accumulator pressure for the high clutch as well as a synchronization tool to synchronize both elements. This pressure profile is usually in form of a positive or negative EPC ramp, which then also produces an equivalent pressure characteristic on the high clutch. The reason for the dependence between the EPC pressure and the high clutch pressure is that, with the size of the orifices 272 and 258, a metered amount of oil is released and the remaining oil flow is used to control the high clutch during the intermediate servo stroke phase. The pressure applied on the high clutch during a 3-2 downshift is required to hold engine torque during the stroke phase of the intermediate servo. With high input torque and low high clutch pressure, capacity loss will take place and the engine may flair up. This is explained later.

Two different orifice sizes are chosen in order to cover high speed and low speed 3-2 downshifts. As stated earlier the two control orifices are selected over two distinct solenoid stages (see FIGS. 25a and 25b), which are:

|  | SS1 | SS2 | SS3 |
|---|---|---|---|
| 2nd gear: | SS1 = ON | SS2 = ON | SS3 = OFF |
| intermediate step 1: | SS1 = OFF | SS2 = ON | SS3 = OFF (Orifice 258) |
| intermediate step 2: | SS1 = OFF | SS2 = ON | SS3 = ON (Orifice 272) |
| 3rd gear: | SS1 = OFF | SS2 = OFF | SS3 = OFF |

During a gear change from third to second, the intermediate steps can be selected individually or both in series if required.

Figure 26:
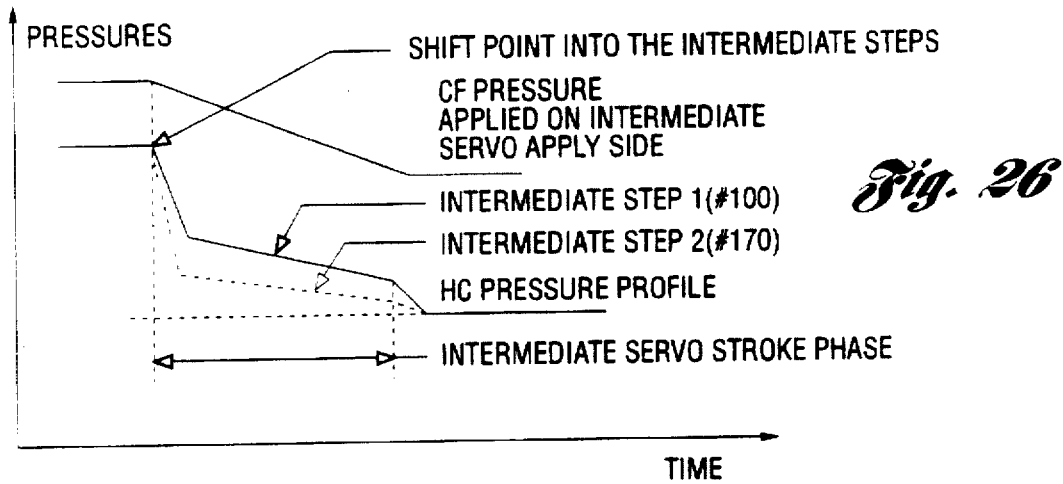
FIG. 26 is a typical pressure profile for a 3-2/4-2 downshift during the shift interval.

A typical pressure profile is shown in FIG. 26.

The intermediate steps 1 and 2 are explained in detail subsequently along with the control strategy.

The transmission contains a third option for 3-2/4-2 downshift control. This also is explained subsequently. This third option is a replacement of the intermediate step 2 and is called HIGH CLUTCH EX step. With the same shift solenoid stage SS1=OFF, SS2=ON and SS3=ON, this feature requires a modified valve system in bore 213.

Figure 27:
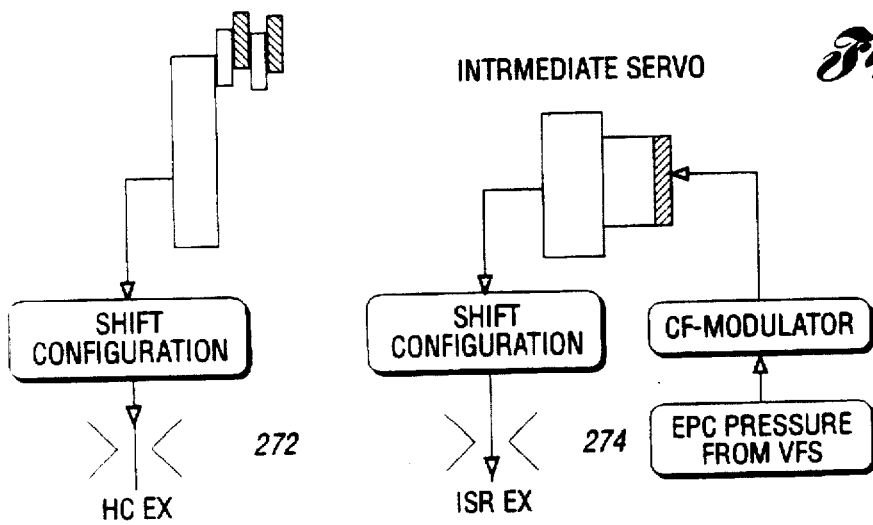
FIG. 27 shows the high clutch and the intermediate servo as they carry out an alternate downshift strategy.

The control system is shown in a simplified manner in FIG. 27. FIG. 27 shows that the high clutch is disconnected from the intermediate servo and is released separately over orifice 272. The intermediate servo release is also released over a separate exhaust port 274. In this case the high clutch is released and the engine torque decelerates or accelerates the inertia masses located in front of the high clutch.

With the inertia balance between engine torque and the rotating elements in front of the clutch, this control system is independent of the clutch torque of the high clutch. When the high clutch drum speed has reached zero speed, the intermediate band (B2) is applied for second gear (see FIG. 24). The synchronization is completed when the intermediate band carries torque at zero high clutch drum speed. However, this system requires low engine torque and high inertias to accomplish an inertia balancing time window.

Therefore, this system is mainly used for powertrains with low engine torque.

Hydraulic Control System

All three options; i.e.,

1) Intermediate step 1

2) Intermediate step 2

3) HC EX step, are realized with the following hardware components:

Pressure Build-Up:

VFS variable force solenoid 18 in bore 203 clutch pressure modulator (forward) 218 in bore 207 main regulator valve 104 in bore 208

Shift Valve Configuration:

shift solenoid 1 SS1 shift solenoid 2 SS2 shift solenoid 3 SS3

2-3 upshift control valve 70 in bore 204

1-2 upshift control valve 68 in bore 203

3-2 downshift TD control valve 74 in bore 213

MAN1 timing valve 84 in bore 212

3-2 downshift KD control valve 76 in bore 211 sleeves and retainer 3-4 shift valve 72 in bore 215

Shift Control Parameters

For all three options, the following shift control parameters are used to describe the whole system:

GR_CM commanded gear (control strategy)

GR_DS desired gear (control strategy)

FLG_SS_1 shift solenoid flag 1 (control strategy)

FLG_SS_2 shift solenoid flag 2 (control strategy)

FLG_SS_3 shift solenoid flag 3 (control strategy)

PCSFTCMPT percentage shift complete (control strategy)

EPC register (control strategy)

CF clutch pressure modulator forward

SS1 shift solenoid pressure 1

SS2 shift solenoid pressure 2

SS3 shift solenoid pressure 3

ISR intermediate servo release pressure

HC high clutch pressure

N engine speed

NT turbine speed

HCDS high clutch drum speed

The three different systems are described here in detail.

Intermediate Step 1 (IS1)

Hydraulic Control System

The solenoid stages for changing from third to second with intermediate step 1 are as follows:

|  | SOLENOID STAGES | SS1 | SS2 | SS3 |
|---|---|---|---|---|
| 3-2 DOWNSHIFT | 3RD GEAR | OFF | OFF | OFF |
| SHIFT SEQUENCE | INTERMEDIATE STEP 1 | OFF | ON | OFF |
|  | 2ND GEAR | ON | ON | OFF |

Figure 30:
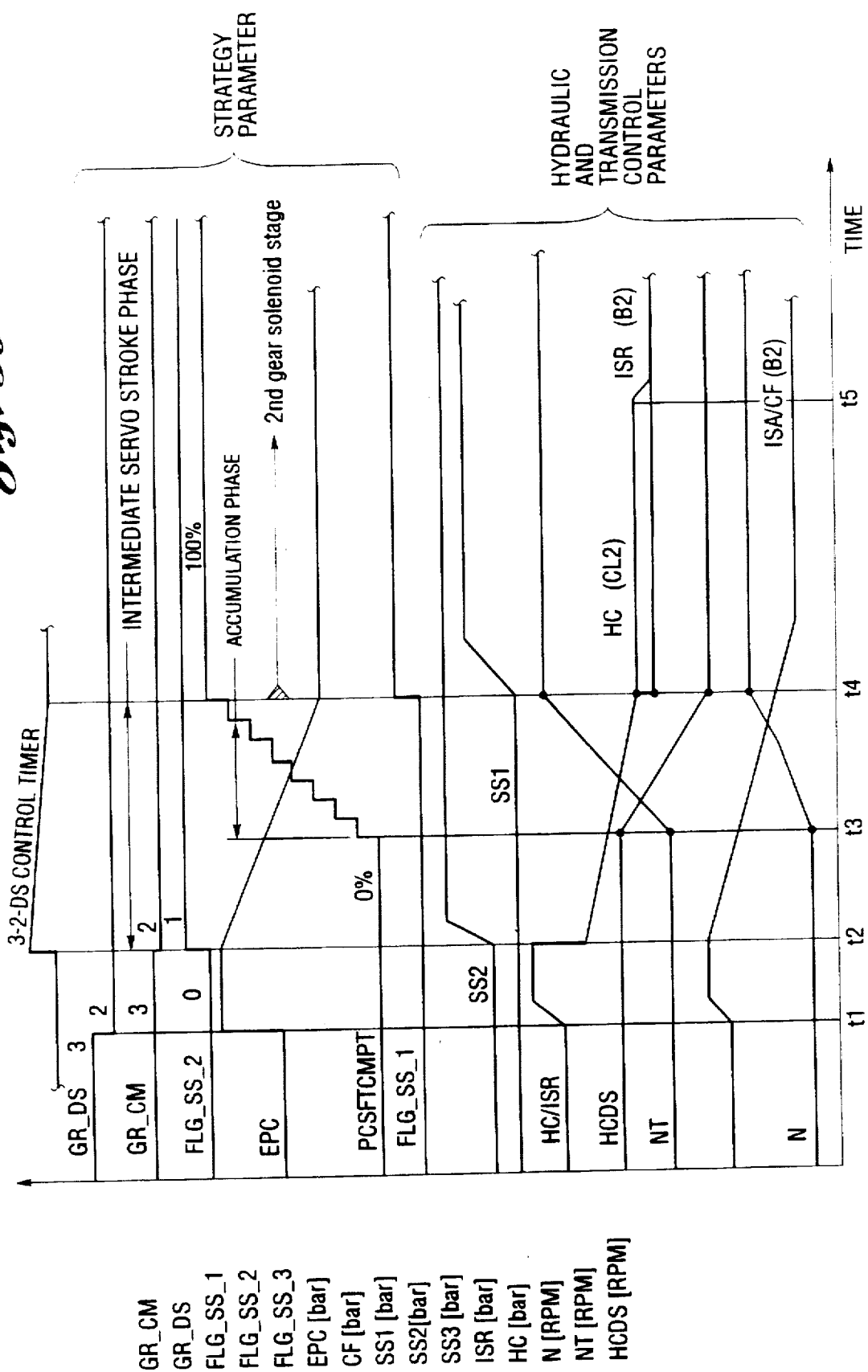
FIG. 30 is a 3-2 downshift timing diagram for intermediate stage 1 using an open loop control.

The shift sequence of a 3-2 downshift is from third gear over the intermediate step 1 to second gear. The transmission stays in the intermediate step 1 for a calibratable amount of time. In third gear, the intermediate servo release and the high clutch pressure circuits are pressurized with D/2/1 pressure from the main regulator system. This was shown and explained previously. When a 3-2 downshift is executed, the intermediate step 1 is commanded. FIG. 30 shows a timing diagram for the hydraulic control system for this immediate step. In this case, the shift solenoid 2 is energized and all other solenoids are de-energized. With shift solenoid 2 energized, the 1-2 upshift valve in bore 203 and the MAN 1 timing valve in bore 212 are in upshift position.

CF pressure produced by the clutch pressure modulator forward in bore 207 is connected over the 2-3 upshift valve in bore 204 and the 1-2 upshift valve in bore 203 to the intermediate servo apply side. The MAN1 timing valve opens the torque demand exhaust port (TD EX) with control orifice 258. The D/3/4/3-2DS circuitry, which is pressurized with D/2/1 pressure, is disconnected from high clutch and intermediate servo release. The intermediate servo starts to stroke and release partially oil through control orifice 258 and simultaneously applies the high clutch with a controlled intermediate servo release pressure. The connection of high clutch and intermediate servo release is done over the 3-2 downshift TD control valve in bore 213. When the control strategy is commanding second gear, the 2-3 upshift valve in bore 204 and the 3-2 KD control valve in bore 211 are in their upshift positions. The shift valve in bore 204 disconnects the D/2/1 pressure from the D/3/4/3-2DS circuitry and opens the CR/R/EX port to the D/3/4/3-2DS channel. The shift valve in bore 211 opens the intermediate servo release side to the D/3/4/3-2DS channels and exhausts the rest of the oil into the CR/R/EX port.

The high clutch pressure is now disconnected from the oil flow of the intermediate servo release circuit and the pressure drops instantaneously The high clutch now is released over the 1-2 upshift valve across the shift valve in bore 213 into the exhaust port 272. The high clutch starts to stroke and release all the rest oil through this orifice 272. The 3-2 downshift then is completed.

Control Strategy of the IS1 System

Figure 28:
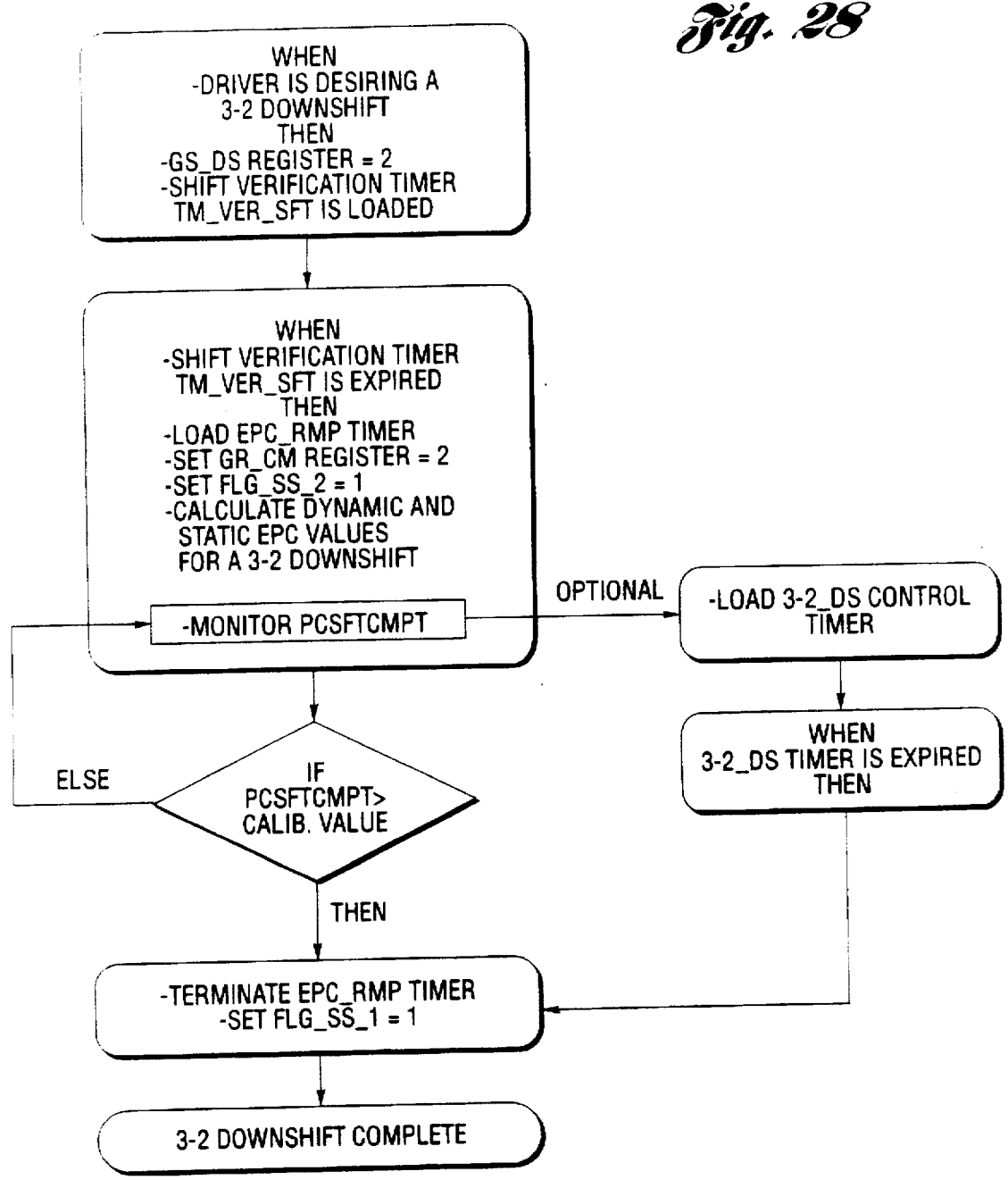
FIG. 28 is a 3-2 downshift control strategy flow diagram.
Figure 29:
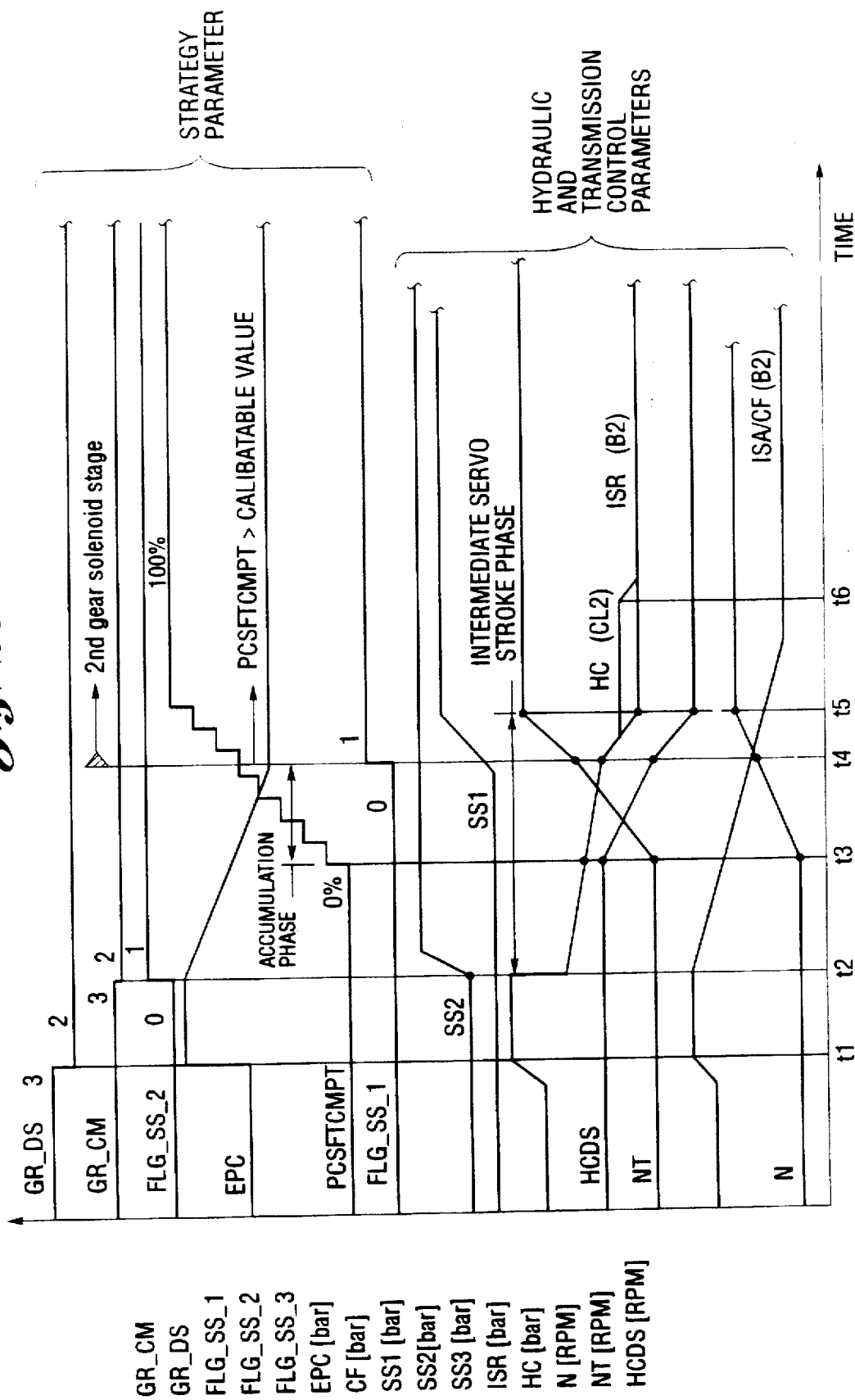
FIG. 29 is a 3-2 downshift timing diagram with closed loop control using intermediate step 1.
Figure 31:
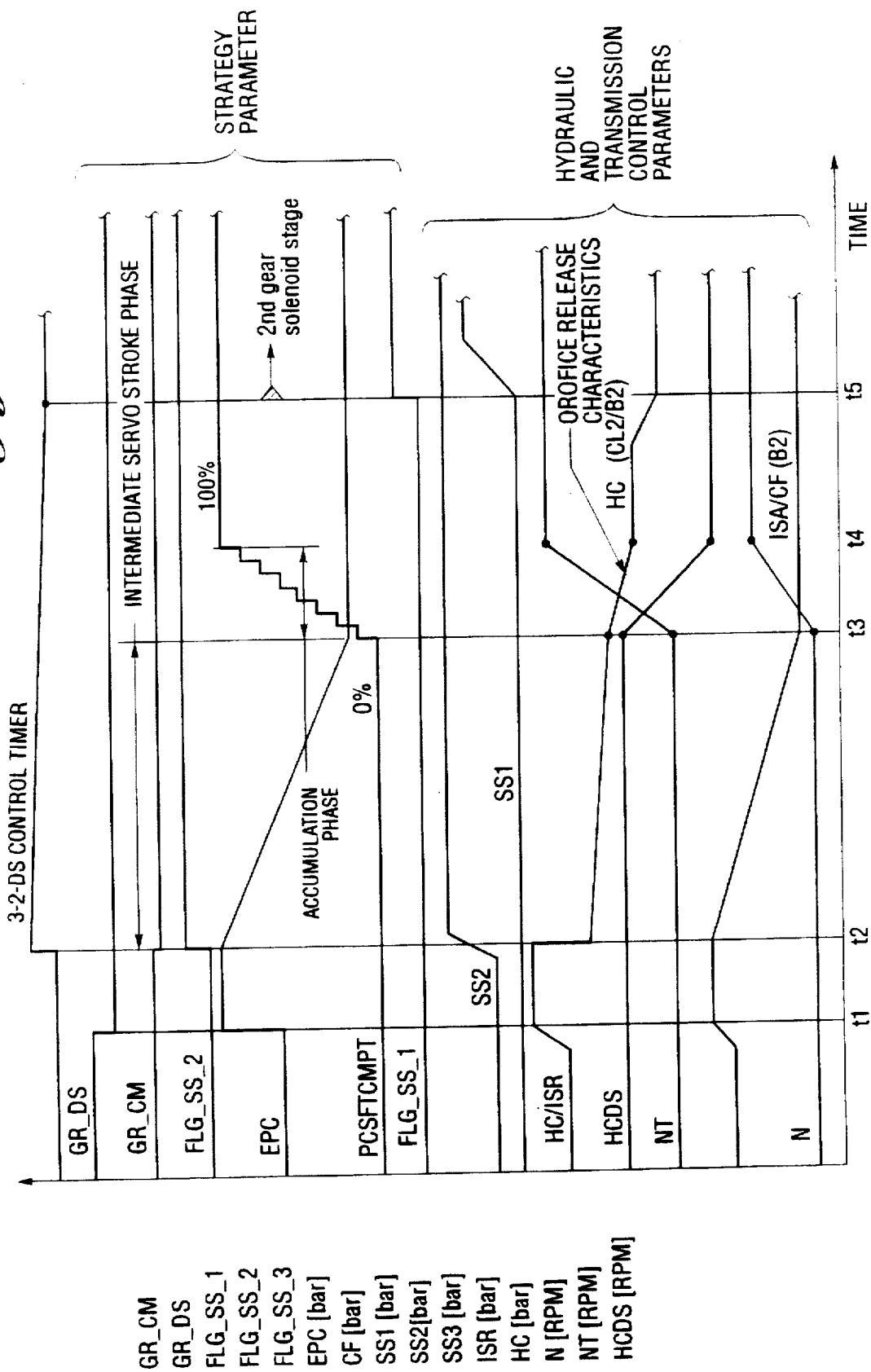
FIG. 31 is a view similar to FIG. 1 indicating a 3-2 downshift timing diagram using an alternate orificing arrangement with intermediate step 1.

FIG. 28 shows a flow diagram of the control strategy. FIGS. 29, 30 and 31 show timing diagrams for three calibration options for controlling a 3-2 downshift with the intermediate step 1. The calibration options are:

A) OPTION1—closed loop control
B) OPTION2—open loop control
C) OPTION3—orifice control A) OPTION1—Closed Loop Control FIG. 29 shows a 3-2 downshift timing diagram for the control strategy and the control hardware. The downshift control is closed loop controlled and is sub-divided into six phases:

t1
Control Strategy (see FIG. 28)

The driver demands a 3-2 downshift which is triggered by functions of throttle position versus vehicle speed. The GR_DS register is changed to second and the shift verification timer TM_VER_SFT is loaded. The dynamic EPC is added as required for a 3-2 downshift prior to the execution of the 3-2 downshift.

Control Hardware

The CF pressure rises due to the desired EPC values.

t2
Control Strategy (see FIG. 28)

The shift verification timer TM_VER_SFT is expired and the gear commanded register GR_CM is changed to 2. At this point, shift solenoid flag FLG-SS-2 is set to 1 and the EPC_RMP timer is loaded to initiate a negative pressure ramp. In addition, static and dynamic EPC values are calculated and are added to the EPC ramp. With shift solenoid 2 turned on, intermediate step 2 is initiated. The strategy starts to monitor the percentage shift complete register.

Control Hardware

Shift solenoid 2 is energized, which moves the MAN1 timing valve 84 into upshift position. This opens the exhaust port TD1 to control orifice 258 and initiates a pressure drop on the high clutch and intermediate servo release pressure. The intermediate servo apply starts to follow the negative EPC ramp and starts to stroke. The pressure drop on high clutch and intermediate servo stops at the point where the servo strokes and follows with an equivalent pressure characteristic according to the intermediate servo apply pressure.

t3
Control Strategy

The strategy monitors the percentage shift complete register PCSFTCMPT, as shown in FIG. 28.

Control Hardware

The high clutch pressure continues to ramp the pressure down according to the ISA characteristic. The point then has been reached where the high clutch starts to slip and stays at the capacity level to maintain slip. The inertia phase of the shift is initiated. The turbine speed NT and the engine speed N accelerate whereas the high clutch drum speed (HCDS) is decelerating. Here the high clutch torque level is slightly higher than input torque ratio. This reduces the absolute torque disturbance on the output shaft and the transmission starts to accumulate.

t4
Control Strategy

The strategy has monitored a percentage shift complete value which is higher than a calibratable value (see FIG. 28). The second gear solenoid stage is finally initiated, and shift solenoid flag FLG__SS__1 is set to 1. The intermediate step 1 is completed. With the monitoring of the percentage shift complete value, the high clutch drum speed is inferred. This eliminates the necessity of a high clutch drum speed sensor for closed loop control purposes. The EPC_RMP timer is terminated and second gear static EPC values without the ramp values are commanded.

Control Hardware

Shift solenoid 1 is turned on. With shift solenoid 1 turned on, the 3-2 downshift KD control valve 76 is moved into upshift position. This valve disconnects the high clutch from the intermediate servo. The high clutch pressure drops instantaneously and starts to release completely. The shift valve 70 in bore 204 opens the CR/R/EX exhaust port where the intermediate servo release pressure is being released. At this point, the intermediate servo is almost applied. The engine and the turbine speed increase up to their final value and the high clutch drum speed moves towards zero.

t5
Control Hardware

The intermediate servo has fully stroked and is applied on the high clutch drum. The synchronization of the high clutch (CL2) and the intermediate band (B2) is completed. The intermediate band transmits full torque at zero high clutch drum speed. The transmission is physically in second gear.

t6
Control Hardware

The high clutch piston has completely stroked.

B) OPTION2—Open Loop Control

FIG. 30 shows the timing diagram for OPTION2 where the 3-2 downshift is executed with open loop control. The control strategy has five phases instead of six phases. The control strategy functions the same way as in OPTION1 except the difference described below:

t2
Control Strategy

Instead of monitoring the percentage shift complete register PCSFTCMPT, a 3-2 downshift control timer 3-2_DS is loaded. This 3-2 downshift control timer can be adjusted with throttle position and vehicle speed. This open loop timer determines when shift solenoid 1 is turned on.

Control Hardware

The control hardware acts the same as in OPTION1 since the control strategy executes the same commands.

t4
Control Strategy

The 3-2 downshift control timer is expired. The shift is assumed to be completed and the EPC_RMP timer is terminated. Second gear static capacity is commanded and shift solenoid flag FLG_SS_1 is set to 1. The synchronization of the high clutch (CL2) and the intermediate band (B2) is open loop controlled. The 3-2_DS control timer determines how long the transmission stays in the intermediate step 1.

Control Hardware

Shift solenoid 1 is energized and the same hydraulic actions are initiated as at time t4 for OPTION1.

C) OPTION3—Orifice Control

Figure 32:
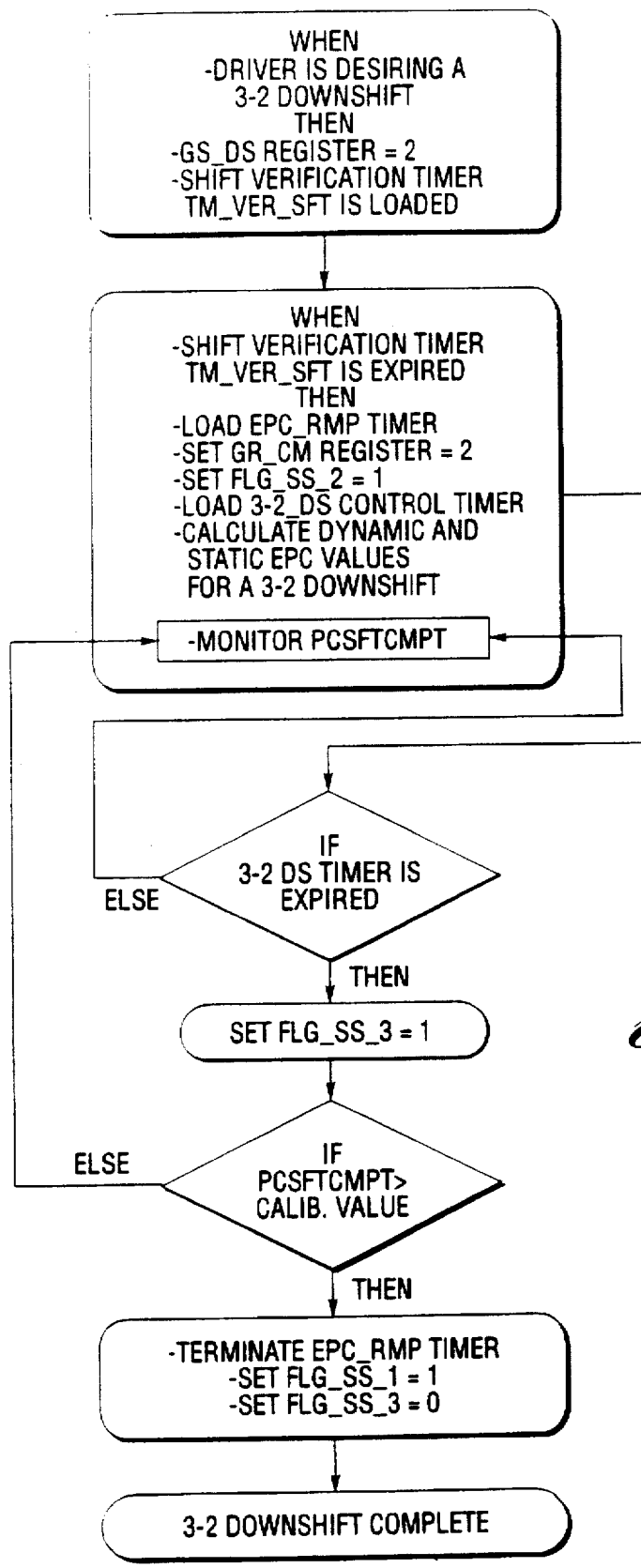
FIG. 32 shows a 3-2 downshift control strategy in flow diagram form that uses both intermediate steps.

This control system is the same as in OPTION2 except a long 3-2 downshift control time 3-2_DS has been chosen. This longer 3-2 downshift control time allows the EPC ramp pressure to be used for engaging the intermediate band. This occurs at time t3. The high clutch pressure has been chosen so high that the inertia phase is not taking place during the execution of the EPC ramp. At time t3, the EPC_RMP timer is expired and second gear static capacity is commanded. From time t3 through t4, the high clutch capacity is controlled by the release characteristic of the control orifice 258 (FIG. 3c and FIG. 32a) and the level of the intermediate servo apply pressure. This calibration feature is usually used when low input speeds and high input torques are present.

FIG. 28 shows the differences between the control strategies of OPTION1 on the one hand and OPTION2 and OPTION3 on the other hand.

Intermediate Step 2 (IS2)

Hydraulic Control System of IS2

The solenoid stages of a 3-2 downshift with intermediate step 2 are as follows:

|  | SOLENOID STAGES | SS1 | SS2 | SS3 |
|---|---|---|---|---|
| 3-2 DOWNSHIFT SHIFT SEQUENCE | 3RD GEAR | OFF | OFF | OFF |
|  | INTERMEDIATE STEP 2 | OFF | ON | ON |
|  | 2ND GEAR | ON | ON | OFF |

The shift sequence to execute a 3-2 downshift is third gear, intermediate step 2 and then second gear. The transmission stays in the intermediate step for a calibratable amount of time. The shift starts up in third gear, which was shown and explained above. In third gear D/2/1 pressure is applied on high clutch (CL2) and intermediate servo release (B2).

When shift solenoid 2 and shift solenoid 3 are turned on, the intermediate step 2 is initiated. The intermediate step 2 is shown in FIG. 32a. In general this intermediate step 2 opens the torque demand 2 (TD2) with control orifice 272 to the high clutch and intermediate servo release. With shift solenoid 2 energized, the 1-2 shift valve 60 in bore 203 is in upshift position. This passes the CF pressure produced by the clutch pressure modulator (forward) across the 2-3 upshift valve 70 in bore 204 to the intermediate servo apply side. With the CF pressure, the controlling pressure for 3-2 downshift control is available on the intermediate servo apply side to generate an equivalent pressure characteristic on the high clutch and at the intermediate servo release. Shift solenoid 2 also shifts the MAN1 timing valve 84 in bore 212 into upshift position. This disconnects the D/2/1 pressure pressurized D3, 4/3-2DS circuit from the TD/EX circuitry and connects it to the OSR passage. With shift solenoid 3 energized, the 3-4 shift valve 72 in bore 215 is moved into upshift position. This connects the D3, 4/3-2DS pressure with the overdrive servo release side (B1).

The shift solenoid 3(SS3) is mainly used to control a 3-4 upshift. A 3-4 upshift is executed by exhausting line pressure applied on the overdrive servo release side. When shift solenoid 2 is de-energized, the MAN1 timing valve 84 in bore 212 is in downshift position and allows the exhaust of the overdrive servo release pressure through the OSR exhaust port 278 (FIG. 3c and in FIG. 33a) in bore 212.

Since it is also used for executing the intermediate step 2, engagement of the overdrive servo has to be inhibited. This is accomplished by pressurizing the overdrive servo release side with D/2/1 or with D/3/4/3-2DS pressure when shift solenoid 2 is energized and the valve 84 in bore 212 is in its upshift position.

Shift solenoid 1 is de-energized, the 3-2 downshift KD control valve 76 in bore 211 and the 2-3 upshift valve 70 in bore 204 are in their downshift positions. The valve 76 in bore 211 connects the intermediate servo release side with the valve 74 in bore 213 and is then connected with the high clutch circuits. With the shift valve 70 in bore 204 in installed position, D/2/1 pressure is distributed to the D3, 4/3-2DS and OSR-EX passages. The high clutch and intermediate servo release oil is distributed partially to the high clutch and guided over the 1-2 upshift valve to the 3-2 downshift TD valve 76. Since this valve is in upshift position, the remaining high clutch release oil is disconnected from the TD/EX channel and directed to the TD 2 port through control orifice 272.

When the transmission is finally shifted to second gear, shift solenoid 1 is turned on and shift solenoid 3 is turned off. This is shown in FIG. 38a. Here the 3-4 shift valve in bore 215 is now in downshift position and line pressure is connected to the overdrive servo release side. The shift valve in bore 213 is in downshift position and connects the high clutch with the TD1 exhaust port on the shift valve in bore 212. The energized shift solenoid 1 moves the shift valves in bore 211 and 204 into upshift position. The shift valve in bore 211 disconnects the intermediate servo release pressure from the high clutch and is released over the shift valve in bore 204 into the CR/R/EX exhaust port. The 3-2 downshift with intermediate step 2 is now completed.

Figure 38:
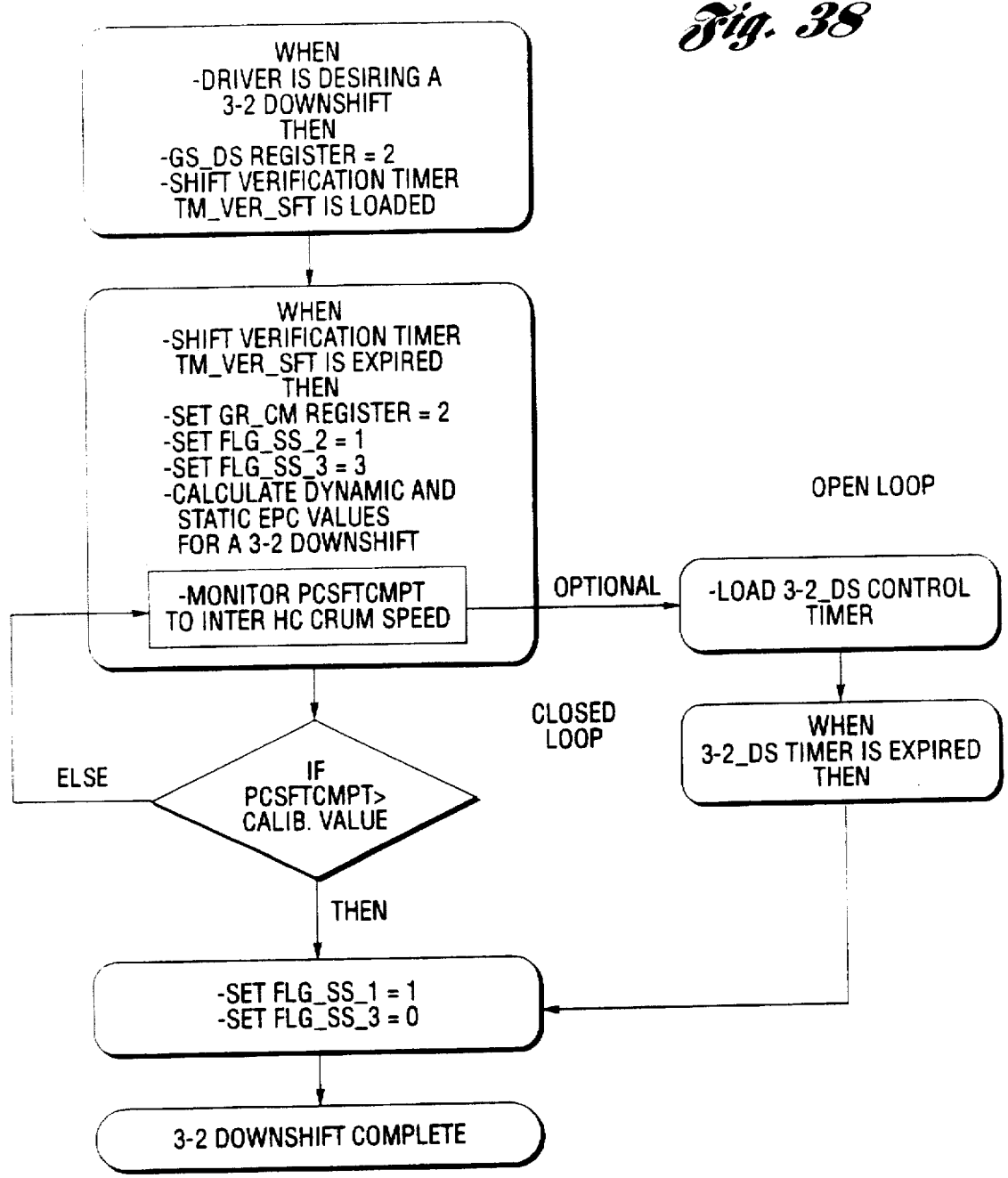
FIG. 38 is a flow diagram showing the control strategy for a 3-2 downshift with intermediate step 2.

Control Strategy of the IS2 System (see FIG. 38)

Intermediate step 2 is similar to intermediate step 1. The only difference is the use of two different control orifices, which are orifice 272 for intermediate step 2 and orifice 258 for intermediate step 1. The control strategy is basically also the same except that shift solenoid 3 is turned on during this intermediate step.

The transmission has two different control orifice sizes for orifices 258 and 272. The orifice sizes are chosen to cover the 3-2 downshifts through all vehicle speeds. Here it is assumed that control orifice 272 is larger than control orifice 258. This can be determined individually. The fact is that with a second size for control orifice 270, another level of pressure profile on the high clutch can be accomplished. This is also outlined in the preview of this section.

Figure 33:
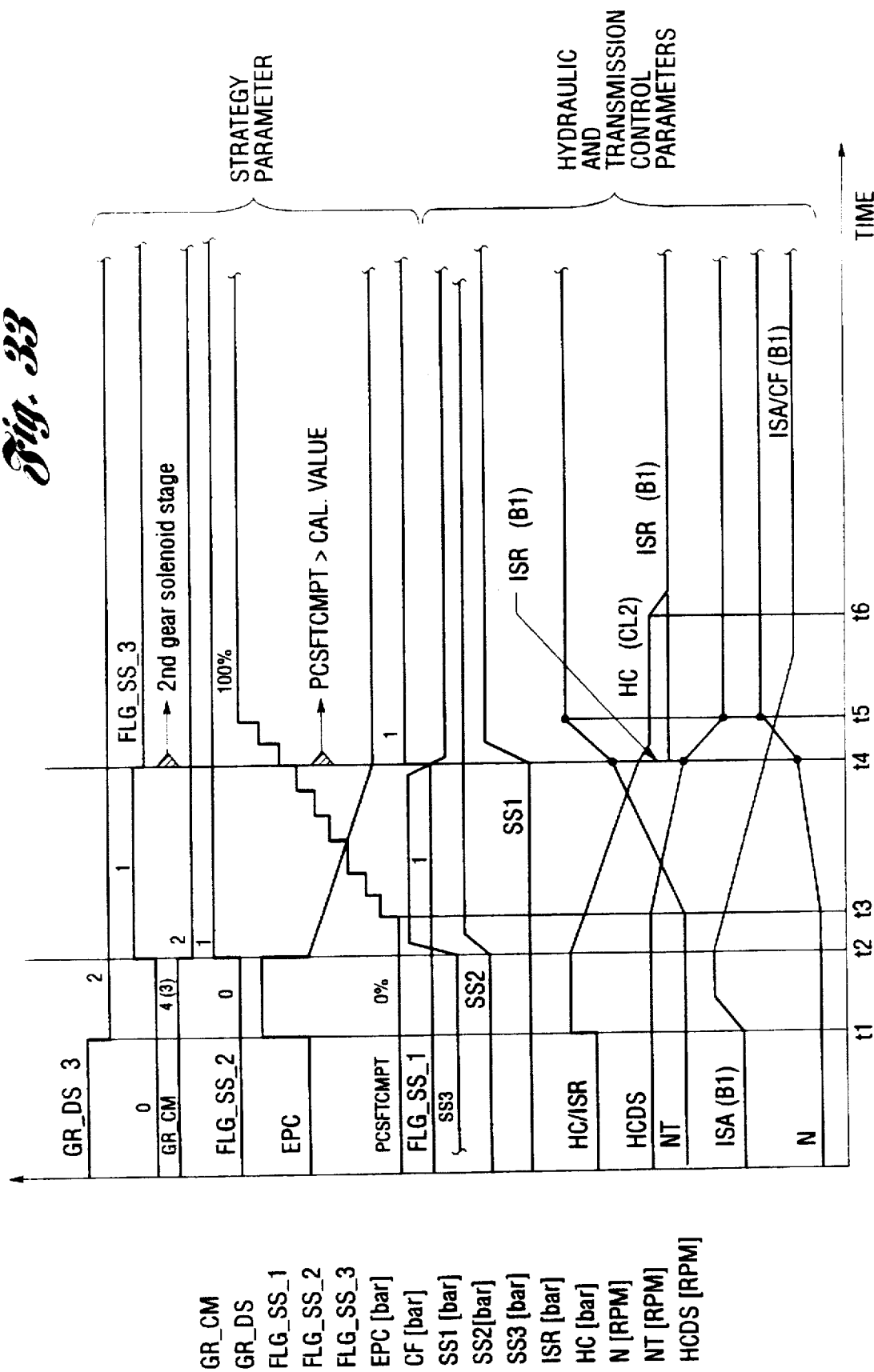
FIG. 33 is a 3-2 downshift timing diagram when a percentage shift complete variable is used as an input to the controller.
Figure 35:
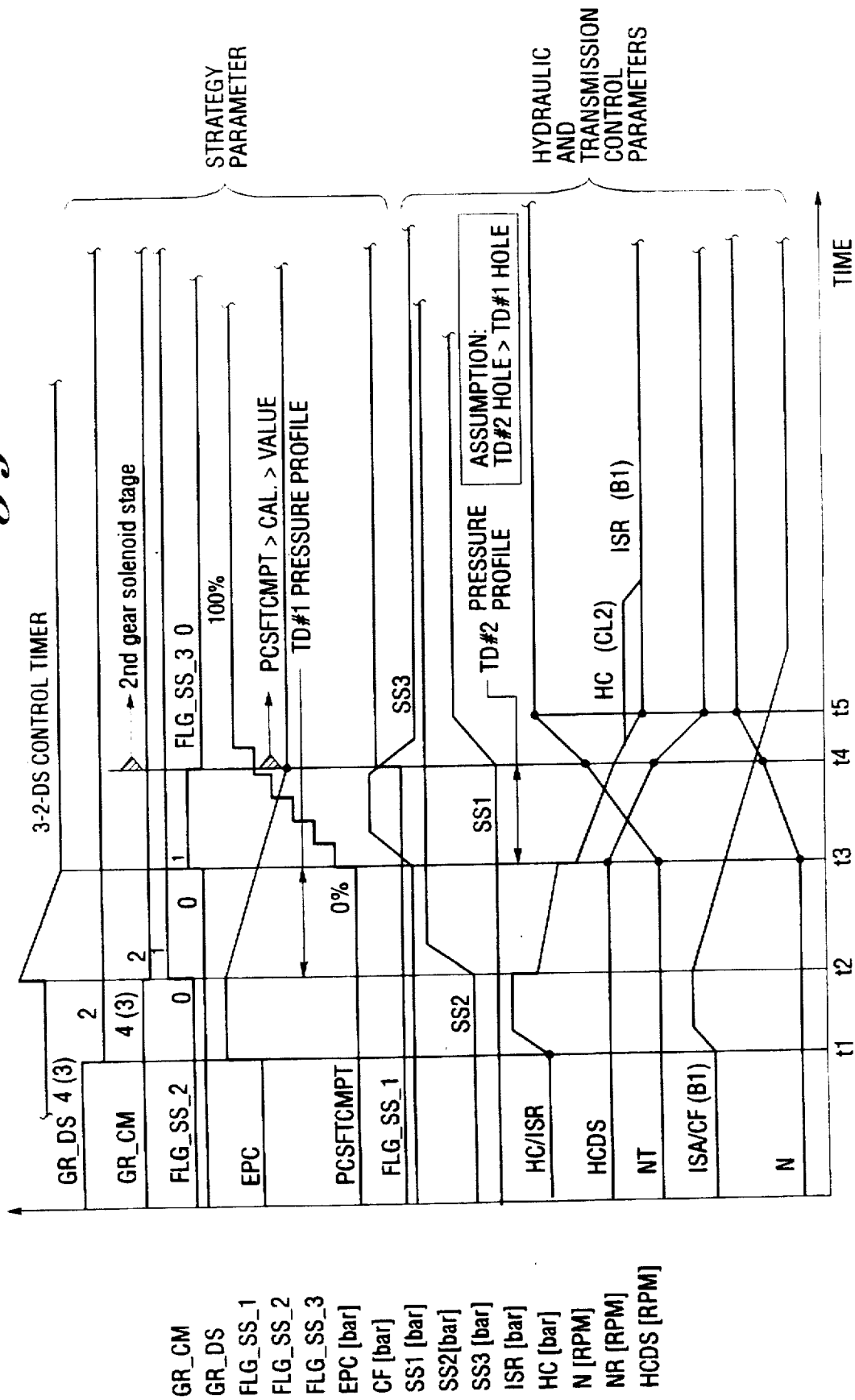
FIG. 35 shows an alternate timing diagram for a 3-2 downshift wherein intermediate step one and intermediate step two are combined and wherein a percentage of completion is used as an input to the controller.

Three calibration options now will be described; i.e.,

A) Option 1—closed loop control
B) Option 2—open loop control
C) Option 3—TD 1 and TD 2 control A) Option 1—Closed Loop Control (see FIGS. 33 and 35)

This calibration option is shown in the timing diagram of FIG. 33. The control strategy functions the same as in OPTION 1 of intermediate step 1. The only difference is between time t2 and t4, when shift solenoid 3 is energized to bring the control orifice 272 into effect. The closed loop control is also realized by monitoring percentage shift complete. At a percentage shift complete value higher than a calibratable valve, the EPC_RMP timer is terminated (see FIG. 33), second gear static capacity EPC values are commanded and the transmission shifts from the intermediate step to second gear.

At time t2, shift solenoid 2 and shift solenoid 3 are turned on simultaneously, initiating the intermediate step 2. At time t4, shift solenoid 3 is turned off and shift solenoid 1 is turned on, which effects second gear. During the time period between t2 and t4, the intermediate step 2 is executed as explained above. The pressure profile on the high clutch and intermediate servo release is determined by the orifice size of control orifice 272 and the pressure characteristic of the CF pressure applied on the intermediate servo apply.

The function of the control strategy is shown in detail in the flow diagram of FIG. 38.

B) Option 2—Open Loop Control

Figure 34:
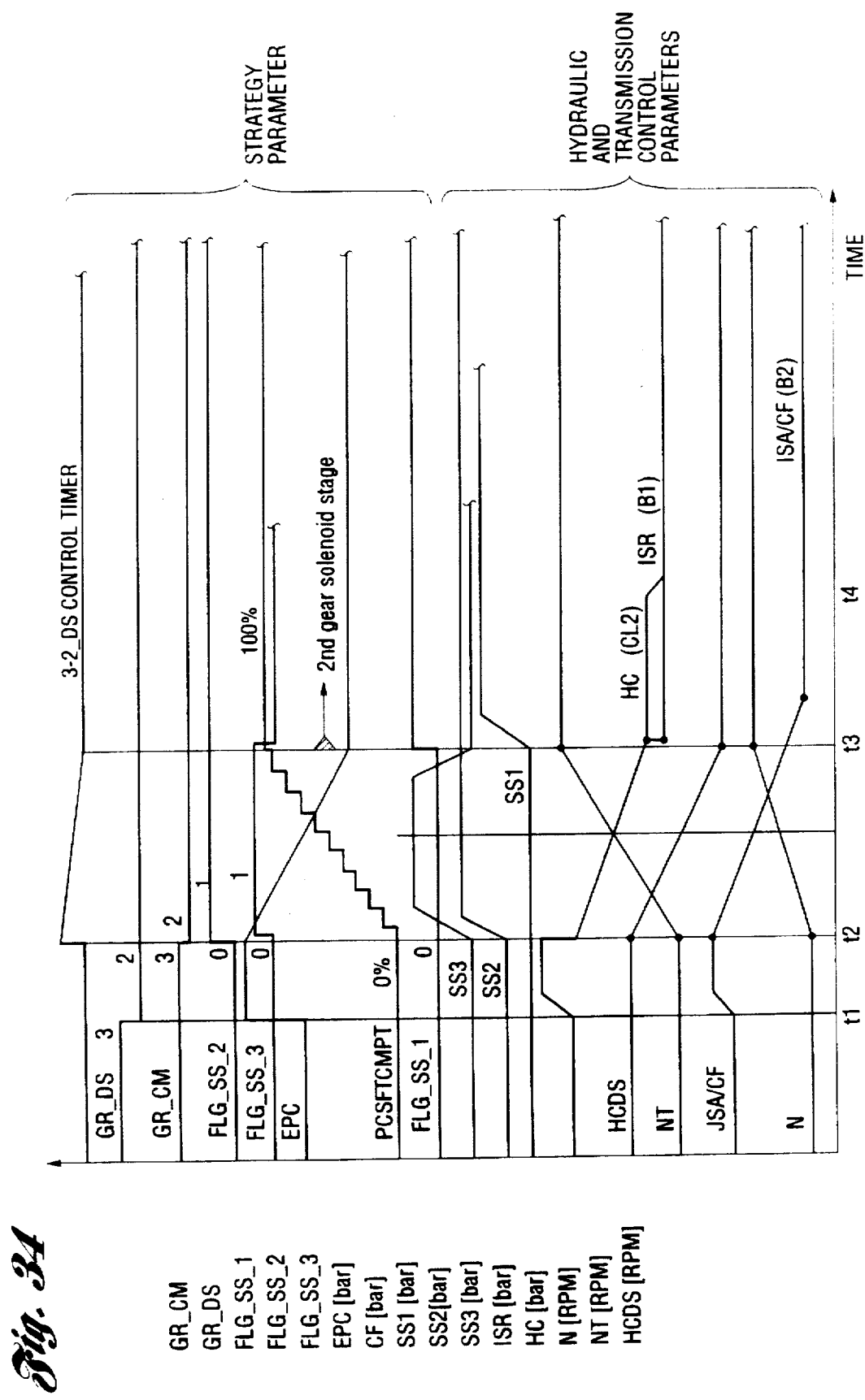
FIG. 34 is a timing diagram for a 3-2 downshift similar to the diagram of FIG. 33 wherein an alternate open loop control is used with intermediate step 1.

This calibration option is shown in the timing diagram of FIG. 34. Here the control strategy functions the same as in OPTION 2 except the transmission shifts into intermediate step 2 instead of intermediate step 1. At time t2 the 3-2_DS control timer is loaded and shift solenoid 3 and shift solenoid 2 are energized. The control timer 3-2_DS is expired at time t3, shift solenoid 3 is de-energized and shift solenoid 1 is energized (see FIG. 34). Here the duration of the control timer 3-2_DS represents the amount of time in the intermediate step 2.

At the expiration of the 3-2_DS timer, it is assumed that the 3-2 downshift is almost completed. Second gear is commanded and second gear static capacity EPC values are set. The flow chart of FIG. 38 shows the control strategy in more detail.

C) Option 3—TD 1 and TD 2 Control

This calibration option is represented in the timing diagram shown in FIG. 35. In this case, both intermediate steps are used during a downshift. The shift sequence is as follows:

|  | SOLENOID STAGES | SS1 | SS2 | SS3 |
| --- | --- | --- | --- | --- |
| 3-2 DOWNSHIFT | 3RD GEAR | OFF | OFF | OFF |
| SHIFT SEQUENCE | INTERMEDIATE STEP 1 | OFF | ON | OFF |
|  | INTERMEDIATE STEP 2 | OFF | ON | ON |
|  | 2ND GEAR | ON | ON | OFF |

Here the shift sequence is third gear, intermediate step 1, intermediate step 2 and second gear. This control option involves both control orifices and provides two distinct pressure profiles applied to the high clutch and the intermediate servo release. The intermediate steps are interchangeable. This control option can be used either in closed loop or open loop control. FIG. 35 shows only the closed loop option. From the time t1 to t2, the control strategy is identical to the previous calibration options. From t2 on the control strategy works as follows:

t2
Control Strategy

The 3-2 downshift control timer 3-2_DS is loaded with a calibratable value. Shift solenoid flag FLG_SS_2 is set to 1 and the EPC_RMP timer is loaded. The EPC ramp is executed. The percentage shift complete value PCSFTCMPT is monitored. Intermediate step 1 is initiated.

Control Hardware

Shift solenoid 2 is energized and the intermediate step 1 is executed, which has been explained previously. The high clutch (CL2) and the intermediate servo release are pressurized with the TD 1 pressure profile generated by control orifice 258.

t3
Control Strategy

The 3-2_DS control timer is expired. With the expiration of this timer, shift solenoid flag FLG_SS_3 is set to 1. The percentage shift complete register PCSFTCMPT is still monitored.

Intermediate step 2 is now initiated.

Control Hardware

Shift solenoid 3 is energized and the high clutch and the intermediate servo are applied with the TD 2 pressure profile. Intermediate step 2 is executed. The engine rpm N and the turbine speed rpm NT start to rise. The 3-2 downshift is initiated. The start of a 3-2 downshift can also be initiated during the intermediate step 1 phase dependent on the TD 1 pressure profile. The high clutch drum speed begins to decelerate because of engine torque.

t4
Control Strategy

The percentage shift complete value is greater than a calibratable value. At this point, intermediate step 2 is terminated. Shift solenoid flag FLG_SS_3 is set to zero and shift solenoid flag FLG_SS_1 is set to 1. Second gear is being commanded. The EPC_RMP timer is terminated as well and second gear static capacity EPC values are commanded.

Control Hardware

Shift solenoid 1 is energized and shift solenoid 2 is de-energized. Second gear is executed and the intermediate step 2 is terminated. Engine speed N, turbine speed NT and high clutch drum speed HCDS approach final values.

t5
3-2 downshift is complete. The strategy for this downshift is shown in flow diagram form in FIG. 32.

Calibration Feature With Positive EPC Ramps for IS1 and IS2

The calibration options described above for execution of a 3-2 downshift always have negative EPC ramps executed during the intermediate steps. With negative EPC ramps, the high clutch (CL2) capacity is continuously reduced until the inertia phase is initiated and the high clutch starts to slip. Closed loop control is usually required in order to make this control system robust enough. With negative EPC ramps, not only is the high clutch capacity decreased, but the intermediate servo apply capacity is decreased as well. This can lead to second gear capacity loss in the open loop control mode when the synchronization point has not been matched.

Figure 36:
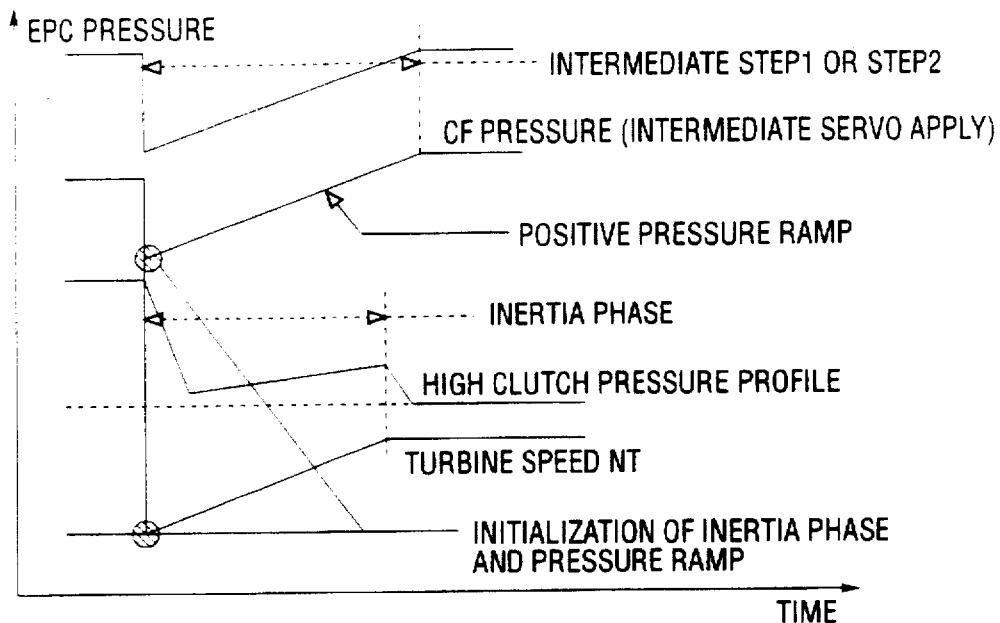
FIG. 36 shows the relationship of the electronic pressure control output over time indicating the pressure ramps that are used to vary capacity.

Another calibration feature for open loop 3-2 downshift control is the introduction of positive EPC ramps. The positive EPC ramps can only be used when the start point of the ramp is set at a very low value. The low start pressure initiates the inertia phase of the 3-2 downshift and the resulting positive pressure profile on the high clutch is balanced against the input torque until the synchronization point has been reached. FIG. 36 illustrates this feature.

The advantage of using positive EPC ramps is that the capacity on the intermediate servo apply increases during the execution of the intermediate step, which reduces the chance of capacity loss. The high clutch follows the pressure profile of the EPC pressure during execution of one of the intermediate steps until the synchronization point has been reached.

The disadvantage is that more slip is introduced to the high clutch and the lifetime durability can be affected. This feature should then only be used with open loop control and timer control and for low speed 3-2/4-2 downshifts.

High Clutch EX Step (Optional to IS2 Step)

This is another option for controlling a 3-2 downshift. As outlined above in the preview section, this 3-2 downshift control system may replace the previously described intermediate step 2. The shift sequence is shown as follows:

|  | SOLENOID STAGES | SS1 | SS2 | SS3 |
|---|---|---|---|---|
| 3-2 DOWNSHIFT SHIFT SEQUENCE | 3RD GEAR | OFF | OFF | OFF |
|  | HIGH CLUTCH EX STEP | OFF | ON | ON |
|  | 2ND GEAR | ON | ON | OFF |

The shift sequence is third gear, high clutch ex step and then the final second gear. The shift solenoid stage for the high clutch ex step is the same as for the intermediate step 2, which is SS1=OFF, SS2=ON and SS3=ON.

Figure 37:
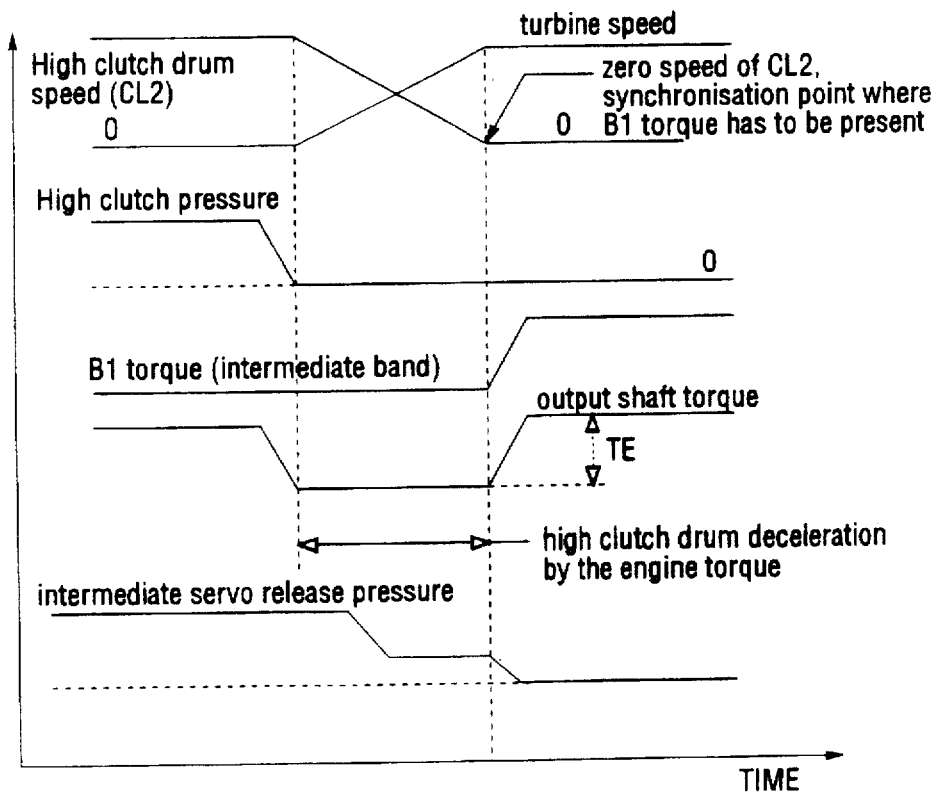
FIG. 37 is a plot similar to FIG. 47, but it describes a 3-2 downshift.

This feature uses the inertia balance between the engine and the rotating inertias to synchronize a 3-2 downshift. FIG. 37 shows how this system functions. It shows that the high clutch pressure and the intermediate servo release pressure are separated. The 3-2 downshift is initiated by an instantaneous high clutch pressure release. This triggers the deceleration of the high clutch drum and all associated inertias in front of the drum. The high clutch drum speed in third gear is equal to engine speed and is decelerated by the engine torque toward zero speed.

The target of the control system is to initiate the high clutch exhaust and to apply B1 torque at zero high clutch drum speed, which is the synchronization point. This can be accomplished with open loop or closed loop control. From the point of the high clutch exhaust up to the synchronization point, the rotating inertias are in equilibrium with the engine torque. This phase is a time window for the control system to accomplish the 3-2 downshift. Assuming that high engine torque and low inertias are present, this time window is reduced significantly. In this case, it is very difficult, if not impossible, for a control system to synchronize B1 torque at the zero rpm point of the high clutch drum. Therefore, this control method is applicable for low torque engines with relatively high transmission and engine inertias connected to the engine. The major usage is for 3-2 downshifts with high clutch drum speeds that are high.

The advantage of this control method is that the intermediate band is applied at zero high clutch drum speed. There is no slip time on the intermediate band, which enhances the lifetime durability significantly. Good shift quality can be achieved when the synchronization point is achieved by the control system. The reason is based on the zero speed of the high clutch drum when the intermediate band is applied, which prevents additional torque disturbances on the output shaft during the shift execution (see FIG. 37).

Hydraulic Control System

The hydraulic control system is, in principle, the same control system used in intermediate step 2 (see FIGS. 38b and 38c).

The objective of the hydraulic control system is to separate the high clutch from the intermediate servo release and to exhaust the high clutch through a separate exhaust port. Further, the intermediate servo has to be kept disengaged during this step. This is realized by introducing a new shift valve in bore 213 with an additional land at the middle of the valve. Also, the orifice 282 has to be opened.

The shift solenoid 1 is de-energized and keeps the shift valves in bore 211 and 204 in downshift position. The downshifted 2-3 upshift valve in bore 204 connects D/2/1 pressure to the D3, 4/3-2DS circuitry. With shift solenoid 3 energized, the shift valves in bore 213 and in bore 215 are moved into upshift position. With the orifice 282 opened and the additional land on the shift valve in bore 213, the D/2/1 pressure is connected to the intermediate servo release side and keeps the servo from stroking. The shift solenoid 2 is energized and moves the shift valves in bore 212 and bore 203 into upshift position. With the upshifted valves in bores 213 and 203, the high clutch is exhausted through the HC EX exhaust port implemented by control orifice 272. At this point, the high clutch drum starts decelerating due to the engine torque. As explained with respect to the intermediate step 2, the overdrive servo is prevented from stroking by the upshifted MAN1 timing valve 84 in bore 212. This valve connects the D3, 4/3-2DS passage which is pressurized with D/2/1 pressure, to the OSR/EX passage. With the upshifted 3-4 control valve the pressurized OSR/EX passage is directly connected with the overdrive servo release, inhibiting the stroking of the overdrive servo. The reason for this shift valve configuration is that the shift solenoid 3 is mainly used to execute a 3-4 upshift.

In second gear, shift solenoid 3 is turned off and shift solenoid 1 is turned on. The valves 76 and 70 in bores 211 and 204 are moved into their upshift positions. The 2-3 upshift valve 70 in bore 204 disconnects D/2/1 pressure from the D3, 4/3-2DS circuitry and opens the CR/R/EX port. With the upshifted valve 76 in bore 211, the intermediate servo release is exhausted directly into the CR/R/EX port. The overdrive servo stays released since shift solenoid 3 is de-energized, which moves the 3-4 shift valve into downshift position. This connects line pressure directly from the pump to the overdrive servo release side. The exhaust port of the high clutch has been changed to the TD 1 exhaust port with control is orifice 258. This, however, has no influence for the execution of the 3-2 downshift since the high clutch has been exhausted already at control orifice 272. The intermediate servo release side is exhausted and the servo starts to stroke, and finally the intermediate band (B2) is engaged on the high clutch drum. The 3-2 downshift then is complete.

Control Strategy of the HC-EX Step

This control strategy is shown in timing diagram in FIG. 39. The downshift control can be executed in closed loop as well as in open loop. The closed loop control system monitors the percentage shift complete register and infers with this the high clutch drum speed. This control method does not require a high clutch drum speed sensor. The open loop approach is using a control timer to determine the duration of the high clutch ex (HC-EX) step. The control strategy in conjunction with the control hardware is described below.

t1

Control Strategy (see FIG. 38)

A 3-2 downshift is triggered by functions of throttle position versus vehicle speed. The GR_DS register is changed to second and the shift verification timer TM_VER_SFT is loaded. The dynamic EPC is added, required for a 3-2 downshift prior to the execution of the 3-2 downshift.

Control Hardware

The CF pressure rises due to the desired EPC values.

t2

Control Strategy

The shift verification timer TM_VER_SFT is expired and the gear commanded register GR_CM is changed to 2. At this point, shift solenoid flag 2 FLG_SS_2 and shift solenoid flag 3 FLG_SS_3 are set to 1. Static and dynamic EPC values are calculated and loaded into the EPC register. With shift solenoid 2 and shift solenoid 3 turned on, the HC-EX step is initiated. With the closed loop control strategy, the percentage shift complete register is monitored, and from this value the high clutch drum speed is inferred. With the open loop approach, a control timer is loaded to determine the duration of the HC-EX step.

Control Hardware

Shift solenoid 2 and shift solenoid 1 are energized and the high clutch is exhausted over the exhaust port on the 3-2 downshift TD control valve 74 in bore 213 with the control orifice 272. The high clutch is loosing instantaneous capacity and the drum starts to decelerate. The intermediate servo release is pressurized with D/2/1 pressure and is prevented from stroking.

t3

Control Strategy

With the closed loop control method, the strategy has monitored a percentage shift complete value which is higher than a calibratable value. This is representing a certain high clutch drum speed. The remaining high clutch drum speed is used to overcome the delay time of the intermediate servo stroke time. The second gear solenoid stage is finally initiated and shift solenoid flag 1 FLG_SS_1 is set to 1 and the shift solenoid flag 3 is set to 0. The high clutch ex step 1 is completed. With the monitoring of the percentage shift complete value, the high clutch drum speed is inferred. This eliminates the necessity of a high clutch drum speed sensor for closed loop control purposes.

With the open loop strategy, the control timer is expired. It is assumed that a certain high clutch drum speed has been reached and shift solenoid flag 1 is set to 1 and shift solenoid flag 3 is set to 0.

Control Hardware

Shift solenoid 1 is turned on and shift solenoid 3 is turned off. With shift solenoid 1 turned on, the 3-2 downshift KD control valve 76 is moved into upshift position. This valve connects the intermediate servo release over the upshifted 2-3 upshift valve 70 in bore 204 with the CR/R/EX port. The intermediate servo starts to stroke. The high clutch drum speed is still being decelerated. Engine speed and turbine speed are increasing along with the deceleration of the high clutch drum speed.

t4

Control Hardware

The intermediate servo has fully stroked and is applied on the high clutch drum. The synchronization of the high clutch (CL2) and the intermediate band (B2) is completed. The intermediate band transmits full torque at zero high clutch drum speed. The transmission is physically in second gear.

FIG. 38 shows a flow chart for the above control strategy.

Use of the HC-EX Step for 2-3 Power Off Upshift Control

The high clutch ex step can also be used to control power off 2-3 upshifts. When the transmission is in second gear and the driver closes the throttle, the transmission shifts into the HC-ex step before shifting into the third gear solenoid stage. The control strategy will load a power off 2-3 upshift control timer for the duration of the high clutch ex step. With this action, the capacity of the intermediate servo is canceled out and starts to stroke. The high clutch stays exhausted. The transmission is physically in first gear when the power off control timer is still running. When the 2-3 upshift power off timer is expired, the transmission shifts into third gear and executes the 2-3 upshift on the remaining intermediate servo stroke.

The advantage of this control method is the capacity loss on the intermediate band, which gives good shift feel during a 2-3 back out upshift. The 2-3 back-out upshifts are independent of the high clutch capacity during the duration of the HC-ex step, and higher EPC pressures can be commanded to accelerate the filling process of the high clutch.

Summary

Known hydraulically controlled transmissions use shift control valves in conjunction with control orifices to control 3-2 downshifts. The adjustment of the various control orifices must be done for each engine size individually. This requires a dedicated main control assembly which increases the complexity of the transmission application significantly.

With the introduction of intermediate steps 1 and 2 and the use of the electronic clutch capacity control with the two control orifices 258 and 272, the complexity has been reduced to one single main control assembly. With the clutch pressure modulator applied on the intermediate servo apply side, any capacity requirement can be adjusted on the high clutch. The dedicated calibration embodied into the control algorithms represent the individual calibrations for various types of vehicle powertrains. The 3-2 downshift control is more accurate and can be compensated with transmission oil temperature. Here only two shift valves are used in bore 213 and bore 212 to accomplish two different orifice sizes for 3-2 downshift execution. Further, on an additional HC-EX step variant can be used to control high speed 4-2/3-2 downshifts with low torque engine sizes. Closed loop shift control introduces robustness in shift quality and improves lifetime durability. With the introduction of electronic controls, great flexibility in controlling 3-2 downshifts can be implemented.

4-2/3-2 Downshift Solenoid Timing

Figure 40A:
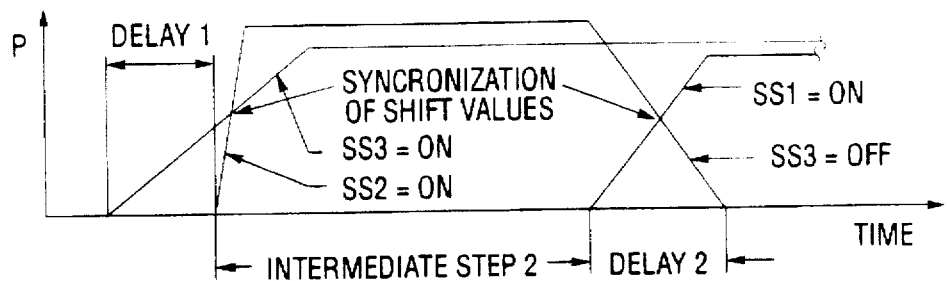
FIG. 40a shows a 4-2/3-2 downshift solenoid timing diagram for the second intermediate step.
Figure 40B:
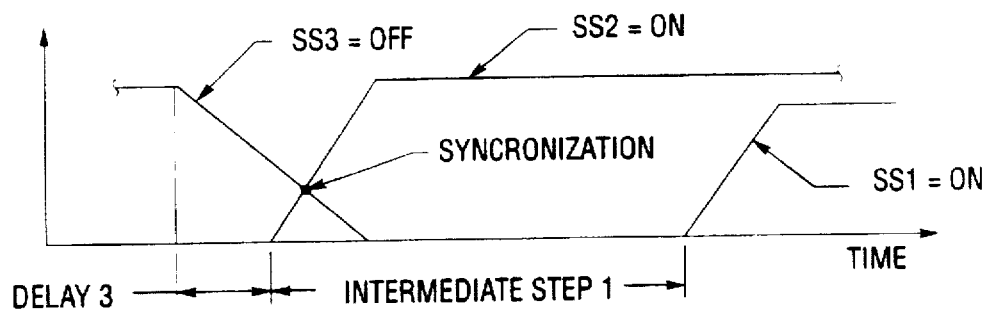
FIG. 40b is a diagram similar to FIG. 41a, but it describes the first intermediate step.

For the execution of the intermediate steps 1 and 2 and the high clutch ex step, shift solenoids SS1, SS2 and SS3 are involved. Due to the fact that each solenoid has to actuate a different shift valve, the pressure buildup and pressure release characteristics are different from solenoid to solenoid since the volume to be filled is different. The major target is to synchronize the shift valves over the whole transmission oil temperature ranges. FIGS. 40a and 40b show the timing diagrams of intermediate step 1 and intermediate step 2. For intermediate step 2, two delay timers, DELAY 1 and DELAY 2, have been introduced into the control strategy.

All of these delay timers can be modified with transmission oil temperature. DELAY 1 timer synchronizes the energizing process of shift solenoid 2 (SS2) and shift solenoid 3 (SS3). The valves in bore 215, bore 213 and bore 212 are shifted simultaneously at the shift set point of the installed springs. This prevents an overdrive servo engagement during a transition from third gear into the intermediate step 2. The DELAY timer is only used in conjunction with HC-EX step and the modified valve in bore 213 discussed previously. All three solenoids are turned on during this time period. The objective is to first shift the 2-3 upshift valve in bore 204 in order to disconnect the D/2/1 pressure from the 3-2 downshift circuitries and to prevent re-entering into the intermediate step 1. Shift valves in bores 212, 203 and 211 are synchronized.

For intermediate step 1, a third delay timer DELAY 3 has been introduced (see FIG. 40b). This third delay timer is used to synchronize the transition from fourth gear into the intermediate step 1. This delay timer prevents an entering into the intermediate step 2 when intermediate step 1 is desired. The shift valves in bore 215, bore 212, bore 213 and bore 203 are synchronized.

When HC-EX is used, this delay timer prevents entering the HC-EX step when the intermediate step 1 is desired. The following tables show the solenoid stages that are commanded during the expiration of the delay timers. The hydraulic circuitries are not explained since they are described previously in detail.

The solenoid sequence chart for the intermediate step 2 timing diagram of FIG. 40a is as follows:

| GEAR | SS1 | SS2 | SS3 |
| --- | --- | --- | --- |
| 3RD | OFF | OFF | OFF |
| DELAY 1 | OFF | OFF | ON |
| INTERMEDIATE STEP 2 | OFF | ON | ON |
| DELAY 2 | ON | ON | ON |
| 2ND | ON | ON | OFF |

The solenoid sequence chart for the intermediate step 1 timing diagram of FIG. 40b is as follows:

| GEAR | SS1 | SS2 | SS3 |
| --- | --- | --- | --- |
| 4TH | OFF | OFF | ON |
| DELAY 3 | OFF | OFF | OFF |
| INTERMEDIATE STEP 1 | OFF | ON | OFF |
| 2ND | ON | ON | OFF |

3-4/4-3 Shift Control System

Preview

The 3-4/4-3 control system is sub-divided into two areas, which are:

A) Automatic 3-4/4-3 shift control

B) Manual 3-4/4-3 shift control actuated with an overdrive cancel switch

The difference between both shift control methods is that the automatic shift control is triggered by shift curves (throttle position versus vehicle speed), whereas the manual upshifts and downshifts are actuated by the driver together with the overdrive cancel switch. By providing an electronic cancellation of the overdrive by a switch, the manual lever positions have been reduced from 7 to 6 positions; i.e. PARK, REVERSE, NEUTRAL, DRIVE, MANUAL 2 and MANUAL 1. The missing seventh OVERDRIVE position is inferred electronically by the overdrive cancel switch. This has also been described previously.

A) Automatic 3-4/4-3 Shift Control

As mentioned previously, the 3-4/4-3 shifts are non-synchronous shifts. With the 3-4/4-3 control system, the upshift and the downshift of the overdrive planetary gear set are controlled. The overdrive planetary gear set is connected in series with the rear Simpson set over OWC1. The overdrive band (B1) is connected to the sun gear of the overdrive planetary gear set. The input speed is delivered through the overdrive carrier and is connected over OWC1 to the output of the ring gear. Hence, in third gear, with the overdrive band (B1) not applied, the overdrive planetary gear set is bypassed by the engaged OWC1. When the overdrive band (B1) is applied, a 3-4 upshift is executed and the sun gear is decelerated to zero speed. The overdrive band carries, based on the 0.75 gear ratio, −0.25* engine torque as a reaction to the output. OWC1 thus is bypassed and OWC1 overruns and the torque flow is transmitted over the overdrive planetary gear set.

The electronic control system controls the overdrive band capacity during 3-4 upshifts and 4-3 downshifts. For an upshift, slip time and shift quality are the main objectives to accomplish. For the downshifts, the engagement of OWC1 has to be controllable in order to influence the shift feel. During a downshift, the whole transmission in front of the OWC1 is accelerated until OWC1 engages. By controlling the overdrive band capacity during the downshift event, the load at the engagement point of OWC1 will be reduced. When the overdrive band is completely released, OWC1 carries full input torque. The control system consists of the shift solenoid 3 (SS3), which is dedicated for shift control along with the VFS, the latter being responsible for band capacity control. This will be explained subsequently.

B) Manual 3-4/4-3 Shift Control Actuated with the Overdrive Cancel Switch

The overdrive cancel switch actuated 3-4/4-3 shifts are controlled in the same way, except that the coast clutch has to be engaged in overdrive cancel mode, which is third gear, in order to provide engine braking.

When the transmission is in third gear and in coast mode, the one-way clutch OWC1 overruns and free wheeling takes place. In order to provide engine braking in third gear, coast clutch (CL1) has to be engaged, which connects the overdrive carrier to the overdrive sun gear. The torque flow in coast mode is now reversed from the ring gear into the sun gear and carrier, which are clutched together with the coast clutch CL1. Since the carrier is connected to the input shaft, torque is transmitted from the input to the output of the overdrive planetary gear set and engine braking is taking place.

The engagement of the coast clutch is controlled electronically with a shift solenoid 4 (SS4) dedicated only for the coast clutch. A separated electronic control system is required since the coast clutch engagement is an independent event compared to the 4-3 downshift.

Hydraulic Control System for 3-4/4-3 Shift Control

The hydraulic control system provides for automatic as well as for manual 3-4/4-3 upshifts and downshifts. The hydraulic control system consists out of the following components:

Pressure buildup:

main regulator system 104 in bore 208 clutch pressure modulator (forward) 218 in bore 207

EPCB valve 100 in bore 207

VFS 18 in bore 203

Shift execution:

shift solenoid 3 in bore 215 shift solenoid 4 in bore 201

3-4 shift control valve 72 in bore 203 coast clutch control valve 88 in bore 201

MAN1 timing valve 84 in bore 212

Automatic 3-4/4-3 Hydraulic Control System

In the hydraulic control system shown in FIGS. 3b–3e and in the enlargement of FIGS. 44a–44b, the 3-4 upshift is controlled by turning on shift solenoid 3 and leaving all other shift solenoids de-energized. The shift solenoid stage in fourth gear is SS1=OFF, SS2=OFF, SS3=ON and SS4=OFF. The overdrive servo apply side is always applied with CF-pressure produced by the clutch pressure modulator forward in bore 207. The CF-pressure is boosted with EPCB pressure from the EPCB valve 100 in bore 207, which provides stall pressure settings. The connection of CF-pressure to the overdrive servo apply side allows start up of the vehicle in fourth gear with torque multiplication. The overdrive servo release side is applied with line pressure and prevents the servo from stroking or engaging the overdrive band unless the shift solenoid 3 is energized. The overdrive servo apply side contains also a control orifice 286 (see FIG. 3b and FIGS. 44a–44d) in order to meter the amount of CF-oil supplied to the servo. This is needed to accomplish a more consistent pressure buildup during an upshift. The overdrive servo release side consists of the control orifice 286 in the OSR circuitry to meter the displaced oil during a downshift and to meter the line pressure oil during an upshift.

With shift solenoid 3 energized, the 3-4 upshift valve 72 in bore 215 is moved into upshift position. The upshifted 3-4 shift control valve 72 connects the OSR passage with the OSR-IS/EX/SS4 passage 288, which is connected again over a check ball pocket 290 to the OSR/EX circuit (see FIG. 3d). Since the shift solenoid 2 is de-energized, the MAN1 timing valve 84 stays in the downshift position and exhausts the OSR/EX circuit into the CL1/B1 exhaust port. The overdrive servo strokes with the release oil controlled by the orifice 292 and the apply oil controlled by control orifice 286. The overdrive band capacity is adjusted by CF-pressure settings produced from the CF-modulator 218 in bore 207 and VFS 18 in bore 203. The coast clutch is exhausted over the coast clutch control valve 88 in bore 201, which connects the CCL circuit to the 2/1/CCL/EX passage. This passage again is connected to the upshifted 3-4 shift control valve 72 in bore 215. Here the 2/1/CCL/EX pressure is exhausted into the CL1 exhaust port of the 3-4 shift valve in bore 215.

The 4-3 downshift control system includes the shift solenoid 3, which is de-energized and the 3-4 shift valve 72 in bore 215, which is in its downshift position. This connects line pressure to the overdrive servo release side directly and introduces a second control orifice 294 (see FIG. 3b and FIGS. 44a–44d) and to meter the amount of line pressure oil applied to the overdrive servo release side. Once the overdrive servo is filled, the servo starts to stroke and the 4-3 downshift is initiated. The overdrive servo capacity, however, is controlled in fourth gear by adjusting the required CF-apply pressure for slip control prior to a 4-3 downshift. The completion of the 4-3 downshift is then accomplished by allowing the servo to stroke with line pressure connected to the overdrive servo release side. The coast clutch is now exhausted into the 2/1 passage at the 3-4 shift control valve 72 in bore 215. This 2/1 passage is open to the exhaust port on the manual valve 78 in bore 206. The 4-3 downshift is then completed.

Manual 3-4/4-3 Hydraulic Control System Actuated with the Overdrive Cancel Switch The 3-4/4-3 downshift is executed manually with the overdrive cancel switch. As mentioned earlier, the manual 4-3 downshift requires the engagement of the coast clutch (CL1) to provide engine braking in third gear. This is accomplished by dedicating shift solenoid 4 at 16 and the coast clutch control valve 88 in bore 203 for coast clutch control only. The 3-4 upshift control system functions exactly the same way described previously. A simultaneous engagement of the overdrive band and the coast clutch is inhibited. When both elements are applied, the overdrive planetary gear set is blocked and transmission damage can occur. In order to maintain this condition, the 3-4 shift valve in bore 215 is designed so that the line pressure feed and the exhaust to the coast clutch is controlled always over the 3-4 shift valve 72. The 3-4 shift valve acts always as an override valve system for the coast clutch control system.

If the shift solenoid 3 is turned on and the shift solenoid 4 is turned off, the system responds in the same way as in the case of the fourth gear position described above. Coast clutch and intermediate servo release are exhausted and the CF pressure applied on the overdrive servo apply side establishes fourth gear.

When the overdrive cancel switch is turned on, shift solenoid 3 is turned off and shift solenoid 4 is turned on. The 4-3 downshift control acts the same way that it does on an automatically controlled 4-3 downshift. To apply the coast clutch, the energized shift solenoid 4 moves the coast clutch control valve into the upshift position. With the downshifted 3-4 upshift valve line, pressure enters the PL/CCL.EX passage, which is again connected over the coast clutch control valve in bore 201 to the coast clutch. The coast clutch circuitry contains also a control orifice 296 (FIG. 3b and FIGS. 44a–44d) in order to apply a metered oil flow to the coast clutch. One input port to the coast clutch control valve is 2/1/CCL/EX channel. This provides continuous pressure to the coast clutch in MAN2 and MAN1 position regardless of the state of shift solenoid 4 and the engine braking in case of a failed shift solenoid 4. Due to the override function of the 3-4 shift valve, the coast clutch is always exhausted when the shift solenoid stays energized.

When the 3-4 shift valve moves to upshift position, line pressure and 2/1 pressure are disconnected from the coast clutch and the exhaust ports CL1/EX in bore 215 and CL1/B1/EX in bore 212 are open to the coast clutch, depending on the state of shift solenoid 4. The 4-3 downshift actuated with the overdrive cancel switch is now completed.

Control Strategy for 4-3/3-4 Upshifts and Downshifts

In order to describe the complete control system including the control strategy, the following parameters during a 4-3/3-4 shift event are considered in the time domain:

GR__CM commanded gear (control strategy)

GR__DS desired gear (control strategy)

FLG__SS__3 shift solenoid flag 3 (control strategy)

FLG__SS__4 shift solenoid flag 4 (control strategy)

EPC register (control strategy)

FLG__ODC flag overdrive cancel (control strategy)

PCSFTCMPT percentage shift complete register (control strategy)

PDL manual lever position register (control strategy)

OSA overdrive servo apply pressure

OSR overdrive servo release pressure

CF clutch pressure in forward

SS3 shift solenoid 3 pressure

SS4 shift solenoid 4 pressure

CL1 coast clutch pressure

N engine RPM

NT turbine speed RPM

TQ output shaft torque

The control strategy is also subdivided into the automatic 3-4/4-3 shift control strategy, and manual control with overdrive cancel switch controlled 3-4/4-3 shifts.

Control Strategy for Automatic 3-4/4-3 Shift Control 3-4 Upshift

Figure 45:
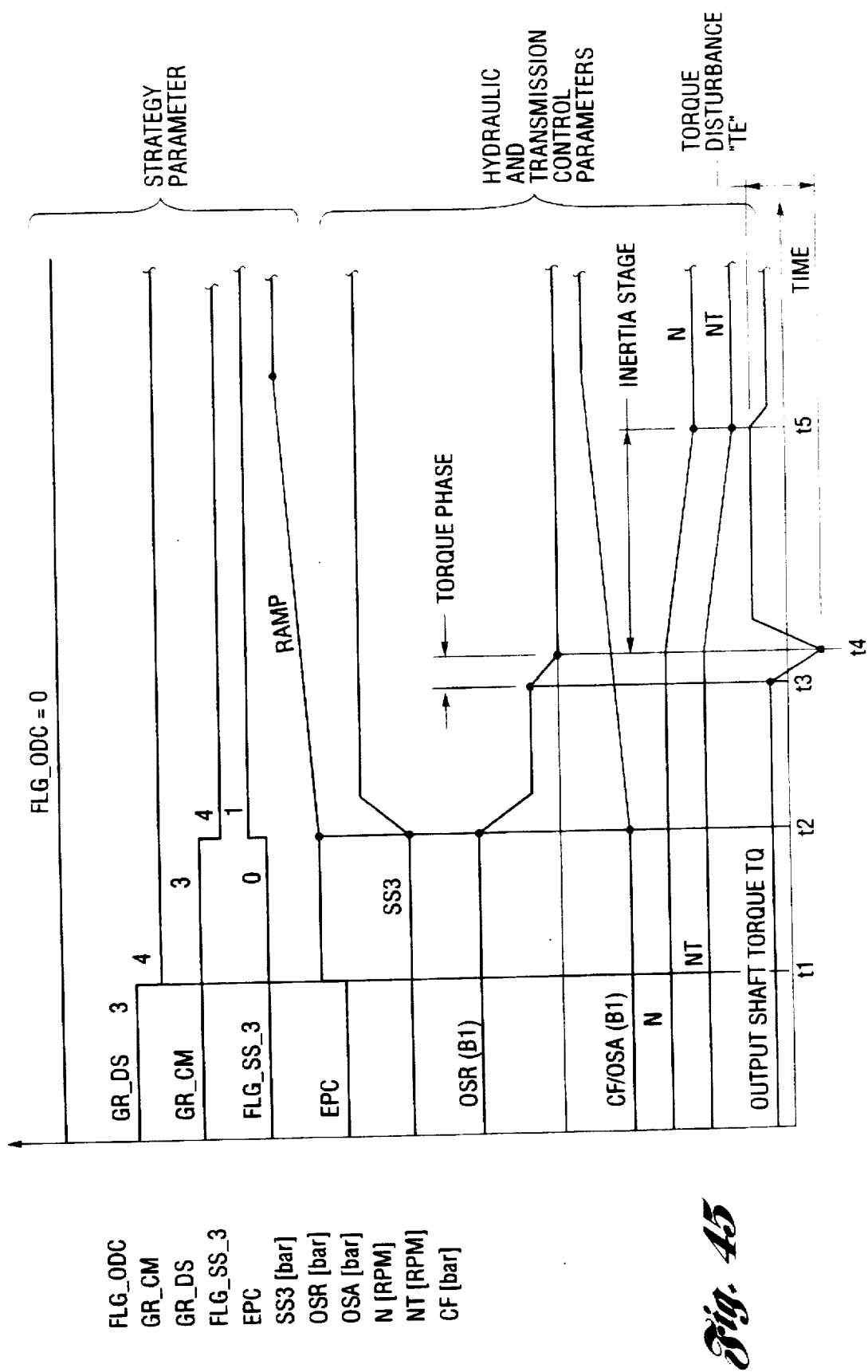
FIG. 45 shows a 3-4 upshift timing diagram.

The timing diagram in FIG. 45 shows the timing for the complete control system including the control strategy in the time domain.

t1

Figure 41:
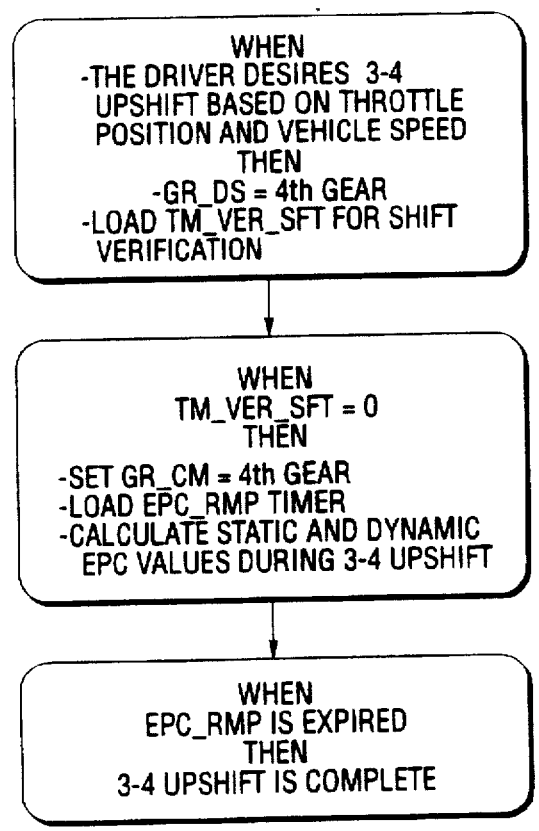
FIG. 41 shows the 3-4 upshift control logic in flow diagram form.

Control Strategy (see FIG. 41)

At this point the driver desires a 3-4 upshift based on shift curves (throttle position (TP) versus vehicle speed (VS)). The GR__DS register changes from third to fourth and a shift verification timer called TM__VER__SFT is loaded. During this time, no gear is commanded until the shift verification is completed. The dynamic EPC value for fourth gear is added at this point in order to save time for pressure buildup when the actual gear is commanded.

Control Hardware

EPC pressure is raised for the same reason explained above.

t2

Control Strategy

The shift verification timer TM_VER_SFT is expired and the GR_CM register is changed to fourth gear. Since the GR_CM register represents the output states of the solenoids, FLG_SS_3 is set to 1. An EPC ramp timer, called EPC_RMP, is loaded and an EPC ramp is triggered. Static and dynamic EPC values are calculated to satisfy the required capacity for a 3-4 upshift and are added to the EPC ramp resulting in the total amount of EPC.

Control Hardware

Since shift solenoid 3 is energized by the control strategy, the shift solenoid 3 pressure builds up. The 3-4 upshift valve 72 in bore 215 moves into upshift position and opens the overdrive servo release circuit to the CL1/B1 exhaust port in bore 212. The pressure buildup on the overdrive servo apply side is according to the commanded EPC ramp. The overdrive servo starts to stroke.

t3

Control Hardware

The overdrive servo has stroked and starts to engage. The overdrive band transmits torque and reduces the reaction torque on OWC1.

t4

Control Hardware

The overdrive band transmits the same torque as the reaction element OWC1. The torque phase is completed and the output shaft torque is reversed following the CF pressure characteristic. The output shaft torque is completely dependent on the applied CF pressure on the overdrive band. Since the reaction torque is zero, the inertia phase is initiated. Engine speed and turbine speed start to drop.

t5

Control Strategy

The EPC ramp timer EPC_RMP expires and the EPC ramp is almost completed. The shift is completed.

Control Hardware

The inertia phase for the output shaft torque is completed. The intermediate servo apply pressure has reached the maximum value of the ramp at the point of shift completion.

The flow diagram of FIG. 41 shows the logic of the control strategy.

4-3 downshift

Figure 46:
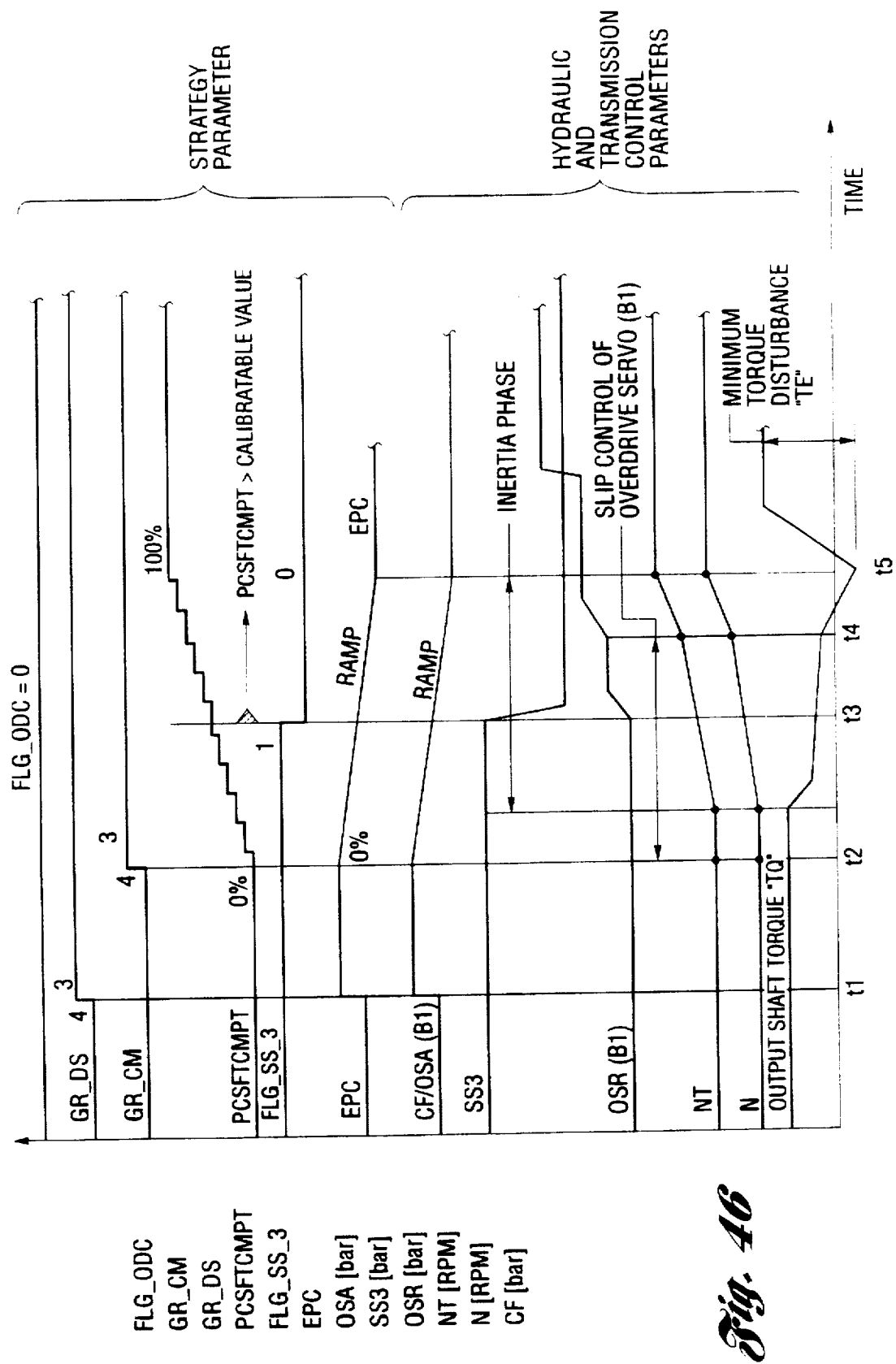
FIG. 46 shows a 4-3 downshift timing diagram.

The 4-3 timing diagram shown in FIG. 46 shows the 4-3 downshift control system in the time domain including the control strategy.

t1

Figure 42:
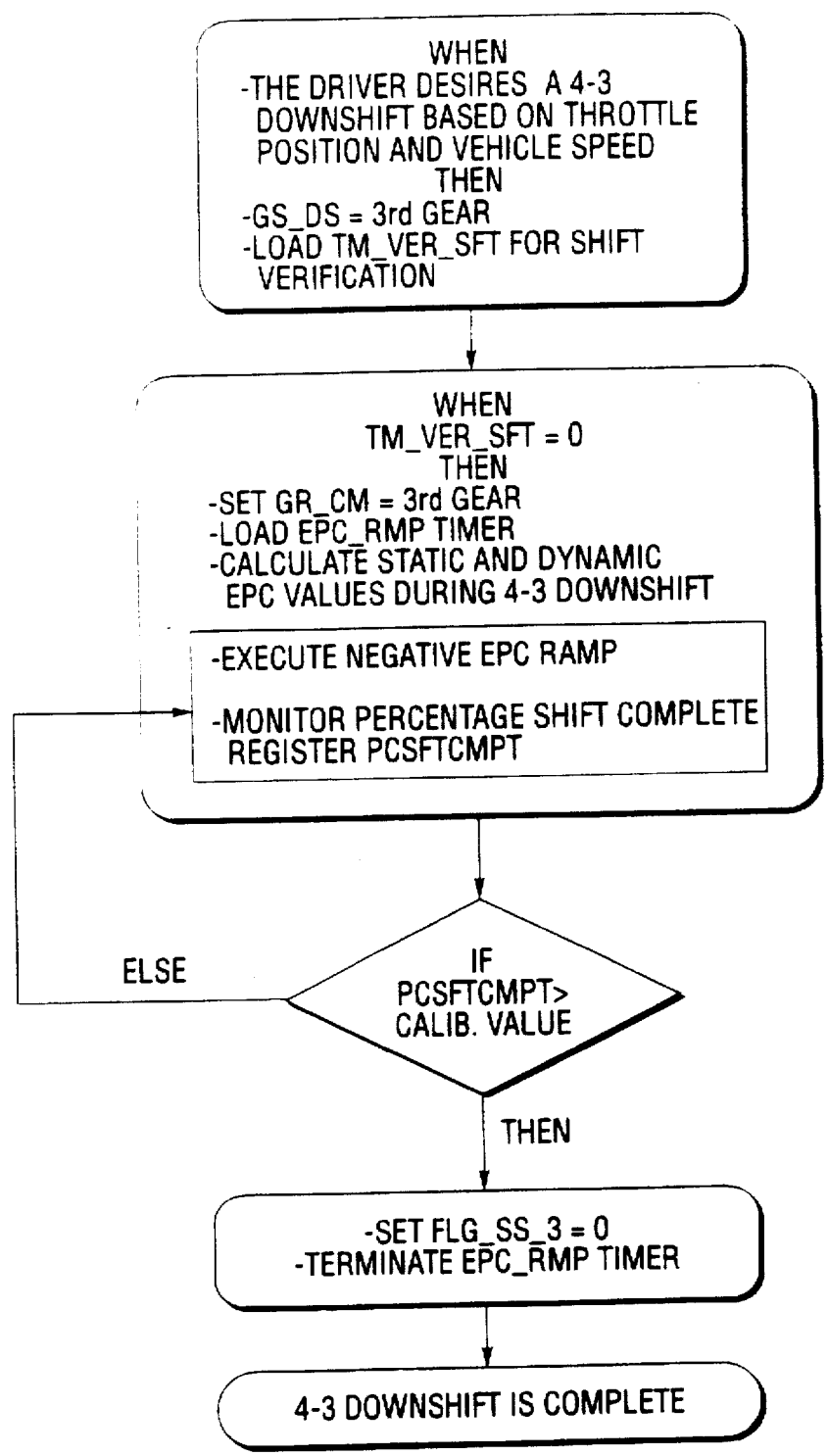
FIG. 42 shows the 4-3 downshift control logic.

Control Strategy (see FIG. 42)

At this point, the driver desires a 4-3 downshift based on shift curves (throttle position (TP) versus vehicle speed (VS)). The GR_DS register changes from fourth to third and a shift verification timer TM_VER_SFT is loaded. During this time no gear is commanded until the shift verification is completed. The dynamic EPC value for third gear is added at this point in order to save time for pressure buildup when the actual gear is commanded.

Control Hardware

EPC pressure is raised for the same reason explained above.

t2

Control Strategy

The shift verification timer TM_VER_SFT is expired and the GR_CM register is changed to third gear. An EPC ramp timer called EPC_RMP is loaded and a negative EPC ramp is triggered. Static and dynamic EPC values are calculated to satisfy the required capacity for a 4-3 downshift and are added to the EPC ramp resulting in the total amount of EPC. The shift solenoid FLG_SS_3 still remain at 1. The percentage shift complete register PCSFTCMPT is monitored during the execution of the EPC ramp.

Control Hardware

Since shift solenoid 3 is still energized by the control strategy, the shift solenoid 3 pressure stays high. The 3-4 upshift valve 72 in bore 215 stays in upshift position and CF pressure is steadily decreased according to the commanded EPC ramp. The overdrive servo starts to lose capacity and the engine RPM "N", as well as the turbine RPM "NT", starts to rise. The inertia phase is initiated. The output shaft torque decreases since CF pressure is decreasing as well.

t3

Control Strategy

The percentage shift complete register is monitored. If the percentage shift complete register PCSFTCMPT has reached a value greater than a calibration threshold, the shift solenoid flag FLG_SS_3 is set to zero and the ramp timer EPC_RMP is terminated.

Control Hardware

The CF pressure ramp steadily reduces capacity up to this point. The overdrive servo still transmits torque partially until the overdrive servo release pressure is completely built up by the downshifted 3-4 shift valve. Line pressure enters the overdrive servo release side and the servo starts to fill.

t4

Control Hardware

The overdrive servo release pressure starts to build up and the servo starts to stroke. The overdrive band capacity is zero.

t5

Control Strategy

The percentage shift complete value is at 100 percent and the shift is completed.

Control Hardware

The inertia phase for the output shaft torque is completed and so is the shift itself. The overdrive servo release pressure has reached stroke pressure. OWC1 engages and starts to carry full torque. The output shaft torque rises to the third gear level.

The flow diagram of FIG. 42 shows the logic of the control strategy.

Summary

The major reason why the CF pressure characteristic is applied on the overdrive servo is to vary the pressure from zero bar to maximum stall pressure. Low capacity as well as high capacity 3-4 shifts can be executed. An additional advantage is the fourth gear start up feature which is accomplished with the EPC boost system. It should be noted that the same CF-modulator is used for the forward engagements and all upshifts and all downshifts.

As outlined above, at the point where the inertia phase begins during a 3-4 upshift, the torque disturbance is totally dependent on the CF pressure characteristic. With the capability of varying the CF pressure by the electronic control system in form of an EPC ramp, a minimum torque disturbance TE can be accomplished with a limited amount of slip during the shift. The negative slope of the output shaft during the torque phase can also be influenced by the CF characteristic.

Known transmissions use an accumulator system installed on the release side of the overdrive servo. Such accumulator systems contain an accumulator valve and, in addition, a damping device which prevents a fast release of oil contained in the overdrive servo release side. An accumulator spring has to be calibrated for each vehicle application. The accumulator pressure acts as a back pressure to the apply side of the overdrive servo.

The accumulation of the present invention, in contrast, is software controlled and does not require substantial hardware changes. The complete accumulator system is eliminated and replaced by the CF modulator system, which is also used for forward engagements as in the case of all upshifts and all downshifts.

The 4-3 downshift control system contains the same software accumulation system to control the downshift event as in the case of the 2-1 downshifts. By introducing a negative EPC ramp and by monitoring the percentage shift complete register PCSFTCMPT, a smooth one-way clutch engagement OWC1 can be accomplished. The output torque disturbance TE is minimized and good shift quality is accomplished. By allowing the overdrive servo to hold partial torque during the inertia phase, the one-way clutch engagement quality OWC1 can be improved.

The advantage of this system is that with electronic controls, without substantial hardware changes, 3-4 upshift as well as 4-3 downshift accumulation is accomplished.

Figure 48:
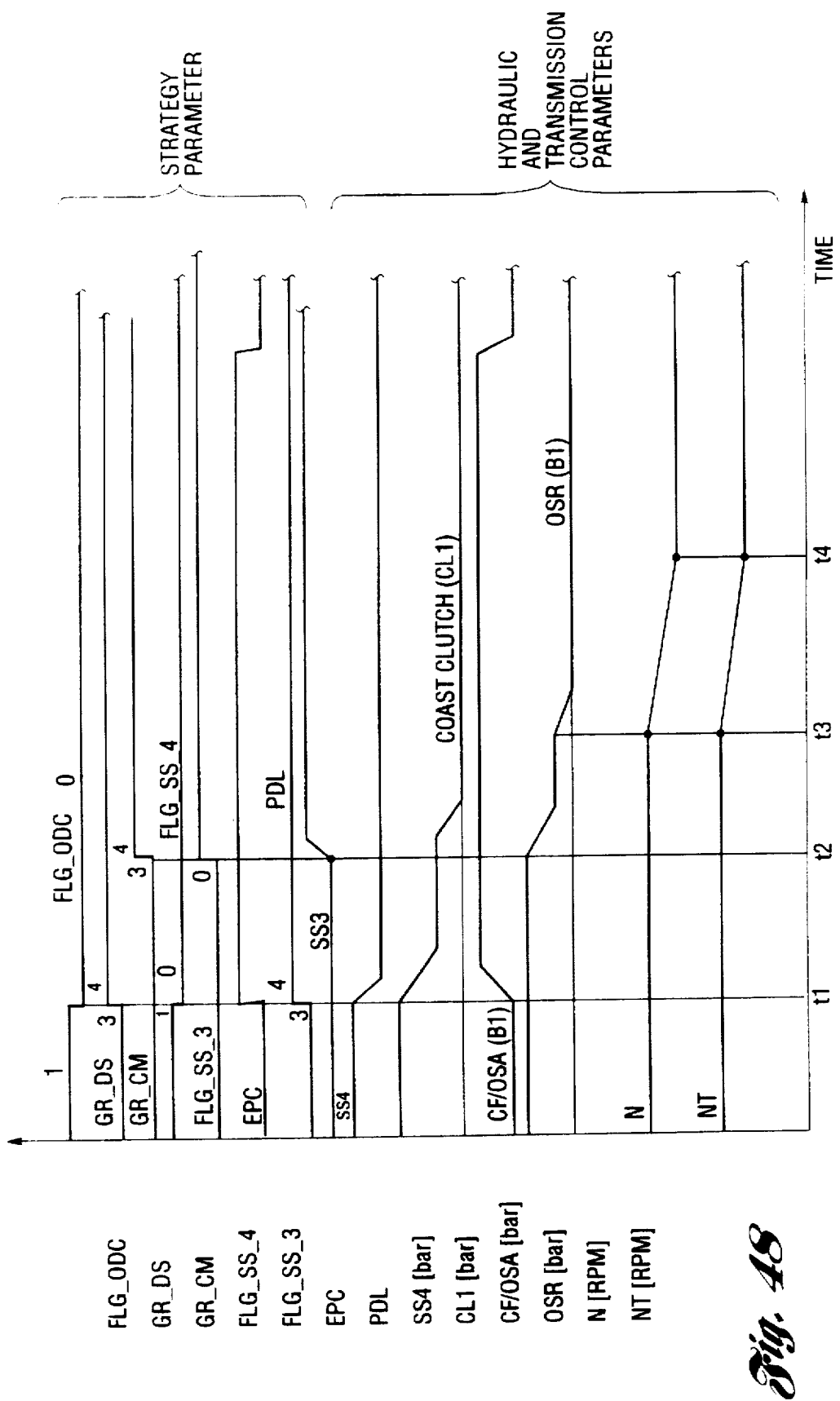
FIG. 48 shows a 3-4 upshift timing diagram actuated with the overdrive cancel switch off.

Control Strategy with Overdrive Cancel Switch Controlled 3-4/4-3 Shift Execution 3-4 Upshift with Overdrive Cancel Switch Turned from ON to OFF The timing diagram of FIG. 48 shows timing of the complete control system, including the control strategy in the time domain. The overdrive cancel switch is changed from ON to OFF.

t1

Figure 43:
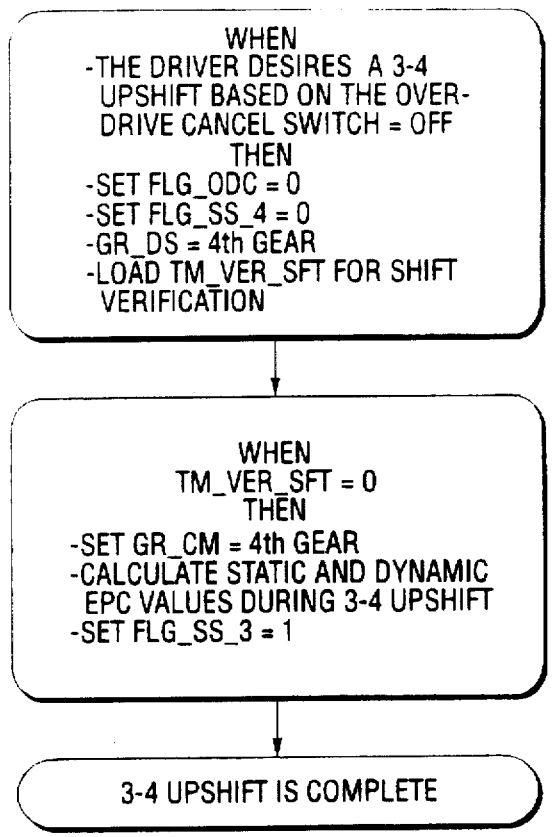
FIG. 43 shows the 3-4 upshift control logic actuated with the overdrive cancel switch off.

Control Strategy (see FIG. 43)

At this point, the driver desires a 3-4 upshift based on the state of the overdrive cancel switch. The overdrive cancel switch changes from ON to OFF. The overdrive cancel flag FLG_ODC then changes from 1 to 0. The GR_DS register changes from third to fourth and a shift verification timer called TM_VER_SFT is loaded. During this time no gear is commanded until the shift verification is completed. The dynamic EPC value for fourth gear is added at this point in order to save time for pressure buildup when the actual gear is commanded. Since this is a manual shift, the PDL register has been changed from 3 (DRIVE) to 4 (OVERDRIVE). This also was explained previously. The state of the shift solenoid 4 flag FLG_SS_4 is changed from 1 to 0.

Control Hardware

EPC pressure is raised for the same reason explained above. Shift solenoid 4 is de-energized and the coast clutch control valve 88 moves into its downshift position. Line pressure is disconnected from the coast clutch and is exhausted over the 3-4 shift control valve 72 into the 2/1 passage, which is again exhausted over the manual valve 78 in bore 206. The 3-4 shift control valve in bore 215 is still in downshift position since shift solenoid 3 is de-energized. The coast clutch capacity is eliminated.

t2

Control Strategy

Shift verification timer TM_VER_SFT is expired and the GR_CM register is changed to fourth gear. Since the GR_CM register represents the output states of the solenoids, FLG_SS_3 is set to 1. Static and dynamic EPC values are calculated to satisfy the required capacity for a 3-4 upshift and are loaded into the EPC register.

Control Hardware

Since shift solenoid 3 is energized by the control strategy, the shift solenoid 3 pressure is built up. The 3-4 upshift valve in bore 215 moves into upshift position and opens the overdrive servo release circuit to the CL1/B1 exhaust port in bore 212. The pressure buildup on the overdrive servo apply side is according to the commanded EPC ramp. The overdrive servo starts to stroke.

t3

Control Hardware

The overdrive servo has stroked and starts to engage. The overdrive band transmits torque and reduces the reaction torque on OWC1. At this time, the coast clutch (CL1) has fully stroked. The 3-4 upshift is initiated.

t4

Control Hardware

The overdrive band transmits full capacity and the inertia phase of the 3-4 upshift is completed.

FIG. 43 shows the logic of the control strategy.

4-3 Downshift with Overdrive Cancel Switch Turned From OFF To ON

Figure 47:
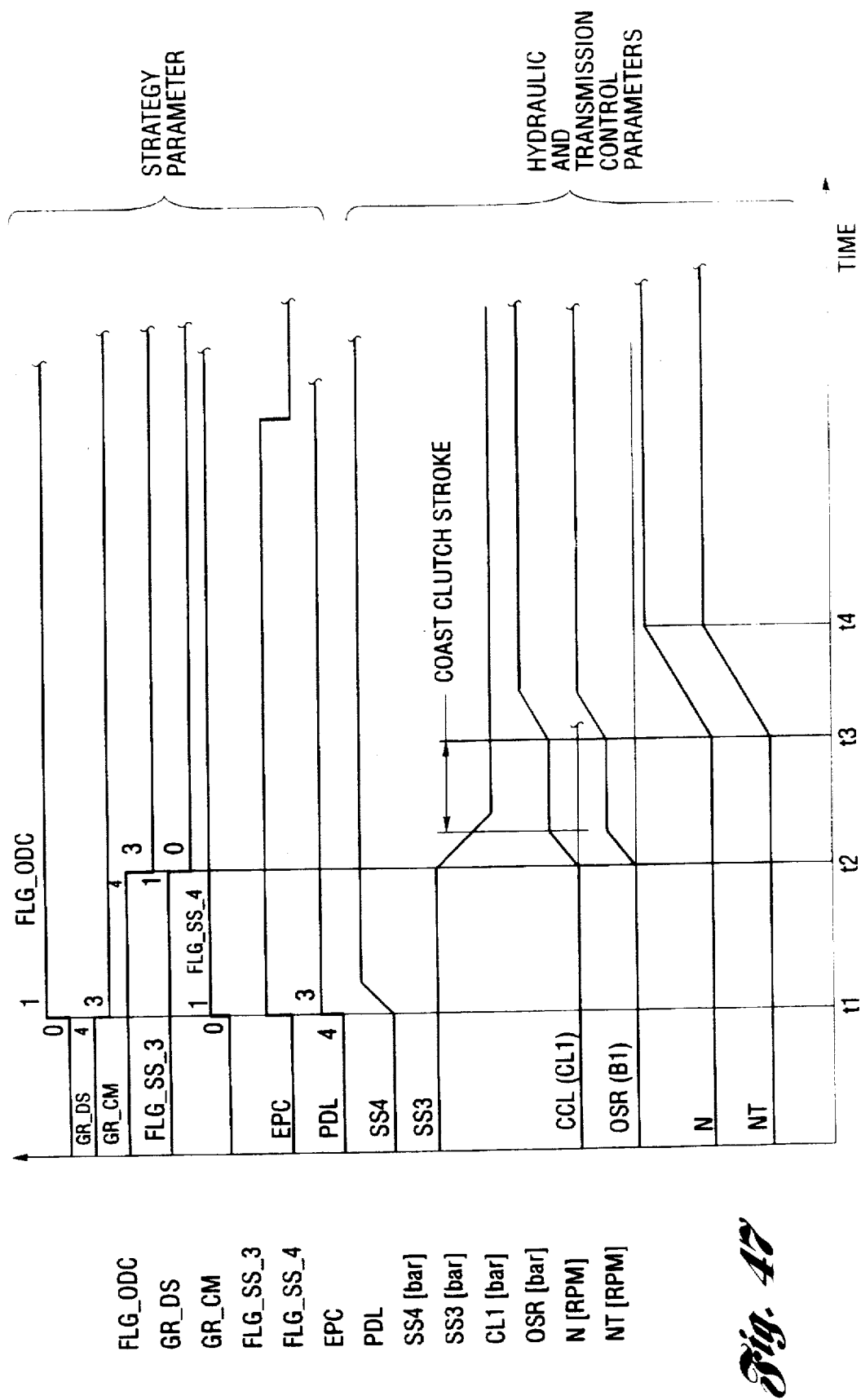

The 4-3 timing diagram shown in FIG. 47 shows the 4-3 downshift control system in the time domain including the control strategy. The state of the overdrive cancel switch has been changed from OFF to ON.

t1

Figure 44:
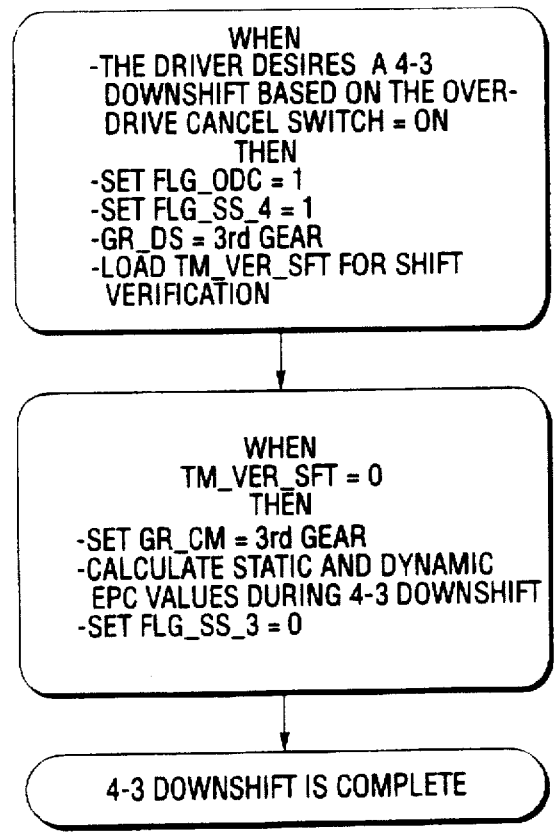

Control Strategy (see FIG. 44)

At this point, the driver desires a 4-3 downshift based on the state of the overdrive cancel switch. The overdrive cancel switch has been changed from OFF to ON. The GR_DS register changes from fourth to third and the shift verification timer TM_VER_SFT is loaded. During this time, no gear is commanded until the shift verification is completed. The dynamic EPC value for third gear is added at this point in order to save time for pressure buildup when the actual gear is commanded. The overdrive state flag FLG_ODC is changed from 0 to 1. The shift solenoid flag 4 FLG_SS_4 is also changed from 0 to 1.

Control Hardware

EPC pressure is raised for the same reason explained above. Shift solenoid 4 is energized and moves the coast clutch control valve in bore 201 into upshift position. A coast clutch engagement, however, is still inhibited since the shift solenoid 3 is still energized, which keeps the 3-4 shift control valve 72 in the upshift position. Coast clutch and overdrive servo release are exhausted through the CL1/B1 exhaust port located on the MAN1 timing valve 84 in bore 212.

t2

Control Strategy

The shift verification timer TM_VER_SFT is expired and the GR_CM register changes to third gear. Static and dynamic EPC values are calculated to satisfy the required capacity for a 4-3 downshift and are loaded into the EPC register. The shift solenoid flag FLG_SS_3 is changed from 1 to 0.

Control Hardware

Shift solenoid 3 is de-energized and the 3-4 upshift valve in bore 215 is moved into downshift position. Line pressure is fed into the coast clutch and overdrive servo release circuitries. Both elements are pressurized simultaneously.

t3

Control Hardware

The overdrive servo is filled and starts to release. The coast clutch, however, still strokes. The 4-3 downshift is initiated.

t4

Control Hardware

The coast clutch is fully engaged and the overdrive servo is completely stroked. The 4-3 downshift is completed with engine braking in third gear.

FIG. 44 shows the foregoing logic of the control strategy.

Summary

Controlling the manual 4-3 downshifts electronically eliminates one manual lever position and makes the manual lever design far less complex. Actuating the overdrive cancel switch to trigger a manual 4-3 downshift requires a dedicated coast clutch control system with one shift solenoid (SS4) dedicated to this control system. The advantage of this system is that the overdrive band and the coast clutch can be controlled individually, which gives more reliable shift quality. It is much easier to implement an override function between coast clutch and overdrive band. The override function prevents a simultaneous engagement of coast clutch and overdrive band, which is desired for system failure reasons and for good shift quality.

Some known transmissions have only two control orifices to implement a timing between the overdrive servo release and the coast clutch engagement. Timing mismatches between both elements then could trigger short-time, simultaneous engagements resulting in unacceptable 4-3 downshift quality. The dedicated electronic system for the coast clutch of the present invention, in conjunction with the 3-4 upshift control system, solves this timing problem.

Having described preferred embodiments of our invention, what we claim and desire to secure by U.S. Letters Patent is:

1. An automatic control system for a multiple ratio transmission having gearing defining a low speed ratio, an intermediate speed ratio, a high speed ratio and an overdrive ratio;

a high speed ratio clutch connecting two torque delivery elements of said gearing to establish high speed ratio;

a coast clutch means for connecting together elements of said gearing for bidirectional torque delivery;

an intermediate speed ratio brake means for braking an intermediate reaction element of said gearing to establish an intermediate speed ratio;

said brake means including a fluid pressure operated intermediate brake servo having a double acting piston defining an intermediate brake apply pressure chamber and an intermediate brake release pressure chamber;

a fluid pressure pump, a main regulator valve means for regulating pressure from said pump to establish a line pressure;

a clutch pressure modulator valve means communicating with said main regulator valve means for establishing a modulated pressure;

a control valve circuit having shift valve means for selectively distributing said line pressure to said brake release pressure chamber and to said high clutch and for selectively distributing said modulated pressure to said brake apply pressure chamber;

said shift valve means including solenoid actuators having an intermediate speed ratio shift solenoid state, a high speed ratio shift solenoid state and a shift solenoid state between said intermediate speed ratio and high speed ratio shift solenoid states;

said high speed ratio clutch and said brake release chamber being connected together at the initiation of a speed ratio change from said intermediate speed ratio to said high speed ratio;

a ratio change from said intermediate speed ratio to said high speed ratio being characterized by a transient change in said shift solenoid states resulting in said shift solenoid state between said intermediate speed ratio solenoid state and said high speed ratio solenoid state following initiation of an upshift from said intermediate speed ratio to said high speed ratio;

shift solenoid valve means for triggering movement of said shift valve means between upshift and downshift positions;

microprocessor means for developing control signals for activating and deactivating said solenoid valve means in response to operating variables;

said brake apply pressure chamber being pressurized with said modulated pressure and said brake release pressure chamber and high speed ratio clutch being pressurized with said line pressure independently of said modulated pressure following completion of a speed ratio change from said intermediate ratio to said high speed ratio, said brake release pressure chamber and said high speed ratio clutch being exhausted during execution of said transient change in shift solenoid states.

2. The system as set forth in claim 1 wherein said pressure modulator valve means includes a solenoid activated pressure control valve means for developing an electronic control pressure, said microprocessor responding to said control variables to establish a control signal input to said solenoid actuated pressure control valve means wherein upshifts from said intermediate speed ratio to said high speed ratio occur with a defined pressure buildup characteristic for said brake release pressure chamber and said high speed ratio clutch is achieved resulting in a smooth upshift from said intermediate speed ratio to said high speed ratio as braking capacity of said intermediate speed ratio decreases and torque capacity of said high speed ratio clutch increases, thereby simulating an accumulator effect.

3. The automatic control system set forth in claim 2 wherein said control valve circuit includes timing valve means in fluid communication with said shift solenoid valve means;

a pair of calibrated flow control orifices in fluid communication with said timing valve means;

said microprocessor means including means for developing control signals responsive to said control variable to effect changes to a first set of solenoid states for said shift solenoid valve means and said timing valve means, thereby connecting said intermediate servo release chamber and high speed ratio clutch to a first of said orifices to effect an intermediate downshift stage upon a downshift from said high speed ratio to said intermediate speed ratio and to effect a change to a second set of solenoid states for said shift solenoid valve means and said timing valve means, thereby connecting said intermediate servo release chamber and high speed ratio clutch to a second of said orifices upon completion of said intermediate downshift stage, whereby a smooth downshift is achieved.

4. The shift control system as set forth in claim 3 wherein said microprocessor means includes timing means for calculating the percentage of shift completion during a downshift to said intermediate speed ratio; and means for controlling the duration of selection of each of said solenoid states during said downshift to said intermediate speed ratio in accordance with the percent of shift completion during said downshift to said intermediate speed ratio.

5. The system as set forth in claim 3 wherein said timing valve means includes a high speed ratio clutch orifice dedicated to controlling release of clutch capacity during a high speed ratio to intermediate speed ratio shift and a movable downshift control valve means for selectively opening said dedicated orifice at the beginning of a speed ratio downshift to intermediate speed ratio.

6. The shift control system as set forth in claim 3 wherein said microprocessor means incudes an open loop timer controller means for controlling a downshift to said intermediate speed ratio; and means for controlling the duration of selection of each of said solenoid states during said downshift to said intermediate speed ratio in accordance with said open loop timer controller means during said downshift to said intermediate speed ratio.

7. The control system set forth in claim 3 including further an overdrive ratio brake means for braking an overdrive ratio reaction element of said gearing to effect overdrive ratio, said overdrive ratio brake means including a double-acting piston defining an overdrive brake apply pressure chamber and an overdrive brake release pressure chamber;

said microprocessor means further including means for developing control signals responsive to said control variables to effect a change to said second and first set of solenoid states for said shift solenoid valve means, thereby connecting said overdrive servo release pressure chamber with said line pressure to effect a further intermediate downshift stage upon a downshift from said overdrive ratio to said intermediate speed ratio whereby a smooth and instantaneous downshift is achieved by multiplexing functions of said clutch pressure modulator valve means, said orifices, said timing valve means and said shift solenoid valve means.

8. The control system of claim 7 wherein said microprocessor means includes means for monitoring torque transmitting capacity of said high speed ratio clutch during a downshift from said high speed ratio to said intermediate speed ratio and for developing a control signal for said clutch pressure modulator valve means thereby providing synchronous control for said high speed ratio clutch and said intermediate speed ratio brake during a downshift from said high speed ratio.

9. The control system of claim 7 including means for monitoring operating temperature of said control system and delay timer means for delaying changes in said solenoid states when operating temperatures exceed predetermined values.

10. The control system as set forth in claim 7 wherein the gearing defining said overdrive ratio comprises an overrunning coupling for connecting drivably two elements of said gearing, an overdrive reaction element of said gearing being anchored by said overdrive reaction brake;

said overdrive brake apply chamber being pressurized by said modulated pressure whereby the torque phase and the inertia phase on an upshift from said high speed ratio is controlled by said modulated pressure and wherein overdrive ratio brake means capacity is maintained on a downshift to said high speed ratio to effect partial brake torque until said overrunning coupling is engaged smoothly.

11. The control system as set forth in claim 10 wherein said microprocessor means includes means for monitoring the percentage of shift completion on a downshift to said high speed ratio and for limiting the amount of slip on said overdrive brake means during said downshift to said high speed ratio in accordance with said percentage or shift completion.

12. The control system as set forth in claim 7 wherein said shift valve means includes also an overdrive ratio to direct drive ratio and direct drive ratio to overdrive ratio shift valve providing communication between said overdrive brake release pressure chamber and said main regulator valve means to supply said overdrive brake release chamber with said line pressure during a ratio change from said overdrive ratio to said direct drive ratio upon a change to a third set of solenoids states.

13. The system as set forth in claim 12 including timer means for interrupting application of said intermediate speed ratio brake means when said percentage of shift completion is less than a predetermined value within calibrated time limits.

14. The control system as set forth in claim 12 wherein said clutch pressure modulator valve means is in communication with said overdrive brake apply pressure chamber as well as said intermediate brake apply chamber through said shift solenoid valve means whereby engagement of said intermediate speed ratio brake means and said overdrive ratio brake means are controlled independently of said line pressure by a common pressure modulator valve means.

15. The control system as set forth in claim 14 wherein said shift solenoid valve means communicates with signal output portions of said microprocessor whereby speed ratio changes between overdrive and direct drive and the engagement capacity of said overdrive brake means in an upshift to said overdrive ratio are determined by the states of activation and deactivation of said shift solenoid valve means.

16. The control system as set forth in claim 12 including means for canceling overdrive functions and overdrive ratio to direct drive ratio shifts, and a dedicated shift solenoid valve means for controlling pressure distribution to coast clutch means when said overdrive function is canceled.

17. The shift control system as set forth in claim 16 including a coast clutch control valve actuated by said shift solenoid valve means communicating with said overdrive ratio to direct drive ratio shift valve means, means for multiplexing the functions of said coast clutch by selectively applying line pressure thereto and exhausting the same, thereby providing capacity control of the coast clutch that is independent of the overdrive ratio brake means, whereby simultaneous engagement of said coast clutch means and said overdrive ratio brake means is prevented, thus achieving smooth overdrive ratio to direct drive ratio downshifts.

* * * * *